United States Patent
Bowyer et al.

(10) Patent No.: US 12,488,694 B2
(45) Date of Patent: Dec. 2, 2025

(54) FLIGHT CONTROL SYSTEMS, GROUND-BASED CONTROL CENTRES, REMOTELY PILOTED AIRCRAFT, AND METHOD

(71) Applicant: FLYLOGIX HOLDINGS LIMITED, West Sussex (GB)

(72) Inventors: Robert Bowyer, Hampshire (GB); Charles Tavner, Hampshire (GB); Ed Clay, Hamshire (GB); Mike Perrett, Hampshire (GB); Chris Adams, Hampshire (GB)

(73) Assignee: FLYLOGIX HOLDINGS LIMITED, West Sussex (GB)

( * ) Notice: Subject to any disclaimer, the term of this patent is extended or adjusted under 35 U.S.C. 154(b) by 359 days.

(21) Appl. No.: 17/770,837

(22) PCT Filed: Oct. 21, 2020

(86) PCT No.: PCT/GB2020/052643
§ 371 (c)(1),
(2) Date: Apr. 21, 2022

(87) PCT Pub. No.: WO2021/079108
PCT Pub. Date: Apr. 29, 2021

(65) Prior Publication Data
US 2022/0375351 A1    Nov. 24, 2022

(30) Foreign Application Priority Data

Oct. 21, 2019   (GB) ...................................... 1915188
Jul. 7, 2020    (GB) ...................................... 2010440
Jul. 16, 2020   (GB) ...................................... 2010966

(51) Int. Cl.
*G08G 5/26*    (2025.01)
*G08G 5/30*    (2025.01)
(Continued)

(52) U.S. Cl.
CPC ................. *G08G 5/26* (2025.01); *G08G 5/30* (2025.01); *G08G 5/55* (2025.01); *G08G 5/57* (2025.01);
(Continued)

(58) Field of Classification Search
CPC .... G08G 5/0013; G08G 5/003; G08G 5/0069; G08G 5/045; H04B 7/18508; H04B 7/18502; H04W 88/06
See application file for complete search history.

(56) References Cited

U.S. PATENT DOCUMENTS 9,100,361 B1    8/2015  Lucchesi et al.
10,271,261 B1*  4/2019  Lindsley ............... H04W 40/14
(Continued)

FOREIGN PATENT DOCUMENTS

WO    2018155159 A1    8/2018

OTHER PUBLICATIONS

Vidal, Ivan, et al., "Design and practical deployment of a network-centric remotely piloted aircraft system", IEEE Communications Magazine, IEEE Service Center, vol. 52, No. 10, pp. 22-29 (Oct. 1, 2014) [retrieved on Oct. 7, 2014] XP011560701.
(Continued)

*Primary Examiner* — Khoi H Tran
*Assistant Examiner* — Dairon Estevez
(74) *Attorney, Agent, or Firm* — Saul Ewing LLP

(57) ABSTRACT

There is disclosed a flight control system, the flight control system including a Remotely Piloted Aircraft (RPA) and a ground-based control centre, wherein the RPA and the ground-based control centre are configured to communicate using a plurality of different communication systems, wherein the RPA includes a computer system configured to determine operation risk, wherein the computer system receives input from the ground-based control centre for use (Continued)

in the determination of operation risk, wherein the computer system is configured to select a communication system from the plurality of different communication systems, and to use the selected communication system for communication between the RPA and the ground-based control centre, based on the determined operation risk.

28 Claims, 35 Drawing Sheets

(51) Int. Cl.
*G08G 5/55* (2025.01)
*G08G 5/57* (2025.01)
*G08G 5/80* (2025.01)
*H04B 7/185* (2006.01)
*H04B 7/195* (2006.01)

(52) U.S. Cl.
CPC ........... *G08G 5/80* (2025.01); *H04B 7/18508* (2013.01); *H04B 7/195* (2013.01)

(56) References Cited

U.S. PATENT DOCUMENTS

| | | | |
|---|---|---|---|
| 2008/0243317 A1* | 10/2008 | Morales De La Rica | G05D 1/106 701/11 |
| 2010/0292871 A1* | 11/2010 | Schultz | G01S 13/867 342/29 |
| 2014/0259111 A1* | 9/2014 | Sampigethaya | G06F 21/554 726/3 |
| 2016/0070261 A1* | 3/2016 | Heilman | G08G 5/57 701/2 |
| 2016/0307447 A1* | 10/2016 | Johnson | G08G 5/34 |
| 2017/0069214 A1* | 3/2017 | Dupray | G08G 5/56 |
| 2018/0081355 A1* | 3/2018 | Magy | G08G 5/56 |
| 2018/0218619 A1* | 8/2018 | Brown | G08G 5/727 |
| 2018/0220381 A1* | 8/2018 | Hudson | H04B 7/18506 |
| 2019/0007882 A1* | 1/2019 | Hudson | H04W 36/28 |
| 2020/0201316 A1* | 6/2020 | Schupke | G08G 5/26 |
| 2021/0358310 A1* | 11/2021 | Sachs | G08G 5/22 |
| 2022/0137598 A1* | 5/2022 | Akita | H04B 17/26 700/79 |
| 2022/0223056 A1* | 7/2022 | Dupray | G08G 5/21 |

OTHER PUBLICATIONS

International Search Report, dated Apr. 15, 2021, issued in International Application No. PCT/GB2020/052643.

* cited by examiner

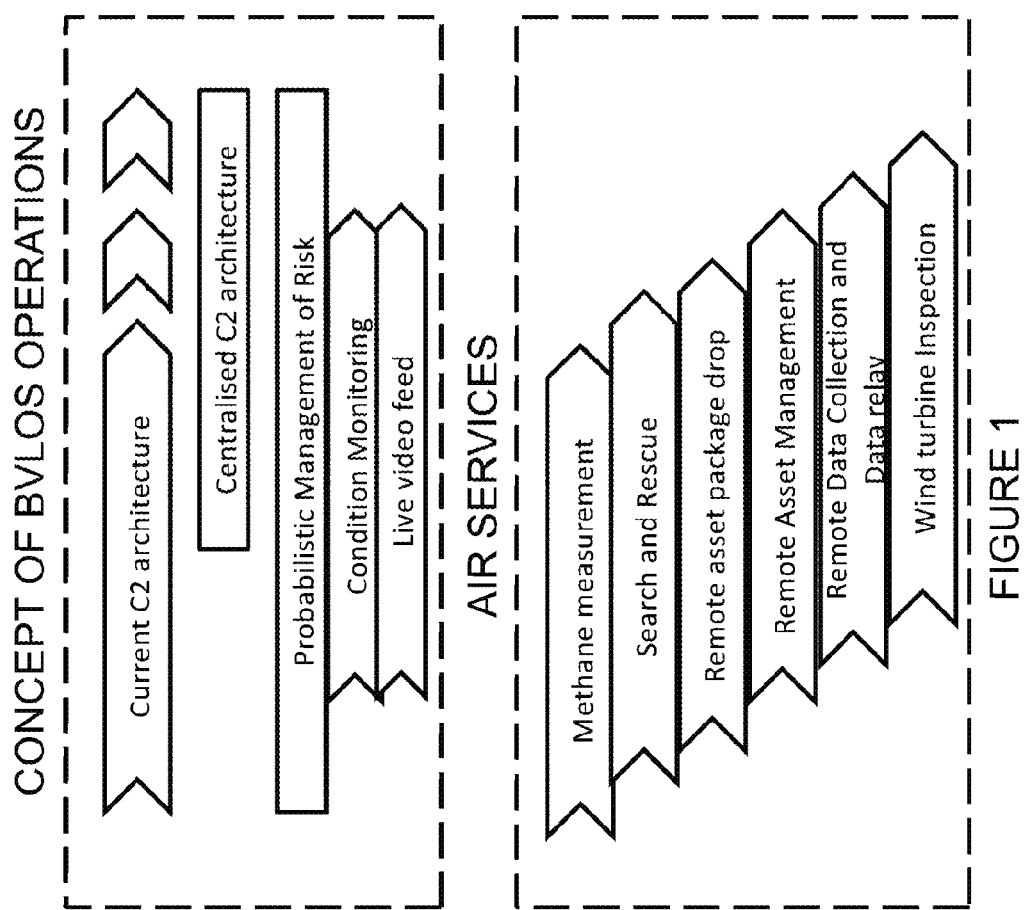

| Comms link | Range | Data rates | Latency | Security | Cost | License |
|---|---|---|---|---|---|---|
| 433MHz high power (tropospheric scattering) | 150mls | ~20 kbs | <2ms | Private (Defence) | £10k pa | R&D only |
| 433MHz low power <7W | 20mls | ~200 kbs | <2ms | Private (Defence) | £10k pa | Y (per region) |
| 868MHz 1W | 30mls | ~2 kbs | <1ms | Public | £10k pa | Y (per region) |
| Iridium (1.6GHz) | Global | 2 kbps | ~1s typical, 60s max | Secure | ~£1/min | Y - global |
| 4G (800MHz, 2.6GHz) | ~10mls | ~10 Mbps | ~200ms | Public | ~£5/GB | Y - regional |
| WiFi (2.4GHz) | ~100m | ~100 Mbps | ~150ms | Public | ~£400 pa | Y - global |

FIGURE 2

(a)
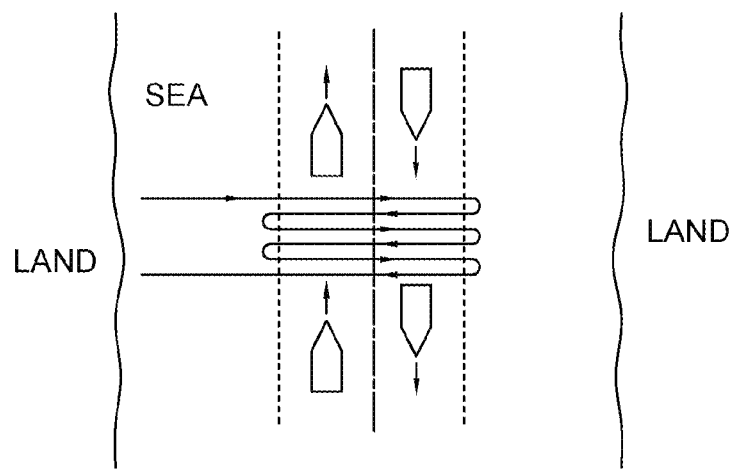
(b)
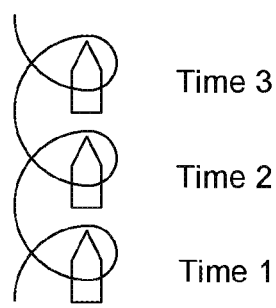
Time 3
Time 2
Time 1
FIG. 19

FLIGHT CONTROL SYSTEMS, GROUND-BASED CONTROL CENTRES, REMOTELY PILOTED AIRCRAFT, AND METHOD

CROSS REFERENCE TO RELATED APPLICATIONS

This application claims the priority of International Application No. PCT/GB2020/052643, filed on Oct. 21, 2020, which claims priority to GB Application No. GB 1915188.5, filed on Oct. 21, 2019; GB Application No. GB 2010440.2, filed on Jul. 7, 2020; and GB Application No. GB 2010966.6, filed Jul. 16, 2020, the entire contents of which are fully incorporated herein by reference.

BACKGROUND OF THE INVENTION

1. Field of the Invention

The field of the invention relates to flight control systems, to ground-based control centres, to Remotely Piloted Aircraft, and to related methods.

2. Technical Background

Effective beyond visual line of sight command and control systems typically require low-latency communications links, and existing systems tend to be proprietary and/or military based and thus are expensive and not generally applicable for commercial use due to use of restricted radio frequency (RF) licensed bands and/or RF power being above legislated levels. Therefore there is a need for a flight control system, including a Remotely Piloted Aircraft (RPA) and a ground-based control centre, which overcomes some or all of these problems.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

3. Discussion of Related Art

WO2019058116A1 discloses a method of, or a system for, controlling a pilotless device, which uses independent data links that provide multiple, redundant data channels. First, a direct radio link with a ground control station is used to receive command signals that enable a pilot to issue commands to an autopilot in the device, or to directly control the device. Secondly, there is an indirect control link with the ground control station, via satellites, that is used to send command signals to the device and to send back flight information and position data from a GPS or other satellite-based position receiver in the device. Thirdly, there is an indirect position data link back to the ground control station, via low earth orbit satellites, that is used to send back position data from a different GPS or other satellite-based position receiver in the device. WO201905816A1 is incorporated by reference.

SUMMARY OF THE INVENTION

According to a first aspect of the invention, there is provided a flight control system, the flight control system including a Remotely Piloted Aircraft (RPA) and a ground-based control centre, wherein the RPA and the ground-based control centre are configured to communicate using a plurality of different communication systems, wherein the RPA includes a computer system configured to determine operation risk, wherein the computer system receives input from the ground-based control centre for use in the deter urination of operation risk, wherein the computer system is configured to select a communication system from the plurality of different communication systems, and to use the selected communication system for communication between the RPA and the ground-based control centre, based on the determined operation risk.

An advantage is that a more reliable communication system can be selected, in response to a high determined operation risk. An advantage is that a lower cost communication system can be selected, in response to a low determined operation risk. An advantage is that input from the ground-based control centre is received for use in the determination of operation risk, to improve on the determination of operation risk. An advantage is that because the RPA is remotely piloted, a pilot's life is not put at risk.

The flight control system may be one wherein the selected communication system is selected to be a low cost communication system, in response to the determined operation risk being a lower operation risk. An advantage is that communications costs are reduced.

The flight control system may be one wherein the low cost communication system is a WiFi communication system, or a cellular (e.g. 2G, 3G, 4G, 5G, LTE) communication system, or a low-power RF communication system. An advantage is that communications costs are reduced.

The flight control system may be one wherein the low cost communication system is not a satellite communication system. An advantage is that communications costs are reduced.

The flight control system may be one wherein the selected communication system is selected independent of cost, when the determined operation risk is a higher operation risk; or wherein the selected communication system is a satellite communication system, when the determined operation risk is a higher operation risk. An advantage is that a more reliable communication system can be selected, in response to a high determined operation risk.

The flight control system may be one wherein reducing cost is provided by dividing the Mission into distinct phases based on risk.

The flight control system may be one wherein the ground-based control centre includes one or more of, or all of: a satellite communications transceiver; a satellite communications transceiver which can receive WiFi/cellular (e.g. 2G, 3G, 4G, 5G, LTE) communications from a satellite; a transceiver which can transmit WiFi (2.4 GHz) and 433 MHz frequencies; a cellular (e.g. 2G, 3G, 4G, 5G, LTE) and WiFi transceiver; or a VHF transceiver.

The flight control system may be one wherein the RPA includes one or more of, or all of: a Mode S transponder; a receiver for WiFi (2.4 GHz) and 433 MHz frequencies; a transceiver for satellite, cellular (e.g. 2G, 3G, 4G, 5G, LTE) and WiFi communications; a transceiver for automatic dependent surveillance-broadcast (ADS-B), or a transceiver for VHF.

The flight control system may be one wherein the RPA is operable to communicate with an at-sea offshore installation, in communication with a transceiver for cellular (e.g. 2G, 3G, 4G, 5G, LTE) and WiFi communications of the offshore installation, and/or a transceiver for VHF of the offshore installation. An advantage is that the RPA may collect and/or receive data from the offshore installation.

The flight control system may be one wherein the offshore installation has WiFi or cellular (e.g. 2G, 3G, 4G, 5G, LTE) or low-power RF connectivity and this connectivity is used to lower latency of a command link to the ground-based control centre via a network connection. An advantage is improved safety of operation of the RPA.

The flight control system may be one wherein a land-based satellite communications transceiver at the ground-based control centre, a cellular (e.g. 2G, 3G, 4G, 5G, LTE)/WiFi transceiver at the ground-based control centre, a VHF transceiver at the ground-based control centre, and an offshore installation-based transceiver for cellular (e.g. 2G, 3G, 4G, 5G, LTE) and WiFi, and an offshore installation-based transceiver for VHF, are connected by a network, or are connected to the internet.

The flight control system may be one wherein the RPA includes one or more of, or all of:
(i) airband VHF radio;
(ii) a low earth orbit (LEO) (e.g. Certus, Iridium L band) satellite and cellular (e.g. 2G, 3G, 4G, 5G, LTE) communications unit, which may switch between LEO and cellular (e.g. 2G, 3G, 4G, 5G, LTE) based on availability;
(iii) power, servos, pitot, GPS, etc, which may include one or more of, or all of: Power management done on PCB; Minimal and rugged connectors; Redundancy in sensors.

The flight control system may be one wherein the determination of operation risk involves determining the available connections (e.g. SatComms, cellular (e.g. 2G, 3G, 4G, 5G, LTE), WiFi, low-power RF), and using a multi-objective cost function to determine an appropriate link to send data over. An advantage is lower cost operation of the system.

The flight control system may be one wherein the cost function is or includes Route(t)=arg min{J_SatComms, J_4G, J_WiFi, J_RF}, subject to the latency <critical time, where J_{xx}=cost per data throughput. A cost term may also be included in the cost function in relation to energy consumed, which changes with distance for each link, or a cost term may also be included in the cost function in relation to power consumed. A cost term may also be included in relation to the Round-Trip Time (RTT) of each link. An advantage is lower cost operation of the system, while maintaining safety, because the latency <critical time.

The flight control system may be one wherein the multi-objective cost function follows a set policy for the mission that sets the level of risk vs the cost (reward) for the optimizer; policy can be set by the ground station risk determiner, or by assigning risk to each leg of the route, e.g. an additional property of each waypoint of the route. An advantage is lower cost operation of the system.

The flight control system may be one wherein the flight control system further includes a VHF transceiver (e.g. situated on land, near to the coast) that is situated near an ATC and which connects to the local ATC radio communications infrastructure so that the RPA pilot is fully aware of all the air traffic information in a plurality of sectors, and can respond to ATC and individual pilot requests in real time. An advantage is improved safety of operation of the RPA.

The flight control system may be one wherein the VHF transceiver is configured to communicate with a RPA pilot's headset, by Radio over IP (ROIP), where the RPA pilot's headset is part of the ground control station. An advantage is improved safety of operation of the RPA.

The flight control system may be one wherein the RPA pilot's headset is configured to communicate by Voice over IP (VOID) with a phone network.

The flight control system may be one wherein the phone network is configured to communicate with an operations phone room, in a communication with an offshore installation (e.g. oil rig). An advantage is improved safety of operation of the RPA.

The flight control system may be one wherein the ground-based control centre is configured to communicate with the Remotely Piloted Aircraft (RPA), the RPA operable to execute a mission, the ground-based control centre including a ground-based computer system, wherein the ground-based computer system is:
(i) configured to receive data about the RPA;
(ii) configured to receive flight plan data and environmental data;
(iii) configured to process the received data about the RPA, and the received flight plan data and the environmental data, using a risk assessment algorithm, to determine a probability of mid-air collision, and to determine a probability of damage to third parties on the ground;
(iv) configured to process the determined probability of mid-air collision, and the determined probability of damage to third parties on the ground, to decide whether to abort the mission, or to proceed with the mission, and
(v) configured to send an instruction to the RPA to abort the mission, in response to a decision to abort the mission in (iv), and/or configured to send an instruction to the RPA to proceed with the mission, in response to a decision to proceed with the mission in (iv). An advantage is improved safety of operation of the RPA.

The flight control system may be one wherein when deciding whether to abort the mission, or to proceed with the mission, the decision is made by running multiple scenarios testing edge cases as well as a nominal case before giving the final decision. An advantage is improved safety of operation of the RPA.

The flight control system may be one wherein the RPA is operable beyond visual line of sight from the ground-based control centre to the RPA, or beyond visual line of sight from the ground-based control centre to an offshore target. An advantage is that remote offshore assets can be flown to and inspected, e.g. using a camera on the RPA, or methane sensing can be performed.

The flight control system may be one wherein the ground-based control centre includes flight control software which includes one or more of, or all of: Shows position of other aircraft from ADS-B received at RPA; Shows flight plan; Customised user interface (UI) to improve accuracy and assist following procedures. An advantage is improved safety of operation of the RPA.

The flight control system may be one wherein the ground-based control centre includes one or more of, or all of:
(i) a local transmitter, which may include a Handheld unit;
(ii) an internet link to low earth orbit (LEO) (e.g. Certus, Iridium L band) satellite and cellular (e.g. 2G, 3G, 4G, 5G, LTE) communications unit, which may include one or more of: Secure and reliable connection; Low latency;
(iii) VOIP or ROIP link to fixed VHF antennas;
(iv) automatic landing and/or automatic take-off;
(v) VOIP link to VHF antenna on RPA;
(vi) command inputs and telemetry data.

The flight control system may be one wherein the ground-based control centre is in a vehicle, a van, or an intermodal container, or is at a fixed site. An advantage is that, for a vehicle, a van, or an intermodal container, the ground-based control centre can be relocated.

The flight control system may be one wherein the ground-based control centre includes a processor and mission control software which is executable on the processor.

The flight control system may be one wherein the mission control software receives input from one or more of, or all of: weather reporting, satellite positioning, customer need, ADS-B, Automatic identification system (AIS), notice to airmen (NOTAM), radar.

The flight control system may be one wherein the mission control software includes an enhanced Estimation of Position module to factor in one or more of: Last known position from either satellite or Electronic Conspicuity (EC); Last known course and heading therefore showing where aircraft could be; Weather uncertainty on cross track error; Impact of satellite position downloaded from North American Aerospace Defense Command (NORAD) and then modelled for satellite elevation; Created estimated uncertainty on position.

The flight control system may be one wherein in the user interface at the ground-based control centre, an overlay of acceptable proximity to threats (e.g. other aircraft from ADS-B and other boats from AIS) is shown as a buffer zone around the proximity threats. An advantage is improved safety of operation of the RPA.

The flight control system may be one wherein in the user interface at the ground-based control centre, a visual interface is provided, including overlays showing risk interaction, e.g. showing where ships/planes/roads etc are as well as prediction on where the RPA will be in the future. An advantage is improved safety of operation of the RPA.

The flight control system may be one wherein in the user interface at the ground-based control centre, a pilot can view a probabilistic representation of aircraft position that incorporates last known position and potential position based on last course and heading so the pilot is always aware of the impact of latency on his position relative to other aircraft and ships (and other ground threats). An advantage is improved safety of operation of the RPA.

The flight control system may be one wherein the system includes a Local Ground-based control centre which is in communication with the RPA, and the RPA sends data to the local Ground-based control centre, which is in communication with the mission control software at the central control centre. An advantage is that the Local Ground-based control centre can be situated at an airfield for the RPA, to supervise preparations for take off and/or landing of the RPA.

The flight control system may be one wherein the ground-based control centre is configured to manage operations risk by managing the operation in phases and by using a probabilistic framework. An advantage is improved safety of operation of the RPA.

The flight control system may be one wherein the Safety Officer is brought back to Mission Control and acts as a Mission Commander. An advantage is cost reduction.

The flight control system may be one wherein a local pilot carries out pre-flight checks and completes electronic record; Mission control centre prepares mission over WiFi/cellular (e.g. 2G, 3G, 4G, 5G, LTE)/low-power RF link, establishes satellite link, seeks ATC clearance, and asks the pilot to take off; Local pilot takes off and hands over to central control centre (pilot now free to do other tasks); Central control centre runs mission, talks to ATC and local asset; Local pilot takes over from central control centre and lands aircraft; Local pilot completes post-flight checks and completes electronic record. An advantage is improved safety of operation of the RPA.

The flight control system may be one wherein the Pilots are moved to the central control centre, and the entire operation is run centrally. An advantage is cost reduction.

The flight control system may be one wherein the pilot is located at a central control centre, and take-off and landing is conducted by the pilot remotely using Instrument Landing System (ILS)-type display and the Fly-by-wire (FBW) stabilising controller with {air speed, heading, rate-of-climb} setpoints being sent via cellular (e.g. 2G, 3G, 4G, 5G, LTE)/low-power RF and satellite link allowing the pilot to maintain control with much higher latency links e.g. up to 5 s. An advantage is improved safety of operation of the RPA.

The flight control system may be one wherein a Video Link from the RPA to the ground-based control centre is provided, e.g. for First Person View. An advantage is improved safety of operation of the RPA.

The flight control system may be one wherein low-cost shipping containers are provided to replace a vehicle (e.g. van) to operate the RPA from. An advantage is reduced servicing and repair requirements.

The flight control system may be one wherein the RPA includes a methane sensor, or a gas sensor. An example is that the RPA may monitor emissions from an asset.

The flight control system may be one wherein the RPA includes an autopilot. An advantage is improved safety of operation of the RPA.

The flight control system may be one wherein the autopilot is in communication with one or more of, or all of:
  (i) a Mode-S transponder and ADS-B out;
  (ii) control surfaces;
  (iii) sensors;
  (iv) ABS-B in, which receives input from ABS-B out units on other aircraft;
  (v) Iridium satellite and WiFi/cellular (e.g. 2G, 3G, 4G, 5G, LTE)/868 intelligent gateway;
  (vi) a radio receiver;
wherein the Mode-S transponder and ADS-B out are visible to ATC by primary radar, secondary surveillance and ADS-B; the Mode-S transponder and ADS-B out are visible to ADS-B in equipped aircraft; the mode-S transponder and ADS-B out are visible to TCAS equipped aircraft in a conflict; the iridium satellite and WiFi/cellular (e.g. 2G, 3G, 4G, 5G, LTE)/868 intelligent gateway are operable to be in communication with an iridium satellite network and/or WiFi/cellular (e.g. 2G, 3G, 4G, 5G, LTE) network/868 radio. An advantage is improved safety of operation of the RPA.

The flight control system may be one wherein the autopilot has a set of automated responses (guards) that are activated if communication with ground-based control centre is interrupted for longer than a predetermined time. An advantage is improved safety of operation of the RPA.

The flight control system may be one wherein there is provided a nested approach of a fast local stabilising FBW controller on the RPA and a slower GPS (or other satellite system)-based autopilot, to control the RPA during the high latency periods such that the autopilot is checking and bounding the RPA so as not to go outside of an expected path or into marked unsafe zones. An advantage is improved safety of operation of the RPA.

The flight control system may be one wherein the autopilot is configured to geofence fixed or moving assets to prevent the RPA approaching too closely. An advantage is improved safety of operation of the RPA.

The flight control system may be one wherein during Visual Line of Sight (VLOS) Transit, all high bandwidth flight control is conducted by the RPA autopilot, removing requirement to have control in <20 ms latency. An advantage is reduced workload for a pilot.

The flight control system may be one wherein a route is modified when the RPA is flying, to reduce the risk profile. An advantage is improved safety of operation of the RPA.

The flight control system may be one wherein a high bandwidth link between the RPA and the ground-based control centre is provided to upload mission or download post mission data.

The flight control system may be one wherein during take-off or landing, a high bandwidth, low latency, connection like 2.4 GHz or low power 868 MHz between the RPA and the ground-based control centre is provided to take-off or to land the RPA, respectively. An advantage is improved safety of operation of the RPA.

The flight control system may be one wherein the system includes an analogue video link from the RPA to the ground-based control centre in which one or more of, or all of, the following apply:
 (i) lower fidelity analogue video is used and high resolution (e.g. 360 deg) digital cameras are used to log locally and then download this high resolution video data later;
 (ii) the analogue video system uses Video Diversity Switch (VSDU) which employs two frequency channels and hops between them to choose the best signal at each point in time;
 (iii) Circular Polarization Antennae are used, which solve the phase shifting problems associated with operating RF equipment from an aircraft. An advantage is improved safety of operation of the RPA.

The flight control system may be one wherein the RPA flies around a remote asset and gathers the data from it using a local cellular (e.g. 2G, 3G, 4G, 5G, LTE)/WiFi network and then flies back to deliver the data to the ground-based control centre. An advantage is reduced cost data delivery.

The flight control system may be one wherein a Command and Control architecture is refined to deliver in segregated airspace.

The flight control system may be one wherein a Satellite Communications based Command and Control architecture takes over from a high-power RF 433 MHz UHF radio link as the failsafe 'watchdog'.

The flight control system may be one wherein there is provided probabilistic Management of Risk to enable planning missions quickly and efficiently (e.g. at low cost).

The flight control system may be one wherein condition monitoring with good anomaly detection algorithms are part of providing probabilistic Management of Risk to enable planning missions quickly and efficiently. An advantage is improved safety of operation of the RPA.

The flight control system may be one wherein there is provided Upload of data from Remote Assets. An advantage is reduced cost data delivery.

The flight control system may be one wherein only the pilot and safety officer need to travel to perform the missions. An advantage is reduced cost of operations.

The flight control system may be one wherein low risk routes are identified, e.g. offline, prior to the mission. An advantage is improved safety of operation of the RPA.

According to a second aspect of the invention, there is provided a ground-based control centre, the ground-based control centre configured to communicate with a Remotely Piloted Aircraft (RPA), the RPA operable to execute a mission, the ground-based control centre including a computer system, wherein the computer system is:
 (i) configured to receive data about the RPA;
 (ii) configured to receive flight plan data and environmental data;
 (iii) configured to process the received data about the RPA, and the received flight plan data and the environmental data, using a risk assessment algorithm, to determine a probability of mid-air collision, and to determine a probability of damage to third parties on the ground;
 (iv) configured to process the determined probability of mid-air collision, and the determined probability of damage to third parties on the ground, to decide whether to abort the mission, or to proceed with the mission, and
 (v) configured to send an instruction to the RPA to abort the mission, in response to a decision to abort the mission in part (iv), and/or configured to send an instruction to the RPA to proceed with the mission, in response to a decision to proceed with the mission in part (iv). An advantage is improved safety of operation of the RPA.

The ground-based control centre may be one wherein the probability of mid-air collision is determined using one or more of, or all of: traffic density; awareness at distance; ability to avoid. An advantage is improved safety of operation of the RPA.

The ground-based control centre may be one wherein the probability of damage to third parties on the ground is determined using one or more of, or all of: probability of getting near the ground; total number of assets and people close to the RPA; Energy at Impact; the risks after impact. An advantage is improved safety of operation of the RPA.

The ground-based control centre may be one wherein the ground-based control centre is configured to manage operations risk by managing the operation in phases and by using a probabilistic framework. An advantage is improved safety of operation of the RPA.

The ground-based control centre may be one wherein at the ground-based control centre a probabilistic representation of aircraft position is displayed to the pilot that incorporates last known position and potential position based on last course and heading so the pilot is always aware of the impact of latency on his position relative to other aircraft and ships (and other ground threats). An advantage is improved safety of operation of the RPA.

The ground-based control centre may be one wherein the probabilistic representation of aircraft position is supplemented by a position reported with Electronic Conspicuity (EC) that may be more recent. An advantage is improved safety of operation of the RPA.

The ground-based control centre may be one wherein condition monitoring with good anomaly detection algorithms are part of providing probabilistic Management of Risk to enable planning missions quickly and efficiently. An advantage is improved safety of operation of the RPA.

The ground-based control centre may be one wherein the ground-based control centre configured to provide the Probabilistic Management of Risk is certified by a Civil Aviation Authority, e.g. the UK Civil Aviation Authority (CAA). An advantage is improved safety of operation of the RPA.

The ground-based control centre may include any aspect of a ground-based control centre of a flight control system according to any aspect of the first aspect of the invention.

According to a third aspect of the invention, there is provided a Remotely Piloted Aircraft (RPA), wherein the RPA is configured to communicate with a ground-based control centre using a plurality of different communication systems, wherein the RPA includes a computer system configured to determine operation risk, wherein the computer system is configured to select a communication system from the plurality of different communication systems, and to use the selected communication system for communication between the RPA and the ground-based control centre, based on the determined operation risk.

An advantage is that a more reliable communication system can be selected, in response to a high determined operation risk. An advantage is that a lower cost communication system can be selected, in response to a low determined operation risk. An advantage is that because the RPA is remotely piloted, a pilot's life is not put at risk.

The RPA may be one wherein the selected communication system is selected to be a low cost communication system, in response to the determined operation risk being a lower operation risk. An advantage is cost reduction.

The RPA may be one wherein the low cost communication system is a WiFi communication system, or a cellular (e.g. 2G, 3G, 4G, 5G, LTE) communication system, or a low-power RF communication system.

The RPA may be one wherein the low cost communication system is not a satellite communication system. An advantage is cost reduction.

The RPA may be one wherein the selected communication system is selected independent of cost, when the determined operation risk is a higher operation risk; or wherein the selected communication system is a satellite communication system, when the determined operation risk is a higher operation risk. An advantage is that a more reliable communication system can be selected, in response to a high determined operation risk.

The RPA may be one wherein the determination of operation risk involves determining the available connections (e.g. SatComms, cellular (e.g. 2G, 3G, 4G, 5G, LTE), WiFi, low-power RF), and using a multi-objective cost function to determine an appropriate link to send data over. An advantage is cost reduction.

The RPA may be one wherein the cost function is or includes Route(t)=arg min{J_SatComms, J_4G, J_WiFi, J_RF}, subject to the latency <critical time, where J_{xx}=cost per data throughput. A cost term may also be included in the cost function in relation to energy consumed, which changes with distance for each link. A cost term may also be included in relation to the Round-Trip Time (RTT) of each link. An advantage is lower cost operation of the RPA, while maintaining safety, because the latency <critical time.

The RPA may be one wherein the multi-objective cost function follows a set policy for the mission that sets the level of risk vs the cost (reward) for the optimizer.

The RPA may be one wherein the RPA includes an intelligent gateway.

The RPA may be one wherein the RPA includes any aspect of a RPA of a flight control system of any aspect of the first aspect of the invention.

According to a fourth aspect of the invention, there is provided a flight control system, the flight control system including a Remotely Piloted Aircraft (RPA) and a ground-based control centre, wherein the RPA and the ground-based control centre are configured to communicate using a plurality of different communication systems, wherein the RPA includes a gas sensor outputting gas sensor data, and position-related sensors, and wherein the RPA includes a computer system configured to record the gas sensor data, and to record RPA position data obtained using the position-related sensors and associated with respective gas sensor data.

An advantage is that the RPA can measure gas emissions data from an offshore installation.

The flight control system may be one wherein the gas sensor is a point sensor that measures the local concentration of a particular gas.

The flight control system may be one wherein the RPA includes sensors configured to measure windspeed and direction. An advantage is that the gas emissions data can be used together with windspeed and direction, to derive an underlying gas emission.

The flight control system may be one wherein the computer system is configured to record the measured windspeed and direction.

The flight control system may be one wherein the RPA is programmed by the ground-based control centre not to enter an exclusion zone of a target. An advantage is improved safety of operation of the RPA.

The flight control system may be one wherein the exclusion zone is up to at least 500 m from the target.

The flight control system may be one wherein the RPA is programmed by the ground-based control centre to fly a path around a target. An advantage is that the RPA can measure gas emissions data from an offshore installation.

The flight control system may be one wherein the path is such that gas sensor measurements measured along the path enable the overall emission of the gas by the target to be calculated.

The flight control system may be one wherein the path is over:
(i) a complete dome surrounding the target; or
(ii) a cylinder, extending from sea level to greater than the tallest feature on the target; or
(iii) a cone shape, extending from sea level to greater than the tallest feature on the target; or
(iv) a perimeter of the target; or
(v) a complete perimeter of the target. An advantage is that the RPA can measure gas emissions data from an offshore installation.

The flight control system may be one wherein the RPA is programmed (e.g. by the ground-based control centre) to fly in a series of circles at increasing or decreasing altitudes with short ascents or descents, respectively, to a new altitude; or in a continuous helix; or in an oblong or stadium path at increasing or decreasing altitudes with short ascents or descents, respectively; or in a continuous helix over an oblong or stadium shape; or in a continuous helix over a cone shape; or in a path adapted to a set of targets at increasing or decreasing altitudes with short ascents or descents, respectively; or in a continuous helix over a shape adapted to a set of targets. An advantage is that the RPA can measure gas emissions data from an offshore installation, with efficient use of resources.

The flight control system may be one wherein by combining gas sensor measurements with windspeed and direction, the flow rate of the gas from the target can be calculated.

The flight control system may be one wherein the target includes a mooring, wherein an exclusion zone is adapted to take account of the target moving with respect to its mooring; the exclusion zone can be refined with a knowledge of wind direction, tide and live feed from the target.

The flight control system may be one wherein the target is an offshore oil and gas asset, or a set of offshore oil and gas assets.

The flight control system may be one wherein the target is a moving target e.g. a moving ship, and e.g. the path is over a virtual cylinder.

The flight control system may be one wherein the RPA is programmed (e.g. by the ground-based control centre) to fly a series of simple passes of multiple smaller assets to detect an emission signature and then only conducts a detailed survey of those assets with a significant emission.

The flight control system may be one wherein the gas sensor senses methane.

The flight control system may be one wherein the gas sensor senses CO2.

The flight control system may be one wherein the gas sensor senses hydrofluorocarbons (HFCs), or perfluorocarbons (PFCs), or sulphur hexafluoride (SF6) or nitrogen trifluoride (NF3), or NOx or SOx.

The flight control system may be one wherein the gas sensor output is recorded at regular intervals, e.g. every few seconds.

The flight control system may be one wherein the flight control system includes any aspect of a flight control system of any aspect of the first aspect of the invention.

According to a fifth aspect of the invention, there is provided a flight control system, the flight control system including a Remotely Piloted Aircraft (RPA) and a ground-based control centre, wherein the RPA and the ground-based control centre are configured to communicate using a plurality of different communication systems, wherein the RPA includes a camera, and the RPA is programmed by the ground-based control centre to fly a path around a target, wherein the target is a wind turbine including blades, and wherein the RPA is programmed to capture images of the blades using the camera, and to record the captured images of the blades.

An advantage is that remote inspection of wind turbine blades can be achieved, without necessarily interrupting the operation of the wind turbine.

The flight control system may be one wherein the RPA is programmed to capture images of leading edge tips of the blades using the camera, and to record the captured images of the leading edge tips of the blades. An advantage is that a very detailed survey of wind turbine blades is achieved, without necessarily interrupting the operation of the wind turbine.

The flight control system may be one wherein the captured images of the blades include images of damage to the blades.

The flight control system may be one wherein the captured images are captured assuming rotation of the wind turbine blades. An advantage is that remote inspection of wind turbine blades can be achieved, without necessarily interrupting the operation of the wind turbine.

The flight control system may be one in which the wind turbine includes a rotor, wherein the RPA is programmed (e.g. by the ground-based control centre) to fly along the plane of the rotor above the top and upwind of the rotor disk. An advantage is reduced turbulence for the RPA.

The flight control system may be one wherein the RPA is programmed (e.g. by the ground-based control centre) to fly in line with the blade rotation. An advantage is that a sharper image of the blade is obtained.

The flight control system may be one wherein the RPA is programmed (e.g. by the ground-based control centre) to fly in line with blade rotation to slow the relative speed of a blade tip to the RPA, using the RPA speed to reduce the relative motion between the RPA and the blade tip. An advantage is that a sharper image of the blade is obtained.

The flight control system may be one wherein the RPA is programmed (e.g. by the ground-based control centre) to fly in line with blade rotation to slow the relative speed of a blade tip to the RPA, using the RPA speed to reduce the relative motion between the RPA and the blade tip to obtain high quality blade tip images.

The flight control system may be one wherein the RPA is configured to use camera tracking to follow a blade tip. An advantage is that a sharper image of the blade tip is obtained.

The flight control system may be one wherein the RPA includes a microphone, wherein the RPA is configured to record an acoustic signature of associated damage and resultant poor airflow of a blade, using the microphone. An advantage is improved characterization of blade damage.

The flight control system may be one wherein the RPA is configured to characterise three wind turbine tips as they consecutively pass the RPA. An advantage is improved efficiency of characterization.

The flight control system may be one wherein images of three blades are captured before top dead centre to ensure an unobstructed view of the leading edges of the blades. An advantage is improved characterization of blade damage.

The flight control system may be one wherein the RPA's sensors are configured to relate visual and acoustic signals with turbine and blade unique numbers. An advantage is improved efficiency of characterization.

The flight control system may be one wherein the RPA is configured to measure the offset of the turbine blade from a tower of the turbine as it passes bottom dead centre as a measure of aerodynamic performance.

The flight control system may be one wherein the captured images are captured assuming stopped rotation of the wind turbine blades. An advantage is improved efficiency of characterization of stopped wind turbine blades.

The flight control system may be one wherein the RPA is programmed (e.g. by the ground-based control centre) to fly a route that enables it to traverse a plurality of turbines of a wind farm in a single operation. An advantage is improved efficiency of characterization of turbines of a wind farm.

The flight control system may be one wherein the RPA time-stamps recorded data and the ground-based control centre matches visual and acoustic results with recorded blade strain measurement to identify the specific blade inspected and to correlate those results with blade structural behaviour. An advantage is improved efficiency of characterization.

The flight control system may be one wherein the flight control system includes any aspect of a flight control system of any aspect of the first aspect of the invention.

According to a sixth aspect of the invention, there is provided a method of data collection and/or data transmission, the method being used by a flight control system, the flight control system including a Remotely Piloted Aircraft (RPA) and a ground-based control centre, wherein the RPA and the ground-based control centre are configured to communicate using a plurality of different communication systems, the method including the steps of:

(i) the RPA receiving from the ground-based control centre a flight plan for flying from a departure point towards an offshore (or a remote) asset;

(ii) the RPA flying towards the offshore (or the remote) asset, based on the flight plan;

(iii) the RPA receiving data from the offshore (or the remote) asset, using a low cost communication system.

An advantage is that the RPA can receive data for delivery to the ground-based control centre, at low cost.

The method may be one including the step of:

(iv) the RPA storing the received data from the offshore (or the remote) asset, on a lightweight data store such as a USB flash drive.

The method may be one including the step of:

(iv) the RPA transmitting the received data from the offshore (or the remote) asset, using a low cost communication system, to the ground-based control centre.

The method may be one wherein the low cost communication system is a WiFi communication system, or a cellular (e.g. 2G, 3G, 4G, 5G, LTE) communication system, or a low-power RF communication system.

The method may be one wherein the low cost communication system is not a satellite communication system.

The method may be one wherein the RPA flies towards the departure point, between steps (iii) and (iv).

The method may be one wherein the RPA flies around the offshore (or the remote) asset, during step (iii). An advantage is that the RPA remains close to the offshore (or the remote) asset, during receiving the data.

The method may be one wherein the RPA is used as high bandwidth data relay from a fibre link on shore to the offshore (or the remote) asset.

The method may be one wherein the height of the RPA is high enough so that it has line of sight of both the offshore asset and a ground station on shore. An advantage is lower energy use by the RPA during data transmission and/or reception.

The method may be one wherein there is no line of sight between the offshore asset and the ground station on shore. An advantage is improved communication strength between the offshore asset and the ground station on shore, via the RPA.

The method may be one wherein the path of the RPA is adjusted according to weather conditions. An advantage is improved safety of operation of the RPA.

The method may be one wherein the RPA includes an antenna, and the RPA files a closed pattern where the turns are gentle so that the RPA antenna keeps tracking the receiver stations for maximum signal strength. An advantage is lower energy use by the RPA during data transmission and/or reception.

The method may be one wherein distances between the RPA and the asset, and between the RPA to a land-based receiver, are adjusted to reduce power consumption of operating the transceiver onboard the RPA so as to maximise the flying time and/or overall data throughput. An advantage is lower energy use by the RPA during data transmission and/or reception.

The method may be one wherein distances between the RPA and the asset, and between the RPA to a land-based receiver, are optimised in real-time taking into account the ratio of data flowing to and from the shore changing over time. An advantage is lower energy use by the RPA during data transmission and/or reception.

The method may be one wherein onboard data storage of the RPA is used to act as a buffer, wherein the RPA:

(a) moves towards the asset;
(b) sends a large amount of data to the asset and collects a large amount of data to send to shore;
(c) flies towards the shore ground station and 'delivers' the large amount of data received from the asset and collects the next 'batch' of data from the shore to deliver to the asset. A large amount of data may be at least 100 MB, or at least 1.0 GB, or at least 10 GB. An advantage is reduced cost of sending or receiving a large amount of data from an asset.

The method may be one wherein for 'batch' delivery of data, a wide and narrow closed path is used where the RPA spends most the time transiting between the shore and asset.

The method may be one wherein for 'continuous' delivery of real-time data, a narrow and wide closed path is used and the RPA spends most time flying perpendicular to the line joining the asset and the shore ground station.

The method may be one wherein a flight control system of any aspect of the first aspect of the invention is used.

A flight control system of any aspect of the first aspect of the invention may be one wherein the flight control system is configured to perform a search operation in a search and rescue operation.

A flight control system of any aspect of the first aspect of the invention may be one wherein the flight control system is configured to perform offshore inspection e.g. offshore oil rig inspection.

In further aspects of the invention, respective methods or systems relating to respective aspects of the invention may be provided. Aspects of the invention may be combined.

BRIEF DESCRIPTION OF THE FIGURES

Aspects of the invention will now be described, by way of example(s), with reference to the following Figures, in which:

FIG. 1 shows an example of a concept of BVLOS operations, and example air services.

FIG. 2 shows a table of example properties of available communications links.

FIG. 19 shows diagrams for examples of measuring gases from moving emitters.

DETAILED DESCRIPTION

System for Efficient (e.g. Low cost) Beyond Visual Line of Sight Unmanned Air Services (UAS)

An objective is to achieve efficient (e.g. low cost) unmanned air services beyond visual line of sight.

In an example, a centralised C2 (command and control) architecture is provided. In an example of probabilistic management of risk, condition monitoring is used. In an example of probabilistic management of risk, live video feed is used. Example applications include: methane measurement; search and rescue; remote asset package drop; remote asset management; remote data collection and data relay; wind turbine inspection.

An example of a concept of BVLOS operations, and example air services are shown in FIG. 1.

BACKGROUND

Being able to operate air services using drones beyond visual line of sight (BVLOS) requires the operator to prove that the system can run safely. The safety case typically relies heavily on having:
Situational Awareness
Positional Awareness, and
a good Command and Control system,
so that the aircraft behaviour is predictable, and understood, at all times.

Here we outline a system and describe how:
1. The Positional Awareness and Command and Control is achieved using existing satellite (e.g. Iridium) and terrestrial (e.g. WiFi/cellular (e.g. 2G, 3G, 4G, 5G, LTE)/low-power RF) networks together with an intelligent on-board processing arrangement to provide Command and Control at improved efficiency (e.g. at a much-reduced cost), and that is generally applicable world-wide. The system must additionally manage the latency & low bit rate intrinsic to a cost effective and lightweight satellite.
2. The Situational Awareness is dealt with using our Overall System Risk framework and Mission Control user experience (UX).

Command and Control (C2) architecture

The Command and Control (C2) architecture is important (e.g. it is critical) for us to be able to scale the operation in terms of personnel. Effective BVLOS C2 typically require low-latency communications links, and existing systems tend to be proprietary and/or military based and thus are expensive and not generally applicable for commercial use due to use of restricted radio frequency (RF) licensed bands and/or RF power being above legislated levels. In a different version, we used a high-powered 433 MHz secure command link and a global positioning system (GPS) driven Autopilot when BVLOS, and an 868 MHz control link when having visual line of sight (VLOS).

The table in FIG. 2 shows example properties of available communications links.

System Architecture

Figure 3:
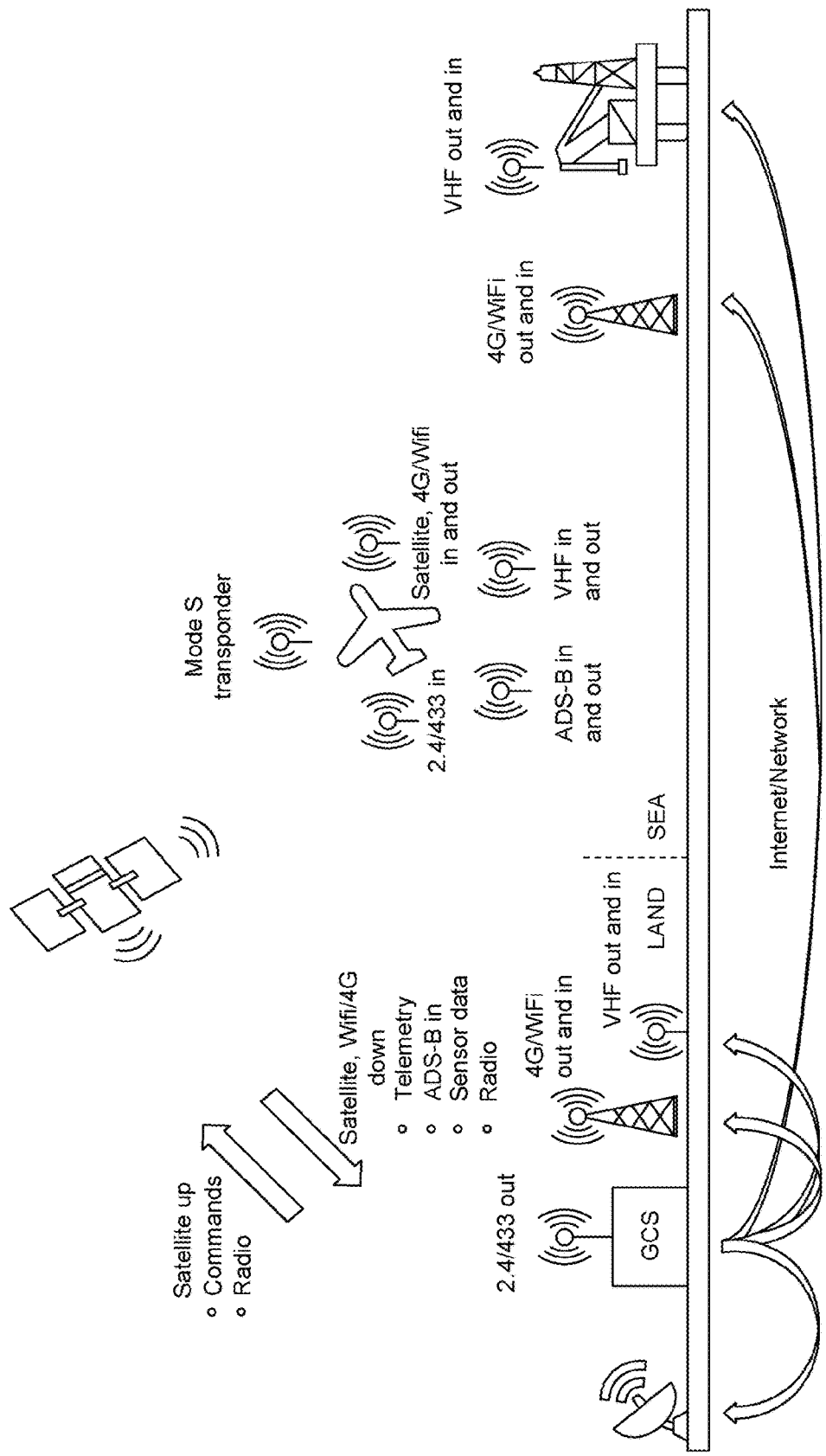
FIG. 3 shows an example system to achieve robust Command and Control.

There is provided a system to achieve robust Command and Control using a mixture of satellite communications (SatComms) and WiFi/cellular (e.g. 2G, 3G, 4G, 5G, LTE) communications links, and an internet backbone to get the data back to our local Ground Control Systems (GCS) and Mission Control Centre at a control centre. An example system to achieve robust Command and Control using a mixture of SatComms and WiFi/cellular (e.g. 2G, 3G, 4G, 5G, LTE) communications links, and an internet backbone to get the data back to our local Ground Control Systems (GCS) and Mission Control Centre at a control centre, is shown in FIG. 3.

In an example, on land there is provided a satellite communications transceiver. The transceiver can receive WiFi/cellular (e.g. 2G, 3G, 4G, 5G, LTE) communications from a satellite. In an example, on land there is provided a Ground Control Systems (GCS) which can transmit WiFi (2.4 GHz) and 433 MHz frequencies. In an example, on land a cellular (e.g. 2G, 3G, 4G, 5G, LTE)/WiFi transceiver is provided. In an example, on land a VHF transceiver is provided.

In an example, an Unmanned Air Service includes one or more of: a Mode S transponder; a receiver for WiFi (2.4

GHz) and 433 MHz frequencies; a transceiver for satellite, cellular (e.g. 2G, 3G, 4G, 5G, LTE) and WiFi communications; a transceiver for automatic dependent surveillance-broadcast (ADS-B), and a transceiver for VHF.

In an example, at sea (e.g. at an offshore installation) there is provided a transceiver for cellular (e.g. 2G, 3G, 4G, 5G, LTE) and WiFi communications, and a transceiver for VHF.

In an example, the land-based satellite communications transceiver at the GCS, the cellular (e.g. 2G, 3G, 4G, 5G, LTE)/WiFi transceiver, and the VHF transceiver, and the sea-based transceiver for cellular (e.g. 2G, 3G, 4G, 5G, LTE) and WiFi, and the sea-based transceiver for VHF, are connected by a network, or are connected to the internet.

An unmanned aircraft-based apparatus may include airband VHF radio, which may include one or more of: VHF transceiver and radio; Pilot can change frequency; Pilot can receive and transmit. An unmanned aircraft-based apparatus may use Voice over Internet Protocol (VOIP)/Radio over Internet Protocol (ROIP) to ATC to talk to other aircraft. An unmanned aircraft-based apparatus may include a methane sensor. An unmanned aircraft-based apparatus may include local storage which may include one or more of: a Methane sensor can be reset by pilot; sample data is communicated back by the low earth orbit (LEO) (e.g. Certus, Iridium L band)/cellular (e.g. 2G, 3G, 4G, 5G, LTE) unit; Complete data stored locally. An unmanned aircraft-based apparatus may include a low earth orbit (LEO) (e.g. Certus, Iridium L band) satellite and cellular (e.g. 2G, 3G, 4G, 5G, LTE) communications unit, which may include one or more of: Switches between LEO and cellular (e.g. 2G, 3G, 4G, 5G, LTE), or between a plurality of cellular links (e.g. to get better coverage), based on availability; Minimal downtime (possibly duplicate low earth orbit (LEO) (e.g. Certus, Iridium L band)). An unmanned aircraft-based apparatus may include a watchdog (may be in an autopilot), which may include one or more of: Implements predetermined failsafes; may be part of an (e.g. Pixhawk) autopilot, or may sit outside autopilot. An unmanned aircraft-based apparatus may include a receiver for WiFi (2.4 GHz) and 433 MHz frequencies, which may include one or more of: Receiver and antennas; Suitable for range of about 3 miles. An unmanned aircraft-based apparatus may include a (e.g. Pixhawk) autopilot, which may include one or more of: Customised firmware to desired behaviour and minimise bit rate; mounted directly onto power distribution printed circuit board (PCB) within enclosure. An unmanned aircraft-based apparatus may include power, servos, pitot, GPS receiver or other satellite-based position receiver, etc, which may include one or more of: Power management done on PCB; Minimal and rugged connectors; Redundancy in sensors. An unmanned aircraft-based apparatus may include Mode S transponder and ADS-B out, which may include one or more of: an ADSB-Out unit (e.g. PING 200X unit); Antenna and GPS (certified) or other satellite-based position receiver, linked to unit; Squawk can be changed remotely by the pilot. An unmanned aircraft-based apparatus may include ADS-B in, which may include one or more of: an ADSB-In unit (e.g. PING RX unit); Feeds data into the autopilot (e.g. Pixhawk).

Figure 4:
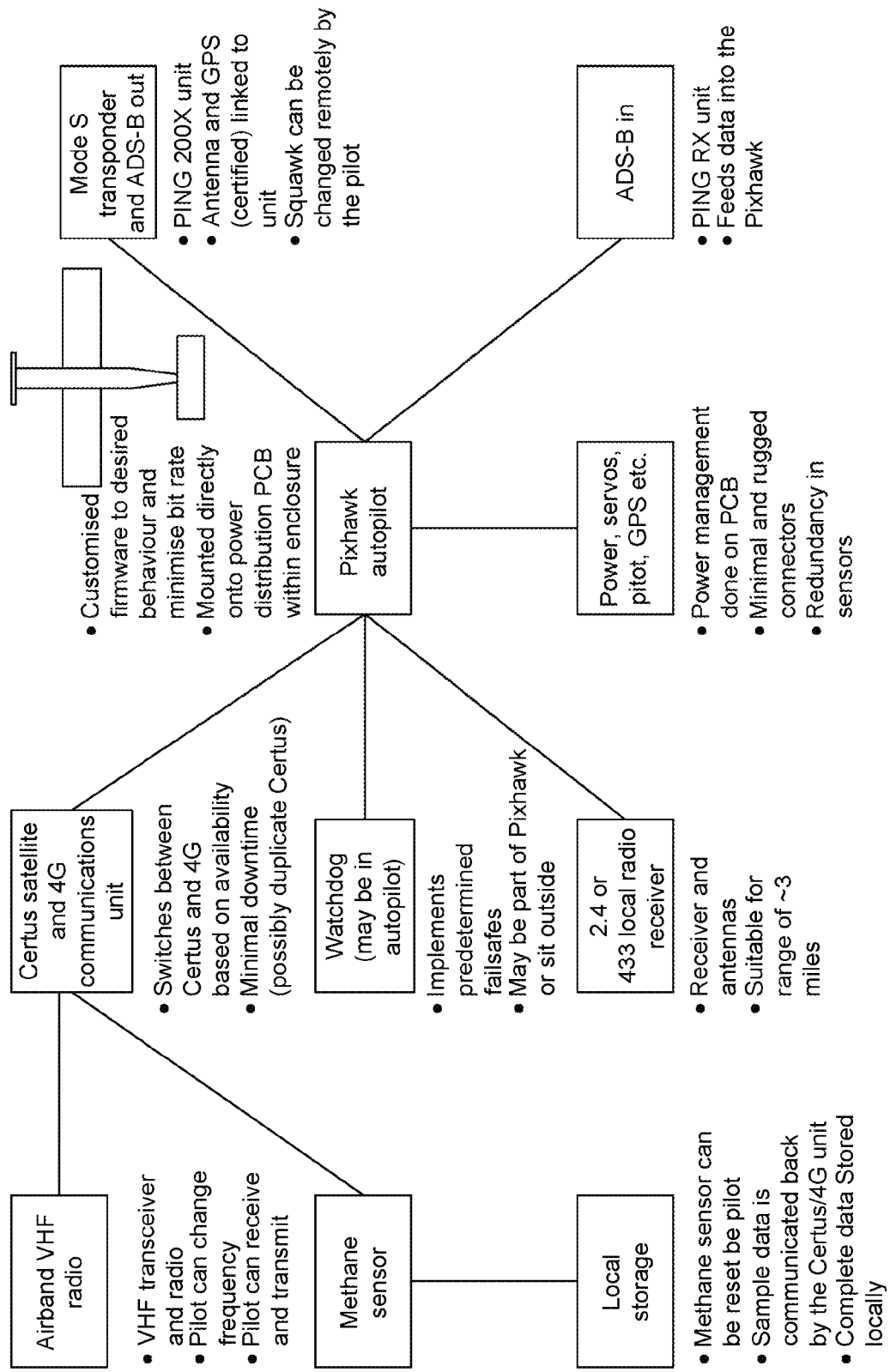
FIG. 4 shows an example of systems of an unmanned aircraft-based apparatus.

An example of systems of an unmanned aircraft-based apparatus is shown in FIG. 4.

A Ground Control System may include flight control software, which may include one or more of: Shows position on other aircraft from ADS-B in on aircraft; Shows flight plan; Customised user interface (UI) to improve accuracy and assist following procedures. A Ground Control System may include a local transmitter, which may include one or more of: Handheld unit; Requires no regulatory (e.g. OFCOM) licence; Gives about 3 mile range. A Ground Control System may include an internet link to low earth orbit (LEO) (e.g. Certus, Iridium L band) satellite and cellular (e.g. 2G, 3G, 4G, 5G, LTE) communications unit, which may include one or more of: Secure and reliable connection; Low latency. A Ground Control System may include Radio over Internet Protocol (ROIP)/Voice over Internet Protocol (VOIP) link to fixed VHF antennas, which may include one or more of: Pilot can speak and voice is transmitted from antenna; Pilot can hear what is received by VHF antenna; Pilot can change frequency of antenna. A Ground Control System may include automatic landing, which may include: Aircraft must be able to land in fog conditions. A Ground Control System may include VOIP link to VHF antenna on aircraft, which may include one or more of: Pilot can speak and voice is transmitted from aircraft; Pilot can hear what is received by VHF at aircraft; Pilot can change frequency. A Ground Control System may include a fixed VHF antenna, which may include one or more of: Fixed VHF transceiver near air traffic control (ATC) (and possibly offshore);

Pilot can transmit, receive and change frequency.

Figure 5:
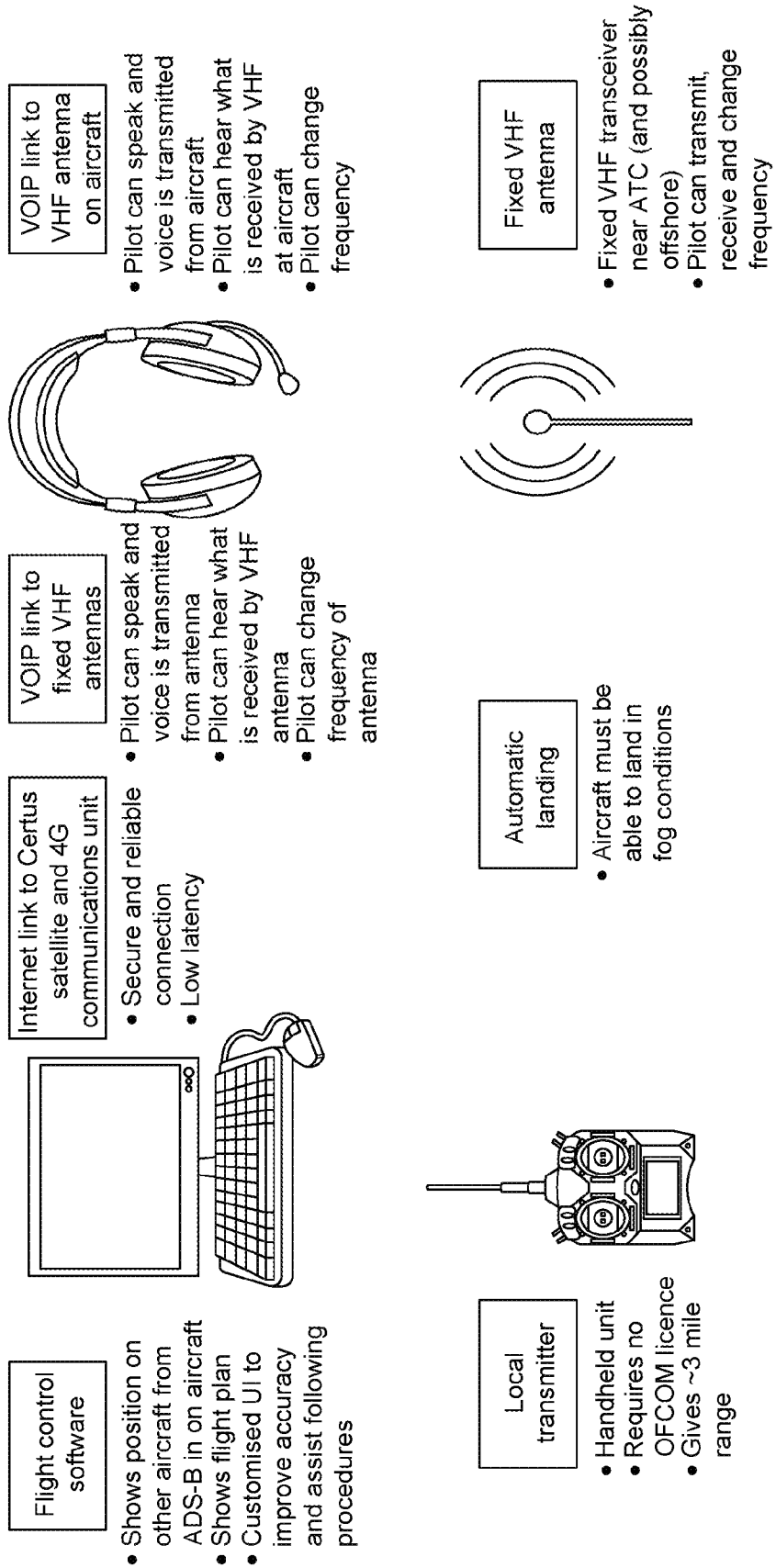
FIG. 5 shows an example of what may comprise a Ground Control System.

An example of what may comprise a Ground Control System is shown in FIG. 5.

Example Operating Model

In an example we use a vehicle (e.g. a van) kitted out with a Ground Control Station (GCS) and Mission Control Station (MCS) to run the operation locally, with oversight and central Monitoring provided by Mission Command at a control centre using a clone of the MCS setup as in the vehicle (e.g. a van).

In examples, there are provided one or more of: Complete operation at airfield; Pilot control from GCS using Ardupilot & Iridium modem; Manual take-off & landing; Safety officer running Flylogix MCS from Iridium satellite board (SB); Safety officer talking to ATC & other aircraft; Mission commander monitoring & talking to Safety Officer.

In an example, at a central control centre, the mission control software is under the command of a mission commander. In an example, the mission control software (MCS) receives input from one or more of: weather reporting, from satellite positioning, and from customer need. In an example, the mission control software receives input from one or more of: ADS-B, Automatic identification system (AIS), notice to airmen (NOTAM) and radar. In an example, a pilot system at a local GCS is in communication with an unmanned aircraft, and the unmanned aircraft sends data by radio to the local MCS, which is in communication with the mission control software at the central control centre.

Figure 6:
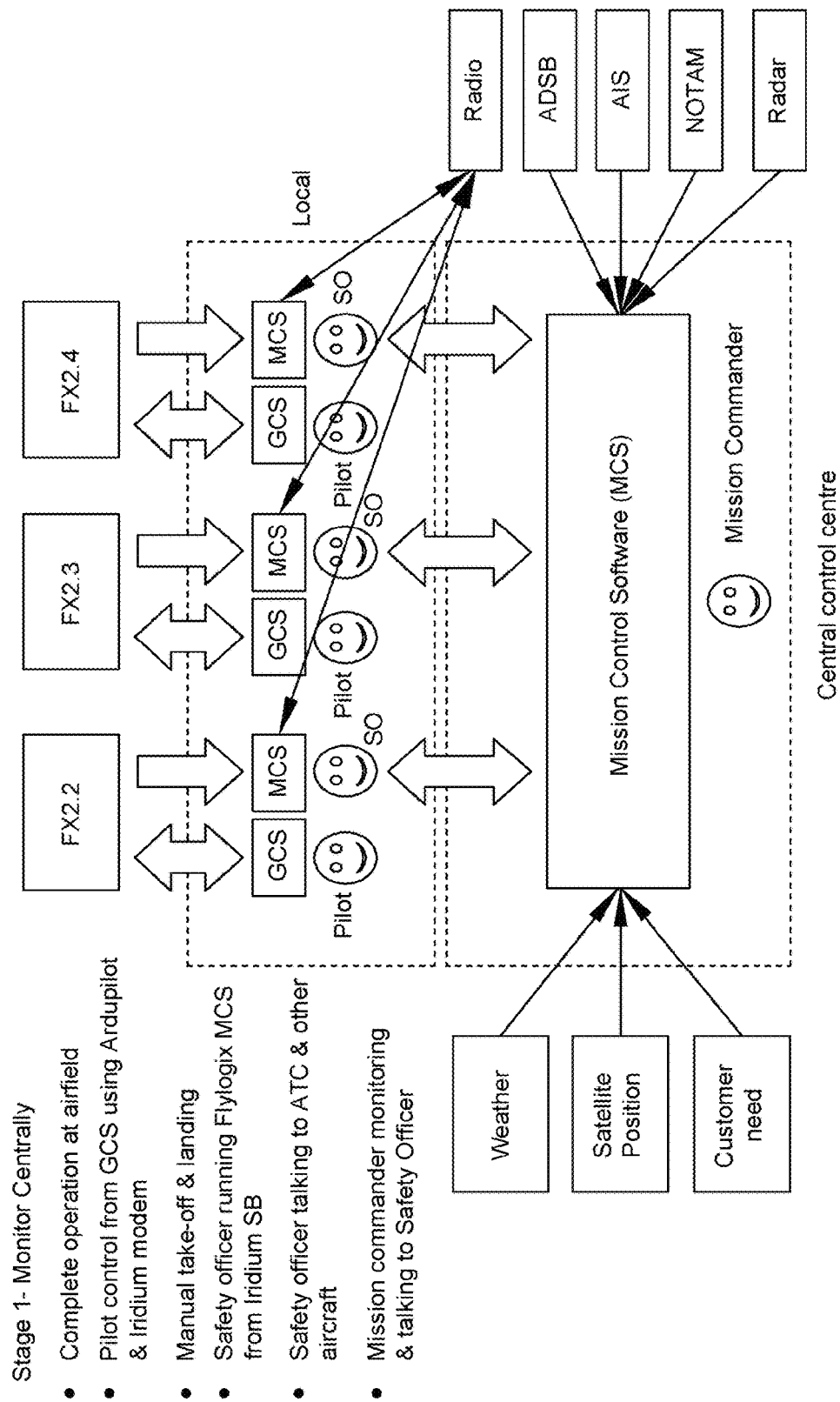
FIG. 6 shows an example in which, at a central control centre, the mission control software is under the command of a mission commander.

An example is shown in FIG. 6, where FX2.n are the code names for the Flylogix aircraft, SO is a Safety Officer, and GCS are Ground Control Stations.

In an example (e.g. when we have defined a suitable location for repeated operations), we may replace the vehicle (e.g. van) with an intermodal container (often called a "shipping container" or an "ISO container") which may be fitted out to the same spec as the vehicle (e.g. van). Only the pilot and safety officer need to travel to perform the missions.

Figure 7:
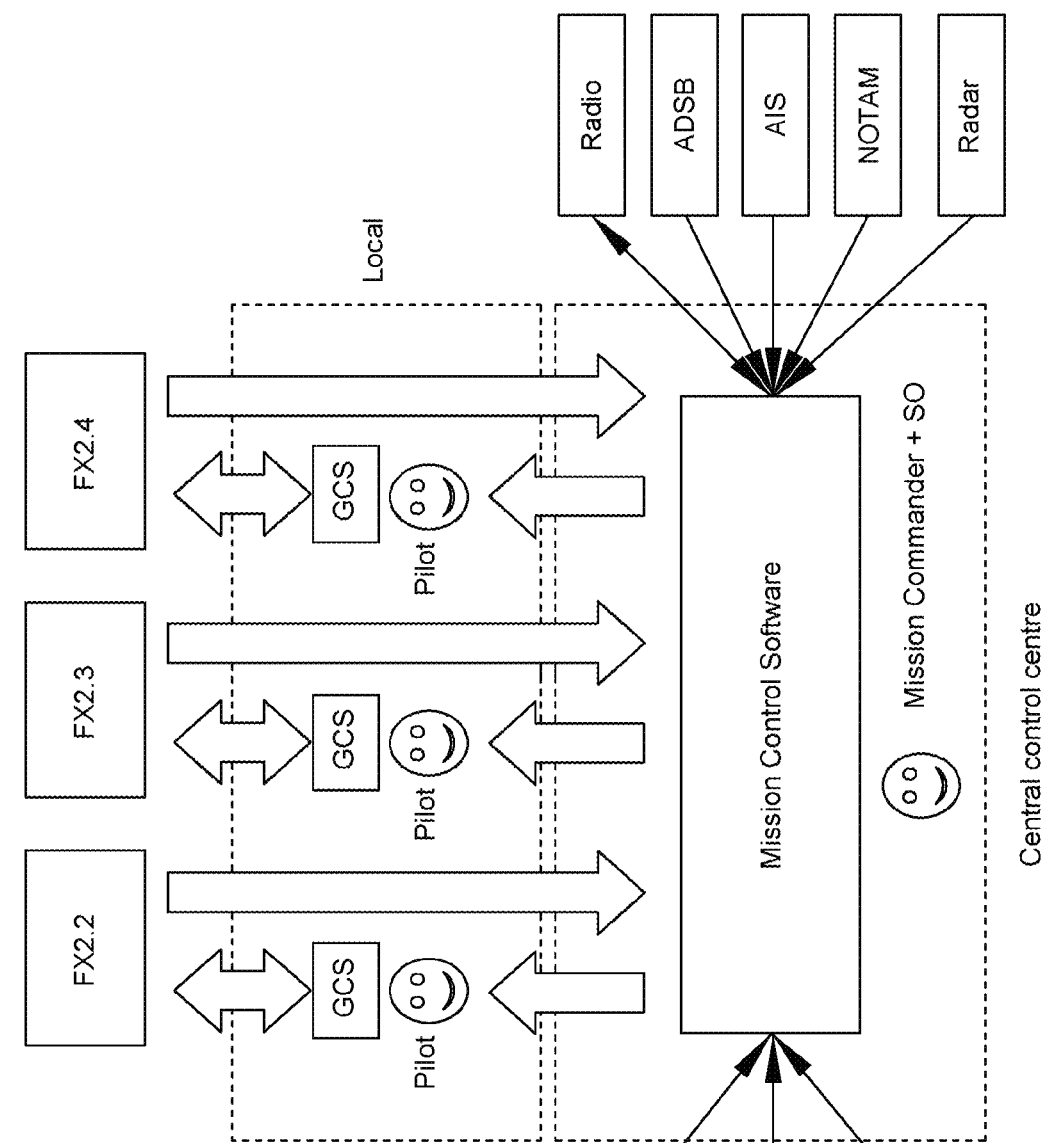
FIG. 7 shows an example in which the Safety Officer is at Mission Control and acts as a Mission Commander, managing multiple operations.

Command and Control architecture focusing on efficient (e.g. low cost) scaling of the operation FIG. 7 shows an example of scaling the operation in terms of critical assets such as the pilot and safety officer—both of whom take many years to train and are hard to find. A step is to bring the Safety Officer back to Mission Control and act as a Mission Commander, managing multiple operations as shown for example in FIG. 7.

A typical scenario for the proposed arrangement is now described.
1. Local pilot carries out pre-flight checks and completes electronic record.
2. Mission control centre prepares mission over WiFi/cellular (e.g. 2G, 3G, 4G, 5G, LTE)/low-power RF link, establishes satellite link, seeks ATC clearance, and asks the pilot to take off
3. Local pilot takes off and hands over to central control centre (pilot now free to do other tasks).
4. Central control centre runs mission, talk to ATC and local asset.
5. Local pilot takes over from central control centre and lands aircraft.
6. Local pilot completes post-flight checks and completes electronic record.

In an example, at a central control centre, the mission control software is under the command of a mission commander and a safety officer, where the mission commander may be the safety officer. In an example, a Pilot & GCS are at an airfield. In an example, pilot control is from GCS using Ardupilot & Iridium modem. In an example, assisted take-off & landing is provided. In an example, the Mission Commander is running Flylogix MCS from Iridium SB. In an example, the Mission Commander is talking to ATC & other aircraft. In an example, a Safety Officer is monitoring & talking to pilot. In an example, the mission control software (MCS) receives input from one or more of: weather reporting, from satellite positioning, and from customer need. In an example, the mission control software receives input from one or more of: radio, ADSB, AIS, NOTAM and radar. In an example, a pilot system at a GCS is in communication with an unmanned aircraft, and the unmanned aircraft sends data to the MCS.

Figure 8:
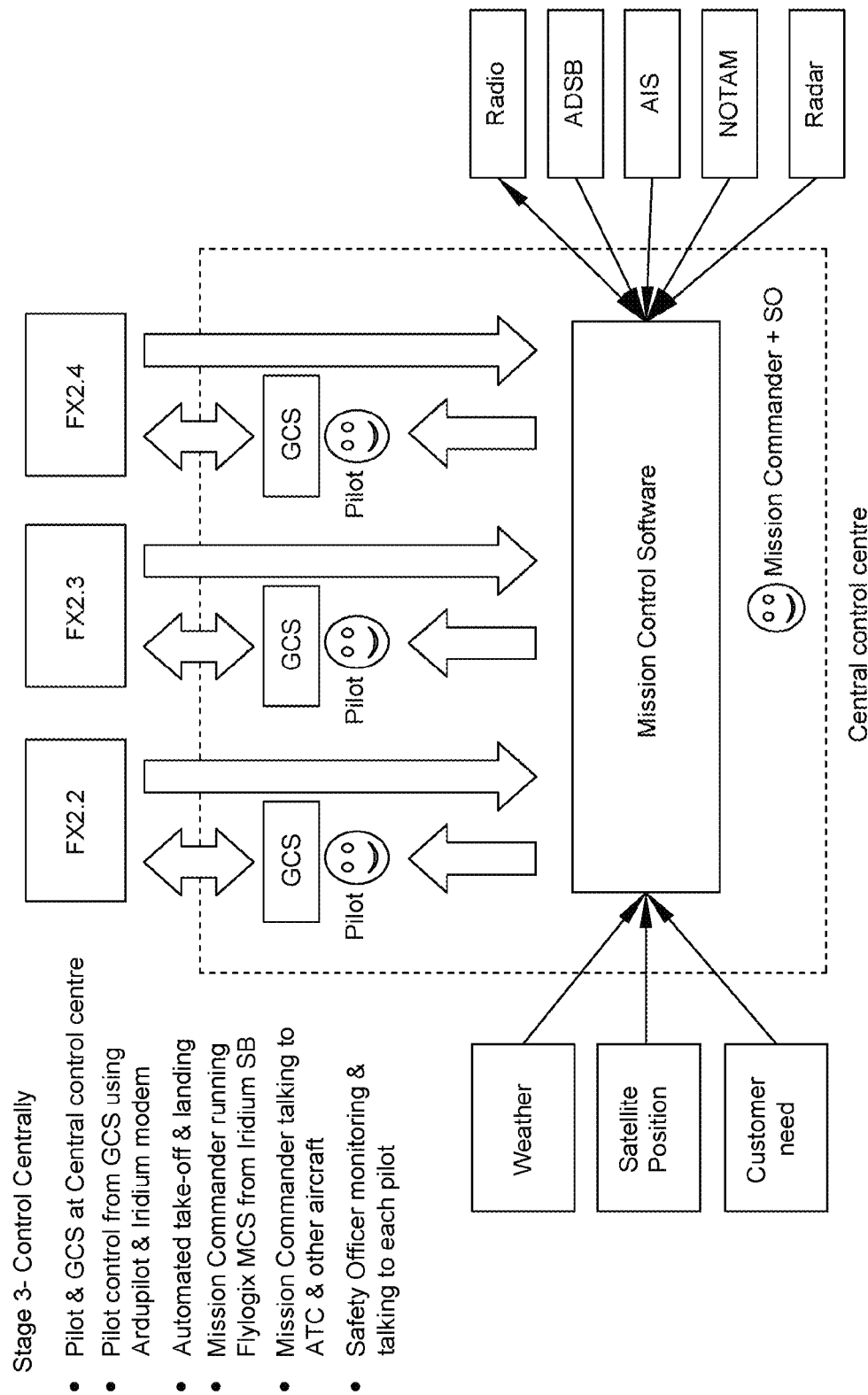
FIG. 8 shows an example in which the pilots are at the central control centre, and in which the entire operation is run centrally.

A further step is to move the Pilots to the central control centre, and to run the entire operation centrally as shown for example in FIG. 8.

In an example, at a central control centre, the mission control software is under the command of a mission commander and a safety officer, where the mission commander may be the safety officer. In an example, a Pilot & GCS are at the central control centre. In an example, pilot control is from GCS using Ardupilot & Iridium modem. In an example, automated take-off & landing is provided. In an example, the Mission Commander is running Flylogix MCS from Iridium SB. In an example, the Mission Commander is talking to ATC & other aircraft. In an example, a Safety Officer is monitoring & talking to each pilot. In an example, the mission control software (MCS) receives input from one or more of: weather reporting, from satellite positioning, and from customer need. In an example, the mission control software receives input from one or more of: radio, ADSB, AIS, NOTAM and radar. In an example, a pilot system at the central control centre is in communication with an unmanned aircraft, and the unmanned aircraft sends data to the MCS.

Intelligent On-Board Data Broker

Figure 9:
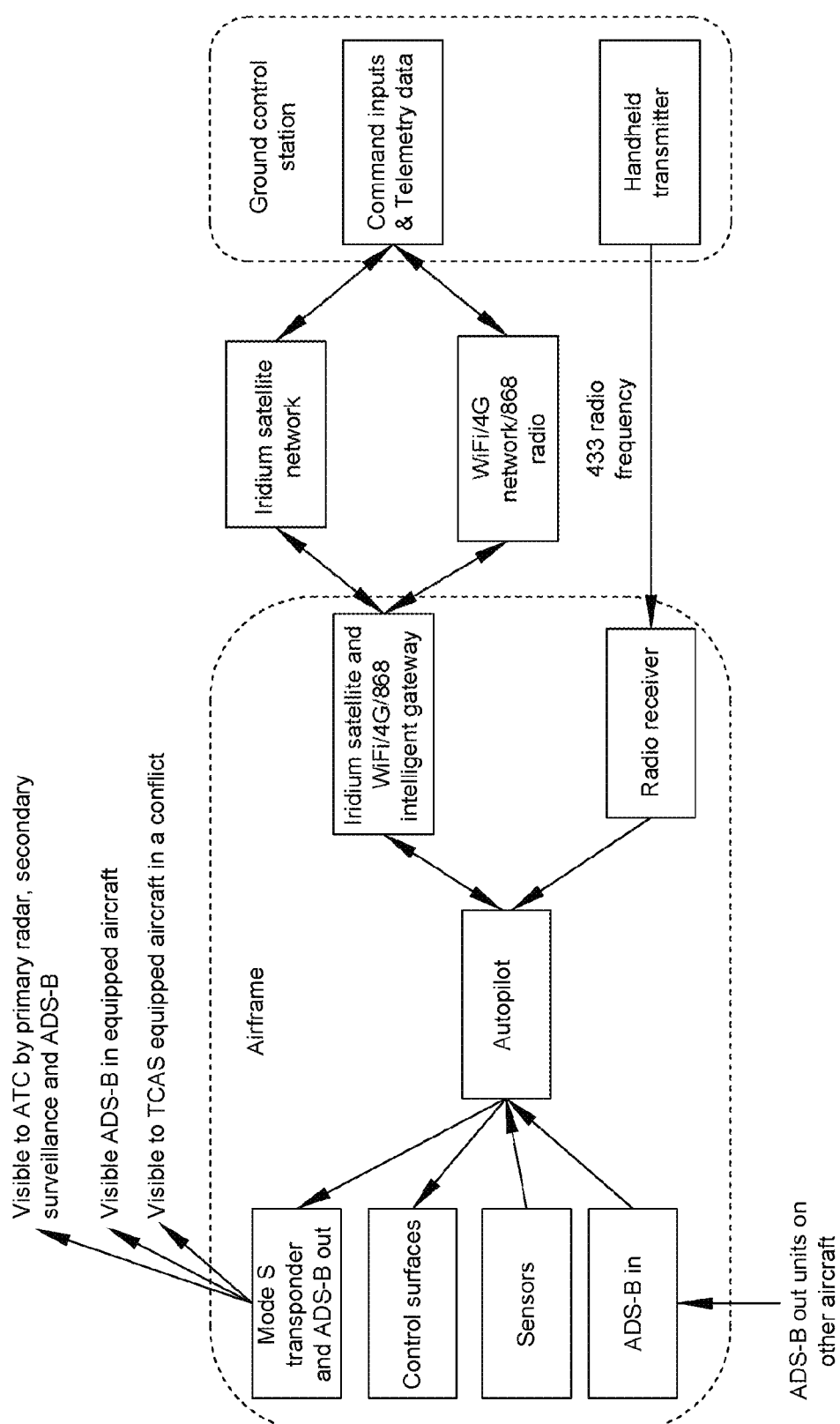
FIG. 9 shows an example of how the intelligent gateway may manage the communications links to and from the aircraft in real time.

FIG. 9 shows an example of how the intelligent gateway may manage the communications links to and from the aircraft in real time. In FIG. 9, '433' represents 433 MHz, and '868' represents 868 MHz.

In an airframe there may be provided one or more of: an autopilot, which may be in communication with a Mode-S transponder and ADS-B out, control surfaces, and which may receive input from sensors and ABS-B in, which receives input from ABS-B out units on other aircraft; the autopilot may be in communication with Iridium satellite and WiFi/cellular (e.g. 2G, 3G, 4G, 5G, LTE)/868 intelligent gateway; the autopilot may be in communication with a radio receiver. The mode-S transponder and ADS-B out may be visible to ATC by primary radar, secondary surveillance and ADS-B. The mode-S transponder and ADS-B out may be visible to ADS-B in equipped aircraft. The mode-S transponder and ADS-B out may be visible to TCAS equipped aircraft in a conflict. The iridium satellite and WiFi/cellular (e.g. 2G, 3G, 4G, 5G, LTE)/868 intelligent gateway may be in communication with an iridium satellite network and/or WiFi/cellular (e.g. 2G, 3G, 4G, 5G, LTE) network/868 radio.

At a ground control station, there may be provided command inputs and telemetry data; there may be provided a handheld transmitter. The command inputs and telemetry data may be in communication with the Iridium satellite network and/or the WiFi/cellular (e.g. 2G, 3G, 4G, 5G, LTE) network/868 radio. The handheld transmitter may be in communication with the radio receiver of the airframe, e.g. using 433 radio frequency. Here, '433' represents 433 MHz, and '868' represents 868 MHz.

Of importance to the gateway is an intelligent data broker that looks at the available connections (e.g. SatComms, cellular (e.g. 2G, 3G, 4G, 5G, LTE), WiFi, low-power RF) it has available, and uses a multi-objective cost function to determine the appropriate link to send the data over. A cost function for each packet of data could be, for example:

Route(t)=arg min$\{J\_SatComms, J\_4G, J\_WiFi, J\_RF\}$, subject to the latency <critical time (e.g. 10 s), where $J\_\{xx\}$=cost per data throughput in £/kByte, or in $/kByte. A cost term may also be included in the cost function in relation to energy consumed, which changes with distance for each link. A cost term may also be included in relation to the Round-Trip Time (RTT) of each link.

The multi-objective cost function has an infinite number of optimal solutions and so we set a policy for the mission that sets the level of risk vs the cost (reward) for the optimizer. For example, if the policy is set to be high-risk (e.g. take-off/landing/rescue) then the optimiser may or will choose the path independent of cost (e.g. use all available). For example, if the policy is set to lowrisk then the optimiser may or will avoid the use of SatComms.

Communication with ATC Using VoIP

Figure 10:
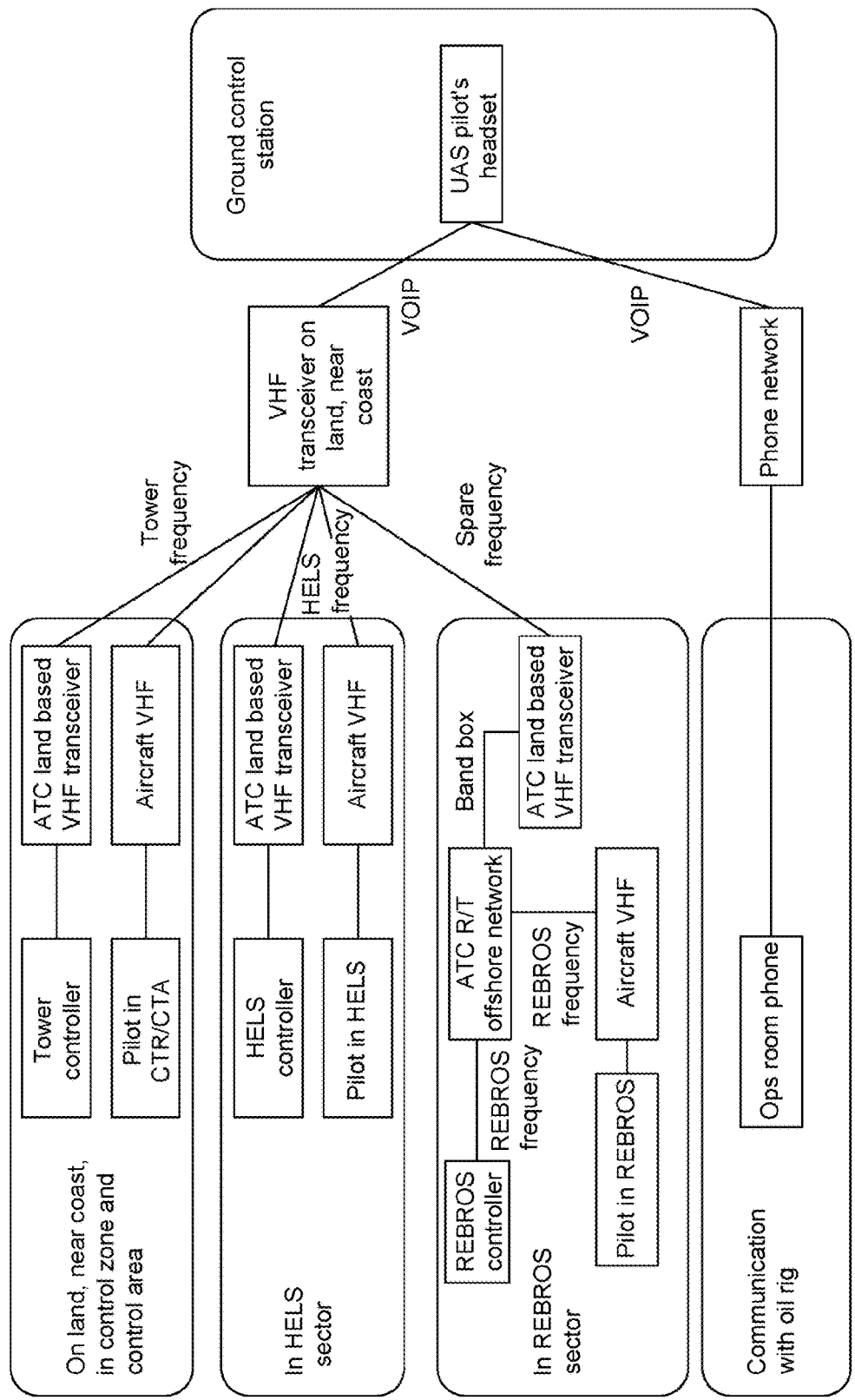
FIG. 10 shows an example of our Voice over Internet Protocol (VOIP), Radio over Internet Protocol (ROIP) solution to coordinating with ATC and the offshore asset.

ATC need to provide services to deconflict the air traffic and an example of our Radio over Internet Protocol (ROIP)/Voice over Internet Protocol (VOIP) solution to coordinating with ATC and the offshore asset is shown in FIG. 10.

We provide a VHF transceiver (e.g. situated on land, near to the coast, e.g. near Aberdeen, UK) that is situated near the ATC and which connects to the local ATC radio communications infrastructure so that the UAS pilot is fully aware of all the air traffic information in the various sectors (e.g. ATC, first area (e.g. HELS) and second area (e.g. REBROS)), and can respond to ATC and individual pilot requests in real time.

In an example, on land, near the coast, in a control zone and control area, there is provided a tower controller in communication with ATC land-based VHF transceiver. In an example, there is provided a pilot in CTR/CTA in communication with aircraft VHF. The ATC land-based VHF transceiver and the aircraft VHF communicate at a tower frequency with a VHF transceiver on land, near coast.

In an example, in first area sector, there is provided a first area controller in communication with ATC land-based VHF transceiver. In an example, there is provided a pilot in the first area in communication with aircraft VHF. The ATC land-based VHF transceiver and the aircraft VHF communicate at a first area frequency with a VHF transceiver on land, near coast.

In an example, in a second area sector, there is provided a second area controller in communication with ATC R/T offshore network at a second area frequency; the ATC R/T offshore network communicates via band box with ATC land-based VHF transceiver. The ATC R/T offshore network may also communicate with an aircraft VHF at a second area frequency; the aircraft VHF is in communication with pilot in second area. The ATC land-based VHF transceiver communicates on a spare frequency with a VHF transceiver on land, near coast.

The VHF transceiver on land, near coast may communicate with UAS pilot's headset, by ROIP/VOIP, where the UAS pilot's headset is part of the ground control station. The UAS pilot's headset may communicate by ROIP/VOIP with a phone network. The phone network may communicate with an operations (ops) phone room, in a communication with an offshore installation (e.g. oil rig).

Estimation of Aircraft Position

Having full knowledge of our aircraft position at all time is very important (e.g. it is critical) to make tactical decisions and we have an enhanced Estimation of Position module to factor in:

Last known position from either satellite or EC
Last known course and heading therefore showing where aircraft could be
Weather uncertainty on cross track error
Impact of satellite position downloaded from North American Aerospace Defense Command (NORAD) and then modelled for satellite elevation
Create estimated uncertainty on position.

Overall System Risk Driven Operation

An aspect of the invention is probabilistic management of risk. Our approach to reducing the cost of Beyond Visual Line of Sight (BVLOS) operation is to manage the system risk and in an example we do it including two main ways: by managing the operation in phases and by using a probabilistic framework.

An objective is to reduce the risk of mid-air collision (e.g. to < a predetermined value) and ground impact (e.g. to < a predetermined value). This makes the Command and Control (C2) system the certified piece of equipment and allows Flylogix to maintain an uncertified airframe as it assumes probability of failure of the airframe is higher than a certified aircraft. This in turn enables the aircraft to be low cost. This same probabilistic approach allows the C2 link to manage lower performance in a lower cost way.

In the user interface, overlay of acceptable proximity to threats (other aircraft from ADS-B and other boats from AIS) is shown as a buffer zone around them. Clearly indicate to the pilot whether they can carry on mission or need to turn away. Interact with autopilot to move aircraft away in case of unexpected behaviour. Low risk routes are identified, e.g. offline, prior to the mission. A route may be modified when the unmanned aerial vehicle (UAV) is flying, to reduce the risk profile. A visual interface may be provided, including overlays showing risk interaction, e.g. showing where ships/planes/roads etc are as well as prediction on where UAV will be in the future.

A Risk Determiner may be situated at a ground-based control centre and can be run offline to route an operation safely, and also run in real-time to help make any adjustments to the route to lower the operation risk as the situation unfolds. The Risk Determiner can also help set the Policy for the multi-objective optimiser running on the RPA (e.g. the optimiser selects the appropriate comms channels to trade cost against risk level and power usage etc.). For example, near take-off and landing the policy might be "be safe" and in transit it might be "save money". The policy can be set up ahead of time in each waypoint e.g. waypoint 1: policy="safe", which remains until it is updated in at a later waypoint (e.g. waypoint 5): policy="save money" etc.

Reducing Cost by Dividing the Mission into Distinct Phases Based on Risk

Figure 11:
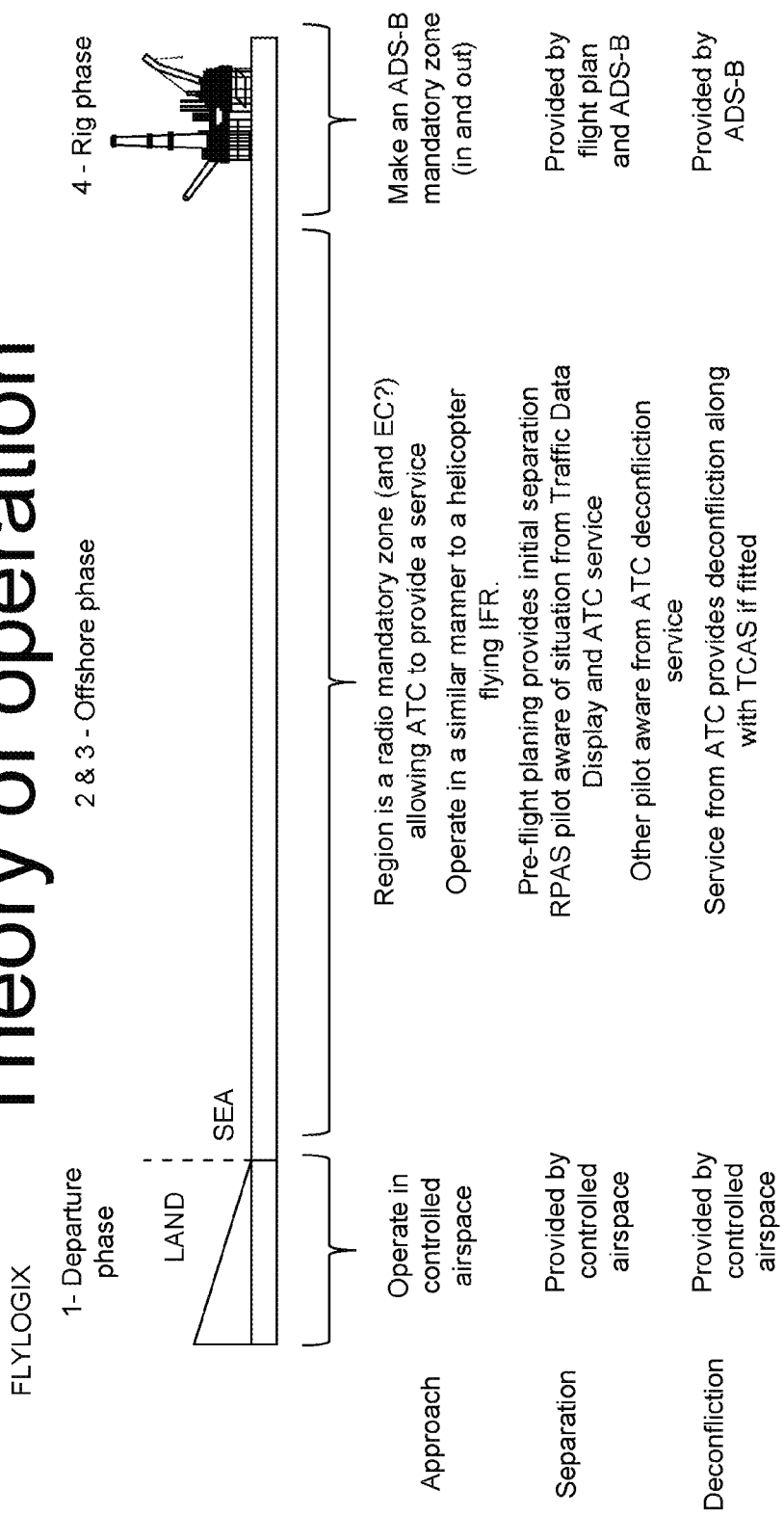
FIG. 11 shows an example of operation of an individual mission which is divided into phases that carry differing levels of risk.

The operation of an individual mission can be divided into phases that carry differing levels of risk, as highlighted for example in FIG. 11.

0. Ground Preparation (Low Risk)

High bandwidth link to upload mission or download post mission data. Best served by generic standard like WiFi/cellular (e.g. 2G, 3G, 4G, 5G, LTE)/low-power RF. Latency not an issue as none of this is time critical. VoIP/cellular (e.g. 2G, 3G, 4G, 5G, LTE) also used to provide voice connectivity between pilot and central control.

1. Departure Phase—Take-Off and Landing (High Risk)

Local pilot uses high bandwidth, low latency, connection such as 2.4 GHz or low power 868 MHz to take-off and land aircraft. No requirement for over the horizon communications. By employing and a Fly-by-Wire (FBW) stabilising controller on the aircraft and e.g. {air speed, heading, rate-of-climb}, it is envisaged that a less experienced pilot can perform these tasks.

In other examples, the pilot is located at a central control centre, and take-off and landing conducted by the pilot remotely using (Instrument Landing System) ILS-type display and the FBW stabilising controller with {air speed, heading, rate-of-climb} setpoints being sent via cellular (e.g. 2G, 3G, 4G, 5G, LTE) low-power RF and satellite link allowing the pilot to maintain control with much higher latency links e.g. <5 s. See section below on Command and Control using high latency links.

In an example, the approach is to operate in a controlled air space. In an example, the separation is provided by controlled airspace. In an example, deconfliction is provided by controlled air space.

2. In VLOS Transit (Medium Risk)

The initial transit over land out to sea where the pilot has visibility of the aircraft. Risk is higher due to higher density of assets and other aircraft.

Detailed mission already uploaded to autopilot in stage 0, limiting data requirement to re-tasking aircraft.

All high bandwidth flight control being conducted by autopilot removing requirement to have control in <20 ms latency. However the remote pilot remains in command at all times. There may be some latency in instructions (<10 s) which is acceptable as this is less than decision making period of commander.

Pilot sees probabilistic representation of aircraft position that incorporates last known position and potential position based on last course and heading so is always aware of the impact of latency on his position relative to other aircraft and ships (and other ground threats). This is supplemented by position reported with Electronic Conspicuity (EC) that may be more recent.

Autopilot has a set of automated responses (guards) that kick in if communication is interrupted for longer than, say, 10 s. This could be modified in response to EC and AIS (Automatic Identification System) data: e.g. Return-to-Home if nothing more than x km away. Hold position if closer.

Connectivity allows this to be conducted at airfield or from central control centre. In an example, the approach is: the region is a radio mandatory zone (possibly including EC), allowing ATC to provide a service, and to operate in a similar manner to a helicopter flying Instrument flight rules (IFR). In an example, the separation is provided by pre-flight planning providing initial separation, the Remotely Piloted Aircraft Systems (RPAS) pilot is aware of the situation from Traffic Data Display and ATC service, and other pilots are aware from ATC deconfliction service. In an example, deconfliction is provided by service from ATC, along with traffic collision avoidance system (TCAS) if fitted.

3. In BVLOS Transit (Low Risk)

Same as VLOS transit but now way out over the ocean. Risk relatively low as operating within a defined corridor as per flight plan/TDA.

4. At Objective (High Risk)

At the objective, there are three options:

- If maintaining distance from the asset, then continue in the same mode as 3 (BVLOS Transit). This is clear to central control from probabilistic representation of position with EC.
- If the asset has enhanced WiFi cellular (e.g. 2G, 3G, 4G, 5G, LTE)/low-power RF connectivity then exploit to lower latency of command link and enable reduced uncertainty and closer operation.
- Use autopilot to geofence fixed or moving assets to prevent aircraft approaching too closely and enable closer safe operations.

In an example, the approach is to make this an ADS-B mandatory zone, in and out. In an example, the separation is provided by the flight plan and ADS-B. In an example, the deconfliction is provided by ADS-B.

Command and Control Using High Latency Links

In order to bring back the piloting operation to a central command and control, there is a significant technical challenge to deal with the high latency and non-deterministic delay data links which one gets when using Ethernet-based Broadband links where the latencies can be up to 5 seconds. No one can fly a UAV safely with latencies >~100 ms and usually a pilot would be uncomfortable with latencies >20 ms. To deal with this there is provided a nested approach of a fast local stabilising FBW controller on the UAV and a slower GPS (or other satellite-based position receiver)-based autopilot, to control the UAV during the high latency periods such that the pilot is only sending corrective commands to the aircraft to achieve the desired course, and the autopilot is checking and bounding the UAV so as not to go outside of expected path 'corridor' or into marked unsafe zones i.e. the corridor can be seen as a safety constraint and can make use of LIDAR (or RADAR or SONAR) distance to ground measurements to avoid hitting the ground when landing.

So the control of the aircraft is effectively divided into 3 frequency bands so that they don't 'fight' one another, with the pilot dictating the course of the UAV:

- High frequency: aircraft FBW stabilising control
- Med frequency: pilot controls deviations to define intended direction
- Low frequency & constraints: GPS (or other satellite-based position receiver) and LIDAR (or RADAR or SONAR) based autopilot bounds deviations to safe absolute limits.

Probabilistic Determination of Risk

Figure 12:
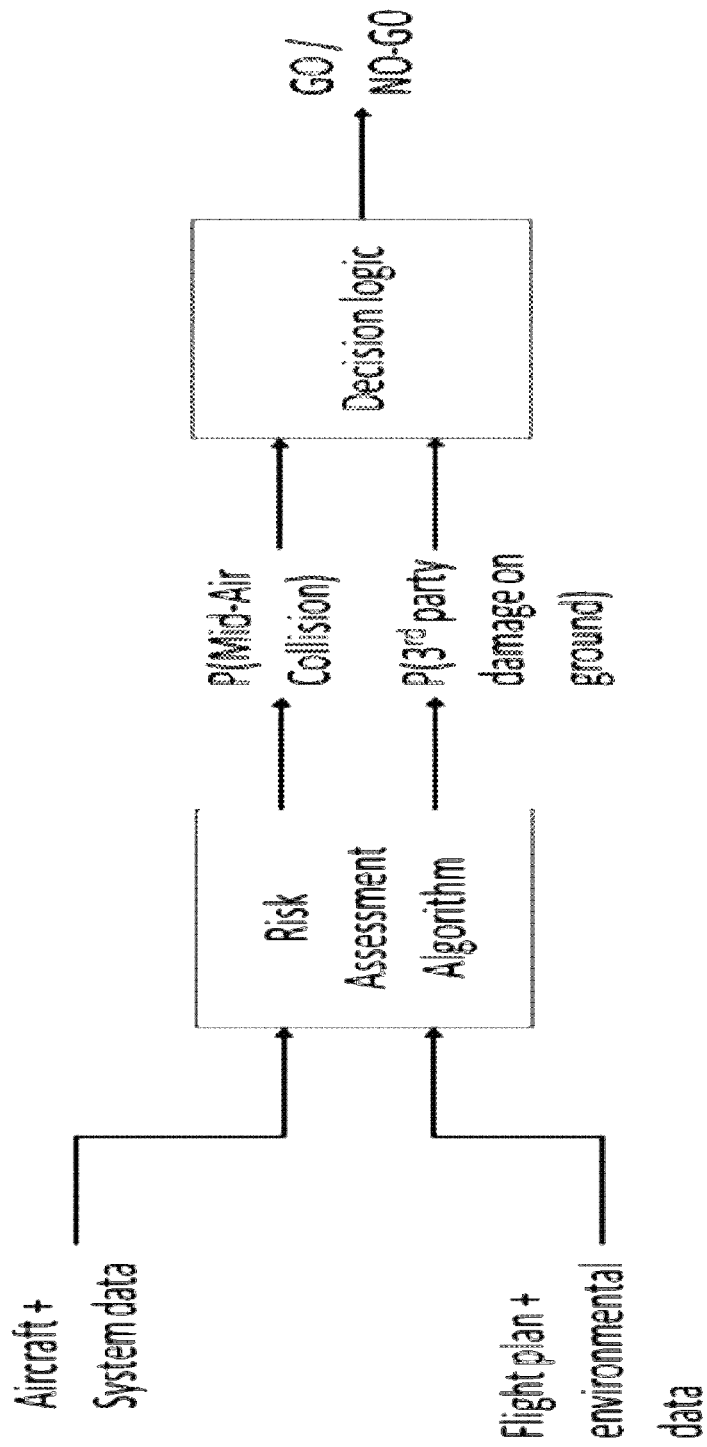
FIG. 12 shows an example of a probabilistic determination of risk.

In an example of probabilistic determination of risk, aircraft+system data are input, and flight plan+environmental data are input, the inputs being fed to a risk assessment algorithm. The risk assessment algorithm determines the probabilities P(Mid-Air Collision) and P($3^{rd}$ party Damage on Ground). P(Mid-Air Collision) and P($3^{rd}$ party Damage on Ground) are fed into a Decision logic, which generates a GO or NO-GO decision. An example is given in FIG. 12.

In an example, a safety case may be determined by two key factors: P($3^{rd}$ party Damage on Ground(DoG)) and P(Mid-Air Collision(MAC)) where P($3^{rd}$ party DoG)=P(getting near ground) o Energy when near ground o N(people/assets on ground)

P(MAC)=P(getting on a collision course) o P(not noticing and not acting in time)

Note: 'o' is an operator that incorporates dependent and independent probabilities.

Probabilistic Risk Assessment Algorithm

This takes in input about the aircraft design and data about the systems that operate it, as well as the candidate Flight Plan and environmental data to determine a probabilistic assessment of risk of Mid-Air Collision (MAC) and risk of $3^{rd}$ party Damage on Ground (DoG).

Factors Affecting Mid-Air Collision

The prime driver for MAC is two or more aircraft coming close to each other, and the general principle is that this is primarily related to:

1. Traffic Density i.e. probability of MAC is $O(N^2)$ where N is number of aircraft within a defined airspace. This is usually achieved by the air space class—ranging from a Temporary Danger Area (TDA) to Class A-F managed airspace and to unmanaged airspace (General Aviation), which dictate the maximum traffic density, and 2. Awareness at distance reduces the chance of MAC as P(MAC) is $O((1-Pd)*N^2)$ where Pd is the probability of detecting the other aircraft in vicinity, which can be achieved by many solutions such as:

- Electronic Conspicuity (EC)—which sends out positional data to ATC/other aircraft in vicinity
- Air Traffic Control (ATC)/Un-manned Traffic Management (UTM)— which give both guidance and/or images to pilot to avoid MAC
- Communications—primarily Radio between pilots and pilot to ATC etc.
- Rules—these dictate separation and behaviours in case of near approaches
- Traffic Collision Avoidance System (TCAS)— automated advisory system to pilots to help avoid MACs
- Visibility—strobes, colour, time of day, weather conditions 3. Ability to avoid is important as the detection time must be sufficient to perform an avoiding manoeuvre i.e. working out the trajectory of the other aircraft, and this modifies the P(MAC) to $O((1-Pd*Pa)*N^2)$ where Pa is the probability of avoiding, and this can be quite low ~0.39-0.56.

Research has indicated that 'see & avoid' is effective between 39% and 56% of the time. E.g. J W Andrews "Unalerted air-to-air Visual Acquisition" MIT Project Report ATC-152 (1991).

Collision Risk scales as $(1-P)*N^2$.

P is between 0.39 to 0.56, which is large in this context.

N, the traffic density, is the dominant factor.

The "Big Sky Principle" is remarkably good.

Factors affecting $3^{rd}$ party damage on ground

The conditions that dictate the probability of $3^{rd}$ party damage on ground are:

Getting close to the ground—should not be flying low (e.g. <100 ft).

Proximity to people and sensitive assets—O(N^2) rule again.

Impact energy—O(m*v^2), where m is mass and v is velocity.

Containment—preventing further injury (latent energy stored e.g. fuel, batteries)

1. Get near ground i.e. avoid low level flying and try to maintain altitude control of aircraft when not in control. When assessing the probability of getting near the ground, the following factors are considered:

The structural integrity of the aircraft, including
        propulsion system
        control surfaces
        autopilot
        communications
        redundancy in flight surfaces and controls
    The weather conditions
        Probability of heavy Rain/hail/snow
        Probability of extreme events such as dust, tornados, storms
        Probability of lightning strikes
    Location of High terrain/Tall structures
        turbulence
    Migratory bird paths/Known bat colonies/Insect swarms 2. Near people/assets i.e. probability is O(N^2) where N is total number of assets and people close to aircraft. Consideration is given to:

Flight path—planned and dynamic updates based on changing conditions/information
    Area surrounding flight path—complex terrain, local wind effects
    Sensing—tracking assets/people
    Re-routing in real-time to reduce N at all times
    Planning 'safe ditch' locations and trajectories 3. Energy at Impact is largely determined by the kinetic energy which is ~m*v^2 and thus the aircraft ground speed before impact is critical, followed by its mass (strictly this should be the energy density i.e. energy per m^2). Considerations are:

Ground speed
    Cruise speed
    Stall speed
    Terminal velocity of the airframe
    Planned altitude
    Total Mass
    Aircraft structure
        Crumple zones
    Energy reduction measures when near ground
        Parachute
        Flaps
        Fuel jettison
        Turn into wind 4. Containment i.e. the risks after impact. These are important as a crash tends to draw people in closer to investigate, and the latent energy after impact can escape from its containment and release all the stored energy in explosions. Factors are therefore:

Structural integrity surrounding energy stores
    Energy stored (active mass and fuel type) in fuel
    Energy stored (active mass and battery type) in batteries
    Manual/Automatic jettison of fuel/batteries over area where N small (e.g. at sea)
    Energy density of impact—dispersion methods
    Location of crash—ideally at sea.

Figure 13:
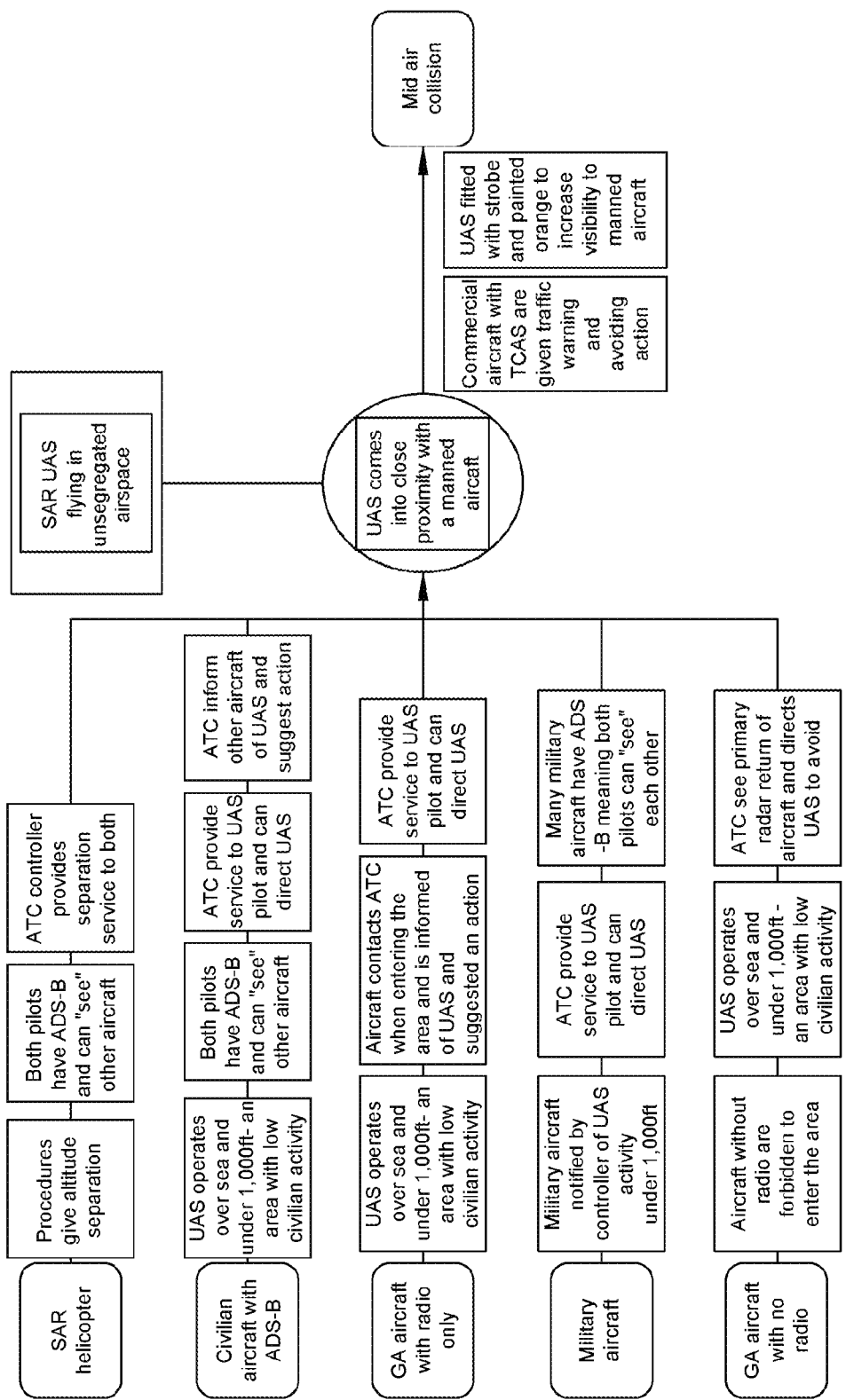
FIG. 13 shows an example in which for Search and Rescue (SAR) UAS the safety case is based on the Bow-tie diagram for Probability of Mid-air Collision.
Figure 14:
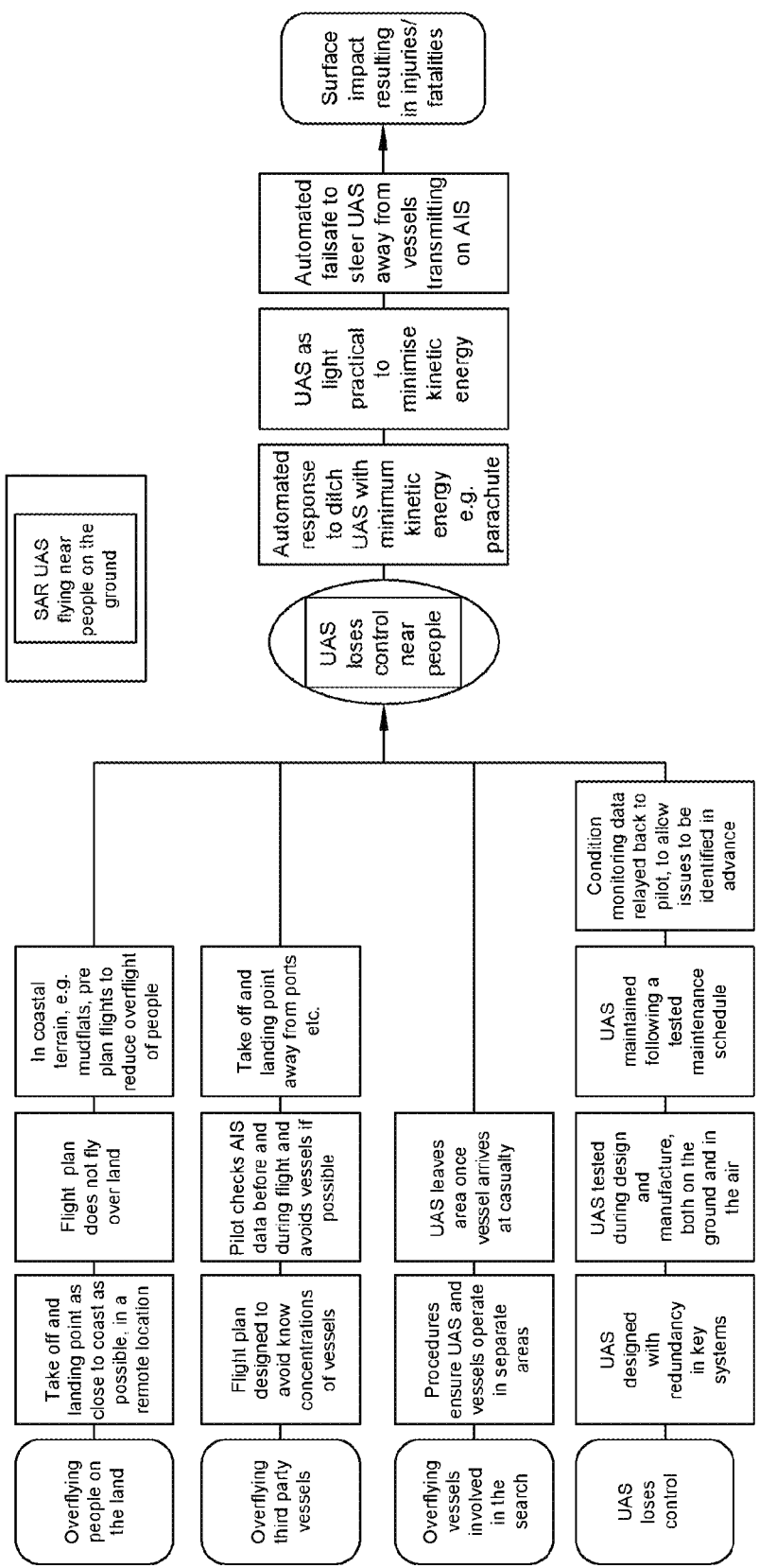
FIG. 14 shows an example in which for Search and Rescue (SAR) UAS the safety case is based on the Bow-tie diagram for Probability of Damage to $3^{rd}$ party.

Example: For Search and Rescue (SAR) UAS the safety case is based on the Bow-tie diagrams of FIG. 13 and FIG. 14 for Probability of Mid-air Collision and Probability of Damage to $3^{rd}$ party.

To start with, there is no pilot in a UAS so probability of injuring person and crew is 0 (i.e. much better than using a helicopter). This is important but does not affect P(MAC) or P(3rd party DoG).

So our approach is to take each leg of the Bow-tie models and characterise the distributions associated with the probability of occurring. We can then combine them using analytic expressions if they exist or by simulation if not. The resulting probabilities of MAC and 3rd party DoG can then be tested under different scenarios e.g. if we have time to set up a TDA, what is the effect i.e. we would expect the P(MAC) to reduce significantly because N→0.

We can also test more intelligent routing for P(3rd party DoG) to keep N=0 as much as possible, and reduce the times where N>0, and avoid locations where N>Nmax (2 say).

Decision Logic

The decision to accept or not accept the mission is made by the Decision Logic block which takes in the P(MAC) and P(3rd party DoG) to give the final output. This could be as simple as thresholds on acceptable P(MAC) and P(3rd party DoG) for a single typical mission.

However, to make the decision robust, or it is more typically made by running multiple scenarios testing the edge cases as well as the nominal case before giving the final decision.

These edge cases can be those given by safety case requirements and/or by sampling from distributions of the unknown variables in the overall system, e.g. position estimation variance, numbers of people at certain critical locations, likelihood of the computer autopilot to fail etc.

Mission Control UI

Figure 15:
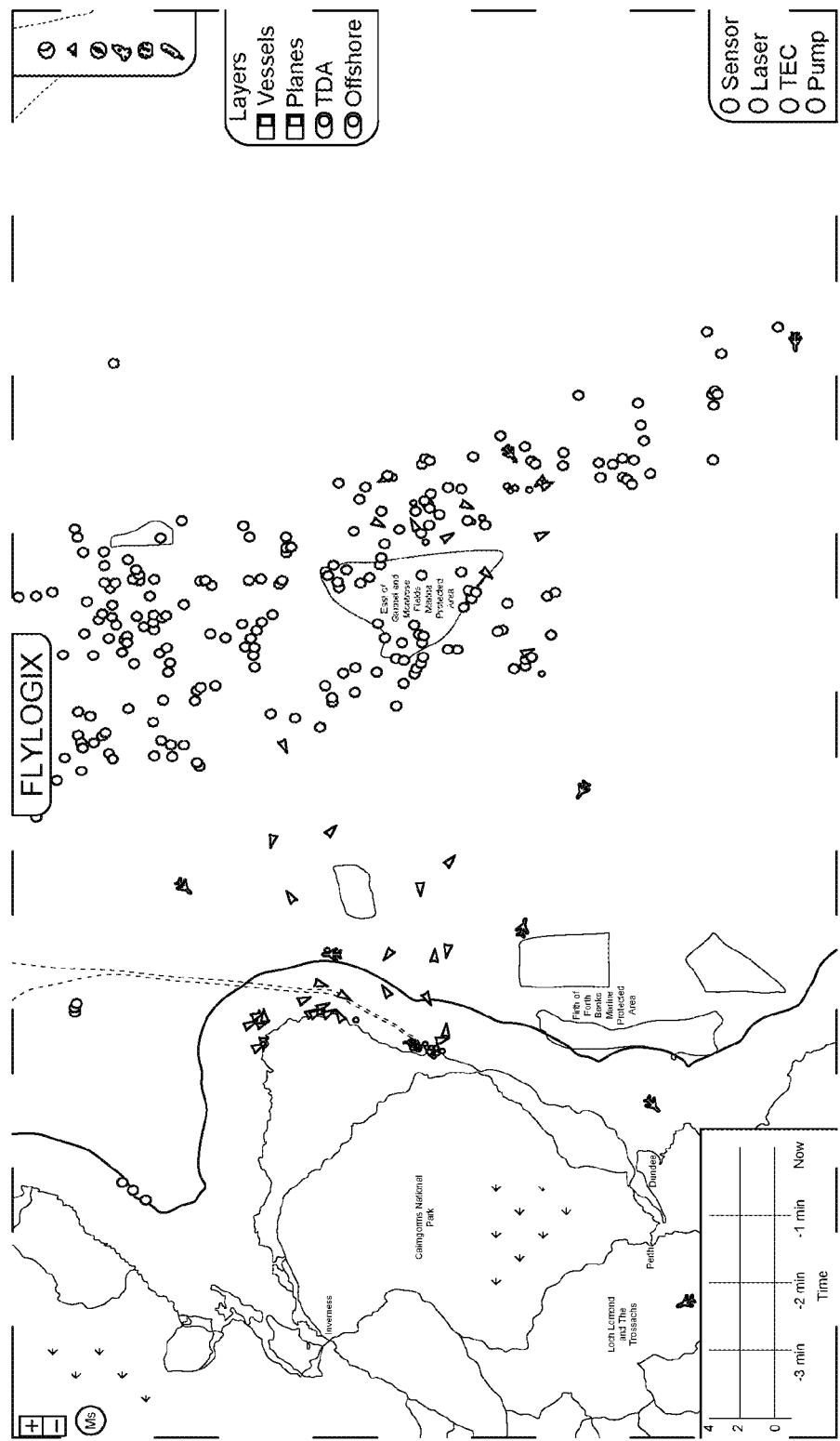
FIG. 15 shows a typical user interface that allows the user to select various overlays to better understand the unfolding situation without being distracted by information overload.

FIG. 15 shows a typical user interface that allows the user to select various overlays to better understand the unfolding situation without being distracted by information overload.

Real-Time Monitors for Anomalies in UAS Condition

It is well known that level 3 and level 4 autonomous systems tend to give control to the human when the situation is bad and without enough time for the human to process in order to avoid disaster.

In an example, we run anomaly detection algorithms on-board the UAS that sample the data at high rate to flag (in a robust way) that the system is not operating as expected. The high rate data allows us to be more confident that there is a problem earlier than if we were to process the low rate data after transmission to the mission control centre.

The algorithms do not necessarily tell what is wrong but are intended to flag up early that something is not quite right and needs investigating and potentially a decision to abort the mission is made.

Other Services

Tactical Operation Using UHF Video Link

We have developed an analogue video link to give high quality real-time video display. This allows the mission controller to make tactical decisions in real-time. We believe that our approach is quite unique in the following ways:

we use lower fidelity analogue video for tactical purposes and use the high resolution (360 deg) digital cameras to log locally and then download this video data later.
    the analogue video system uses Video Diversity Switch (VSDU) which employs 2 frequency channels and hops between them to choose the best signal at each point in time.

additionally, our analogue video system tends to fail in a more graceful way than digital systems that use the same bandwidth, and thus the range of our system is much higher than others in practice.

we use Circular Polarization Antennae, which solve the phase shifting problems associated with operating RF equipment from an aircraft.

Collection of Data from Remote Assets

We believe that using our UAS to fly around a remote asset and gathering the data from it using a local cellular (e.g. 2G, 3G, 4G, 5G, LTE)/WiFi network and then flying back to base and then offloading to the customer's servers, is unique and potentially valuable to e.g. offshore drilling operations which are very remote and thus don't have good high-bandwidth connections to offload the many gigabytes of drilling and seismic data (which is very useful for updating the geological models used to control the whole drilling procedure and ensure integrity of the well etc.).

Summary of Key Aspects of Invention

Key aspects of the invention that enable low cost operation may include:

One centrally located mission commander communicating to Air Traffic Control (ATC).

Use of overlays in the user interface to present the most relevant data to the Safety Officer.

Use of internationally available WiFi/cellular (e.g. 2G, 3G, 4G, 5G, LTE) low-power RF and Satellite communications links, reducing the need for permitting of high-power RF or unlicensed bands.

Use of high bandwidth services when at highest risk areas (take-off/landing and near the asset).

Use of intelligent on-board data broker/optimiser to decide which communications channel to use based on channel costs and latency requirements.

Use of stabilising controller on board aircraft to allow remote control by pilot from a central location, or by a less experienced pilot locally.

Use of GPS (or other satellite-based position receiver) and LIDAR (or RADAR or SONAR) sensors to prevent UAS going into unsafe areas such as the asset or the ground when using centralised control.

Use of online condition monitoring to detect anomalies/issues and flag to Safety Officer/Pilot in a timely way.

Each pilot can manage more than one aircraft from central location by scheduling take-off/landings and asset manoeuvres so as not to overlap.

Use of novel RF-based analogue dual frequency video link to give the pilot FPV, and/or enable eyes-in-the sky for clients.

VoIP transceiver based near ATC and/or the remote Asset to maintain full communications with ATC and other aircraft being deconflicted by ATC.

An advantage of the invention is that centralizing control and use of unmanned aerial vehicle(s) enables a mission, or a plurality of missions, to be run, with reduced manpower, which reduces costs.

Applications for Efficient (e.g. Low Cost) Beyond Visual Line of Sight Unmanned Air Services Here we describe applications of efficient (e.g. low cost) unmanned air services beyond visual line of sight.

Approach and Measuring Patterns for Emissions Sensing

We have run a number of BVLOS flights to remote oil and gas assets to measure methane concentration and therefore calculate the overall emission of the asset. This is an important application. Methane is a greenhouse gas, hence measurement of its emission is important in understanding the world's changing climate. Measurement of methane may indicate a gas leak on an offshore installation, which could have adverse safety implications, e.g. risk of an explosion.

The Flight Path

Figure 16:
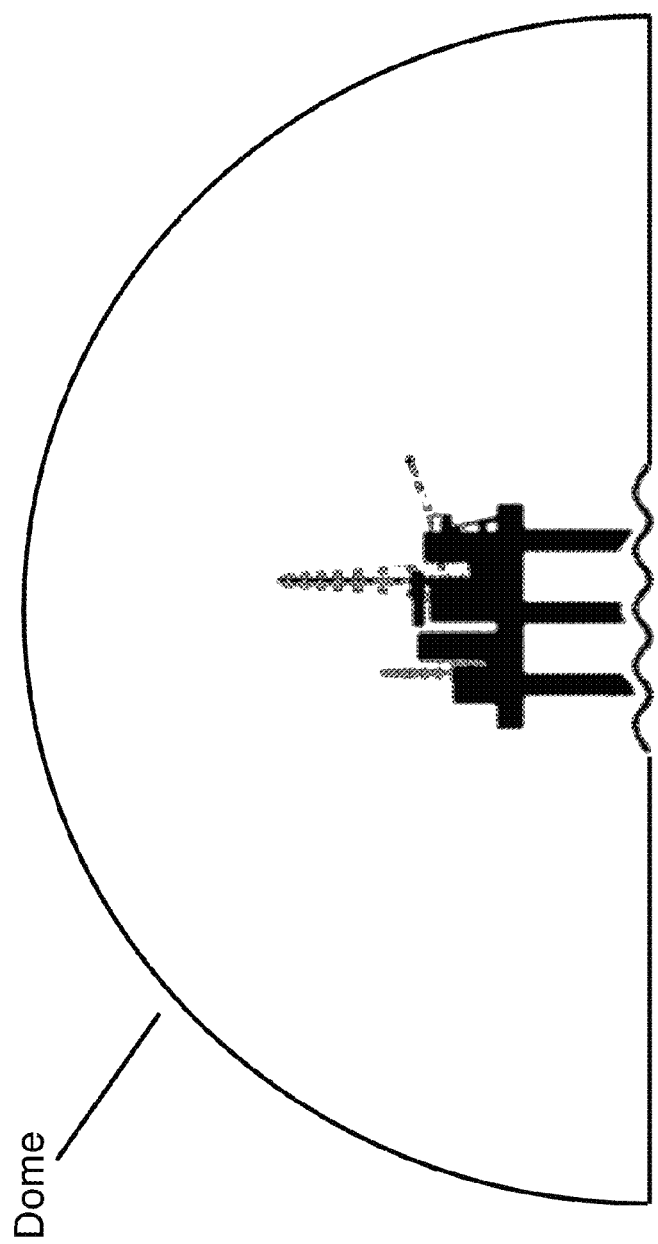
FIG. 16 shows an example of an ideal of concentration readings at every point on a dome surrounding the asset.

The methane sensor is a point sensor that measures the local concentration of methane. The ideal is to capture an instantaneous set of readings at every point on a complete dome surrounding the asset—see FIG. 16, for example. This encloses the asset in a complete perimeter that enables us to calculate all of the methane in and out of the enclosed space. Because the methane has a different buoyancy than the surrounding air, it is possible for cold releases to drop close to the sea surface and potentially escape below an incomplete dome or for hot methane to rise vertically from the asset and go out through a gap in the top of the dome. By combining these methane measurements with windspeed and direction (e.g. measured by the unmanned aircraft or on the asset) and comparing concentrations across the dome, the flow rate of gas from the asset can be calculated.

In reality there are a number of limitations that make the ideal data set above difficult to achieve:

1. It is not possible to take readings at every point at once using a sensor on a single aircraft.
2. Each oil and gas asset has a (e.g. 500 m) exclusion zone around it. Permission is required to enter this zone and activity here may interrupt other critical operations.
3. Overflying the asset increases the risk of hitting the asset in the event of loss of power on the aircraft or an error in altitude.
4. Flying close to the sea risks collision with waves or vessels due to altitude errors by both GPS (or other satellite-based position receiver) and barometric or large waves.

Figure 17:
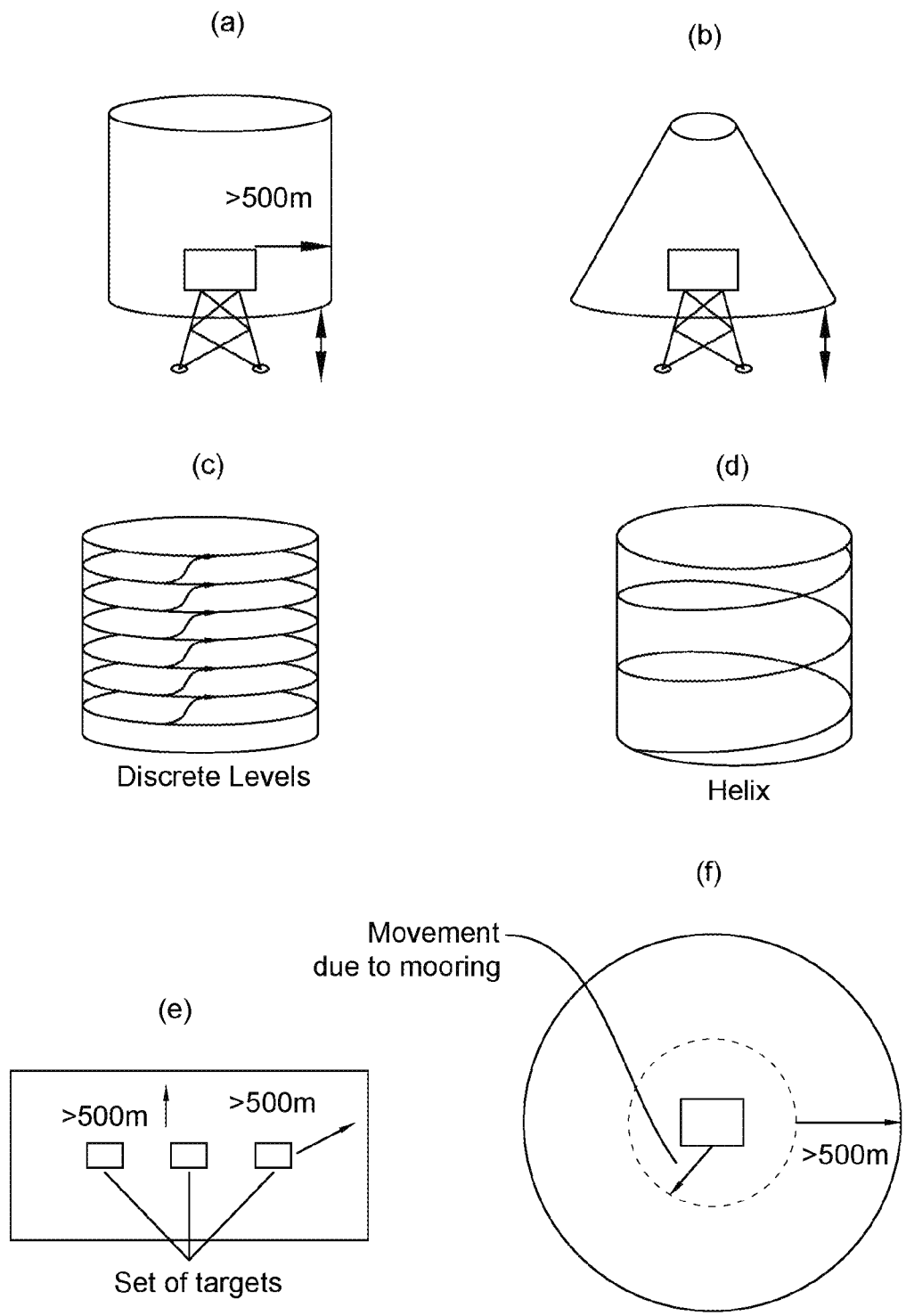
FIG. 17 shows diagrams of various example arrangements for methane detection.

Therefore we have identified two more practical compromises (e.g. see FIG. 17 for supporting diagrams):

A. We investigate over a tall cylinder that has a radius of just greater than 500 m and extends to close to sea level and then well above the height of the tallest features on the oil and gas asset (e.g. as shown in FIG. 17(*a*)). The lower level is set by error bars in altitude sensors, wave height and vessels.

B. We investigate over a cone shape that is greater than 500 m at its base and then tapers to less than 500 m above the height of the asset to still avoid direct overflight but reducing the height of the exit chimney (e.g. as shown in FIG. 17(*b*)) with similar lower restriction.

In each case the aircraft flies a series of circles at increasing or decreasing altitudes with short ascents or descents, respectively, to a new altitude (e.g. as shown in FIG. 17(*c*)). Alternatively, a more efficient but complex flight path is a continuous helix (e.g. as shown in FIG. 17(*d*)).

Figure 20:
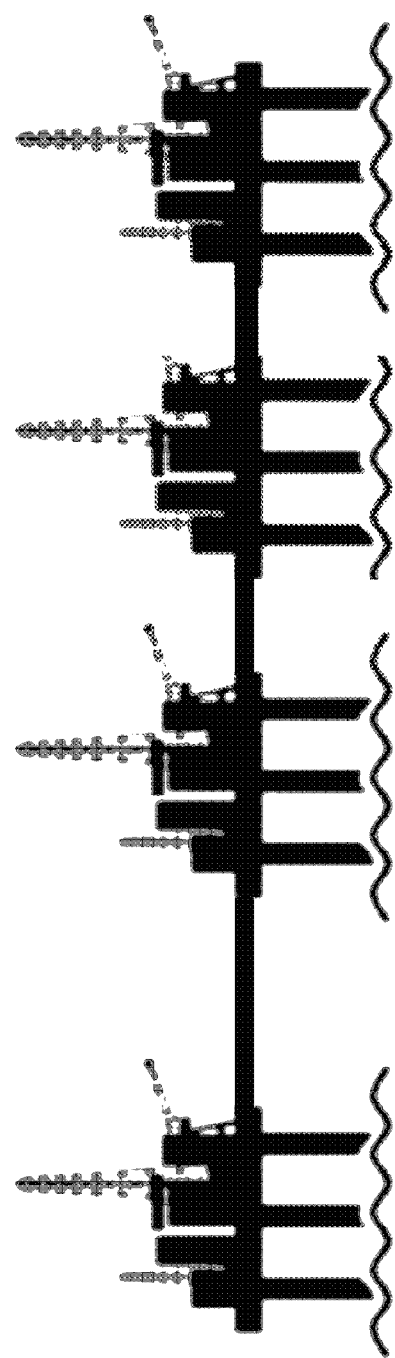
FIG. 20 shows an example in which an offshore structure is an amalgamation of several structures.

This approach makes sense when the asset is a single object that is fixed to the seabed and can be approximated to be a point. In practice many fixed offshore structures are an amalgamation of several structures and so are more complicated (see e.g. FIG. 20).

In that event, if the flight path remained circular and the flight had to maintain a minimum of 500 m from the set of targets, the cylinder would become very large. This would reduce accuracy (due to range) and increase flight duration. Therefore a more attractive route might be an oblong shape (i.e. a shape that is longer than it is wide) (e.g. as shown in FIG. 17(*e*)) or a stadium shape. The cone shape could similarly be adapted to a set of targets.

In many cases the offshore structure is floating. Structures like Spars and SemiSubs move on their moorings. This is typically 1% of water depth in normal conditions but can be as great as 10% of water depth in extreme events. As it is desirable for the unmanned system to maintain a known separation from the asset, then the distance from the nominal centre point of the asset must be increased to accommodate mooring movement (e.g. as shown in FIG. 17(f)). This can be refined with a knowledge of wind direction, tide and live feed from asset.

Figure 18:
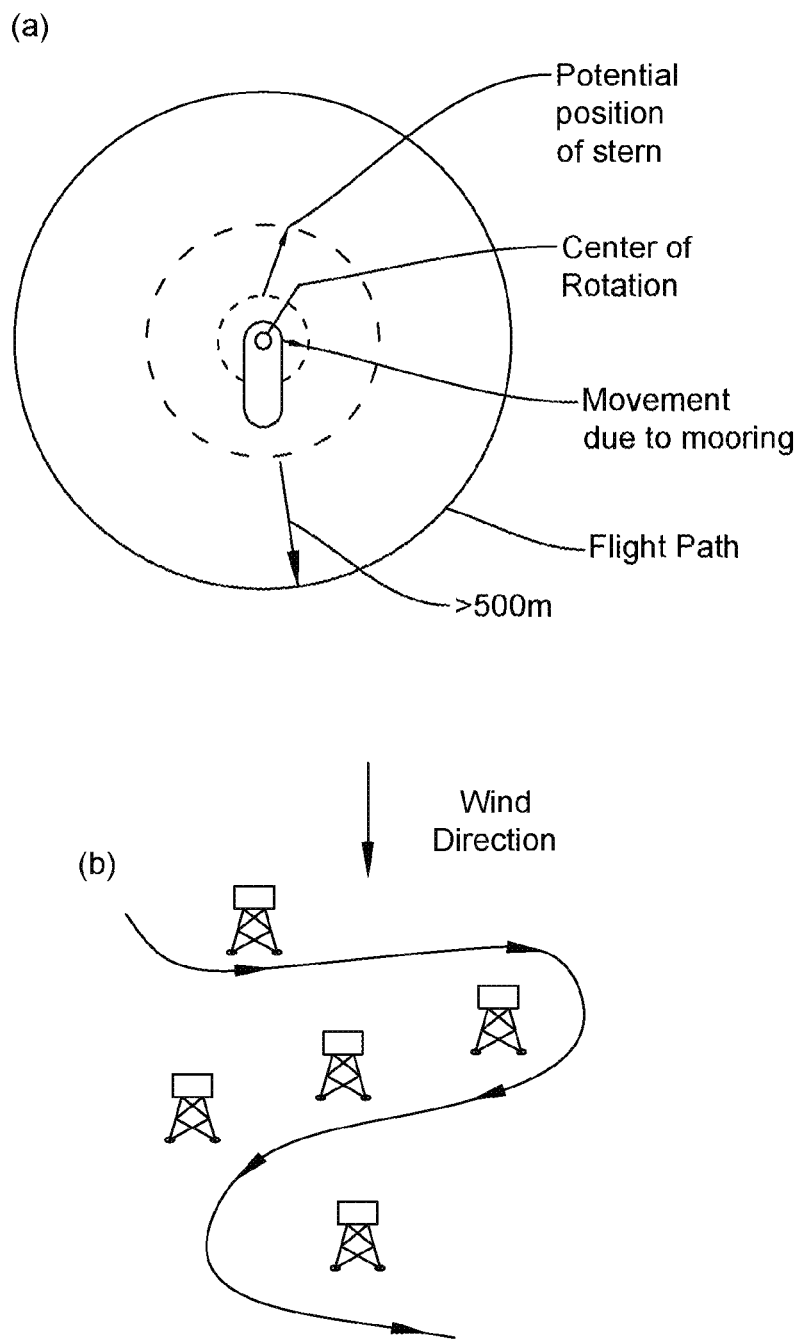
FIG. 18 shows further diagrams of example arrangements for methane detection.

In some cases moored structures are ship shaped and move around moored turrets. Their position is impacted by wind, waves and tides. The hull may extend out several hundred meters behind the centre of rotation which itself will be moving as it is moored. Again as shown for example in FIG. 18(a), this can describe a very large perimeter for the aircraft to investigate. Again a knowledge of weather and vessel heading can be used to optimize the investigation.

Many offshore structures are small unmanned assets with little methane emission in normal operation because they have very little process plant. It may be inefficient to complete a detailed survey of each of these smaller assets like above and so a triage approach can be adopted. The aircraft can fly a series of simple passes of multiple smaller assets to detect an emission signature and then only conduct a detailed survey of those with a significant emission. As shown for example in FIG. 18(b), the aircraft passes downwind of a number of smaller assets. It may complete a series of passes at different altitudes to compensate for buoyancy effects of methane but still it can cover far more assets in one flight in this way. If the flight path is selected to weave between assets it is possible to compensate for the effect of upstream assets. Ultimately this coarser technique can be stitched together to create a virtual emission map of a very large area.

This approach can be extended to moving emitters like commercial shipping where the aircraft flies a regular fixed route across a busy shipping channel and simply allows vessels to pass by. This is shown for example in FIG. 19(a). Again, if a particular vessel has a large signature the aircraft can fly a moving cylinder around it to obtain an accurate emission picture. This is shown for example in FIG. 19(b). This creates a virtual cylinder.

Figure 21:
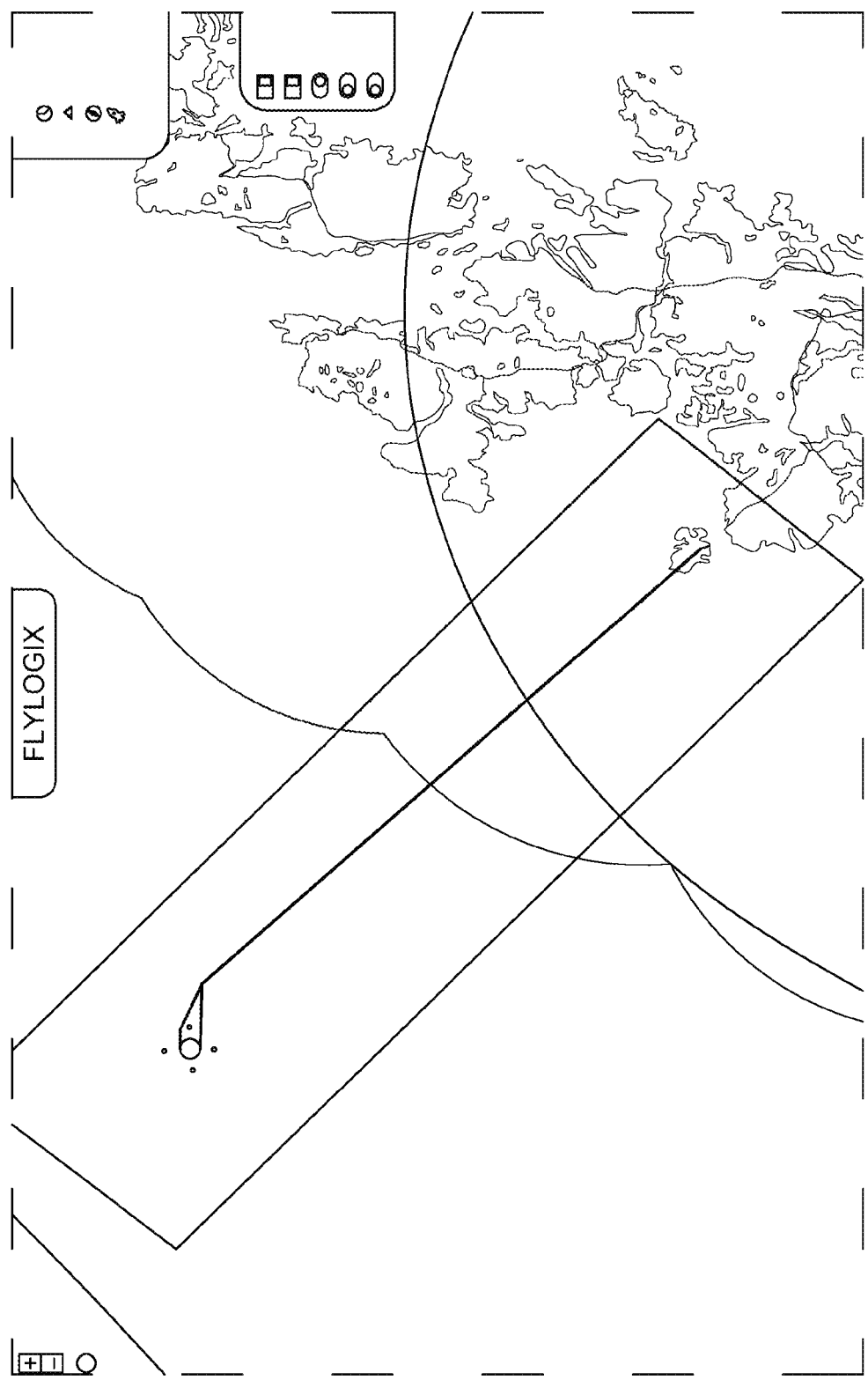
FIG. 21 shows an example of planning and simulating the route for the mission, in a planning tool screenshot.

The operation to an individual asset starts with planning and simulating the route for the mission, for example as shown in the planning tool screenshot in FIG. 21.

In case of communications failure to the RPAS, there can be programmed in a set of rally points to go to, where the RPAS choses the nearest—in that way it will not fly into the asset itself. In failsafe conditions the RPAS can be programmed to return home following a prescribed route (usually the same as the one it took out).

Figure 22:
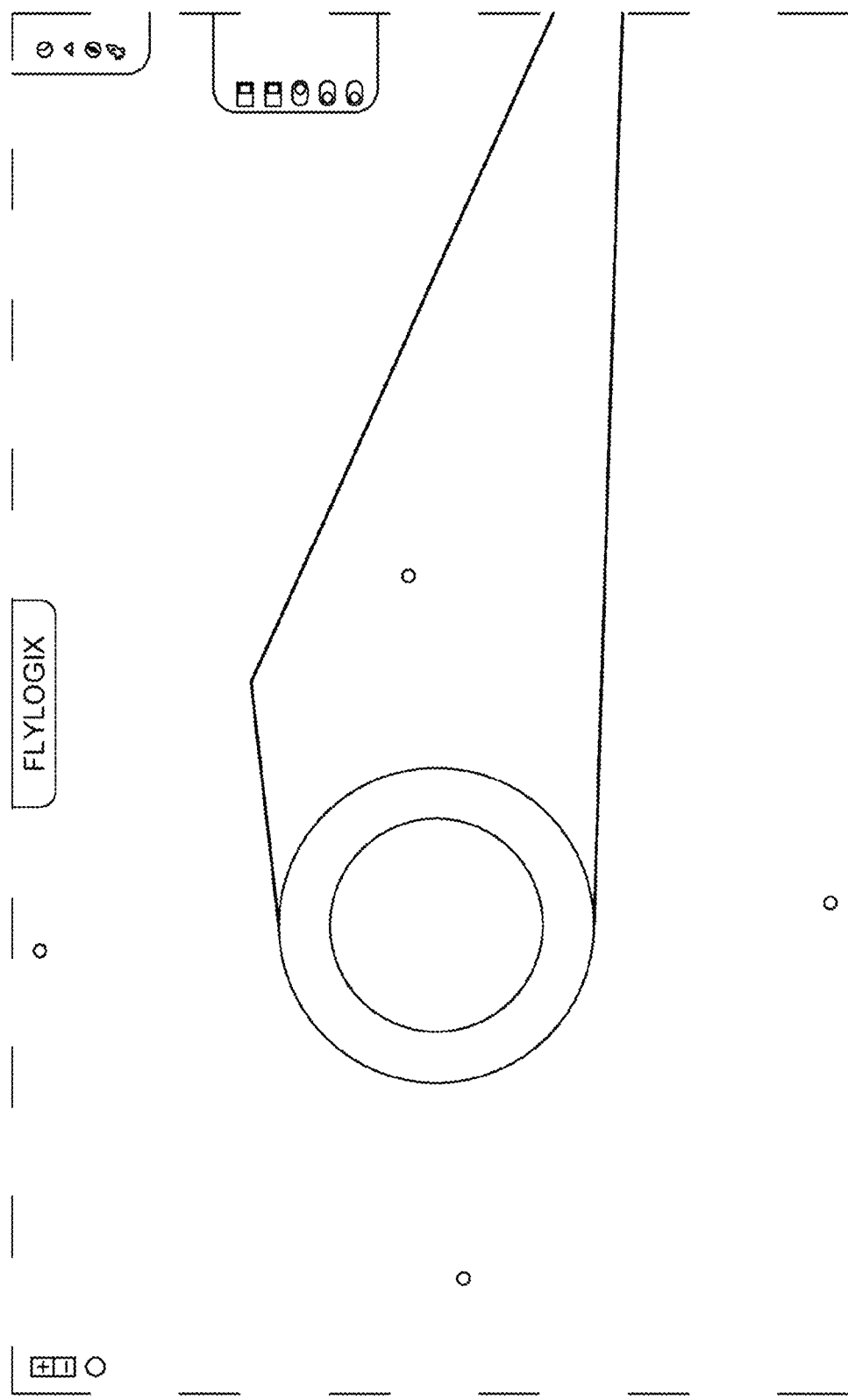
FIG. 22 shows an example including four rally points, and two concentric circles around the asset location.

FIG. 22 shows an example including four rally points, and two concentric circles around the asset location. The RPAS is programmed to start with the wider radius circle and then start its helical measurement pattern on the inner circle. An example helical measuring pattern is depicted in FIG. 17(d).

Figure 23:
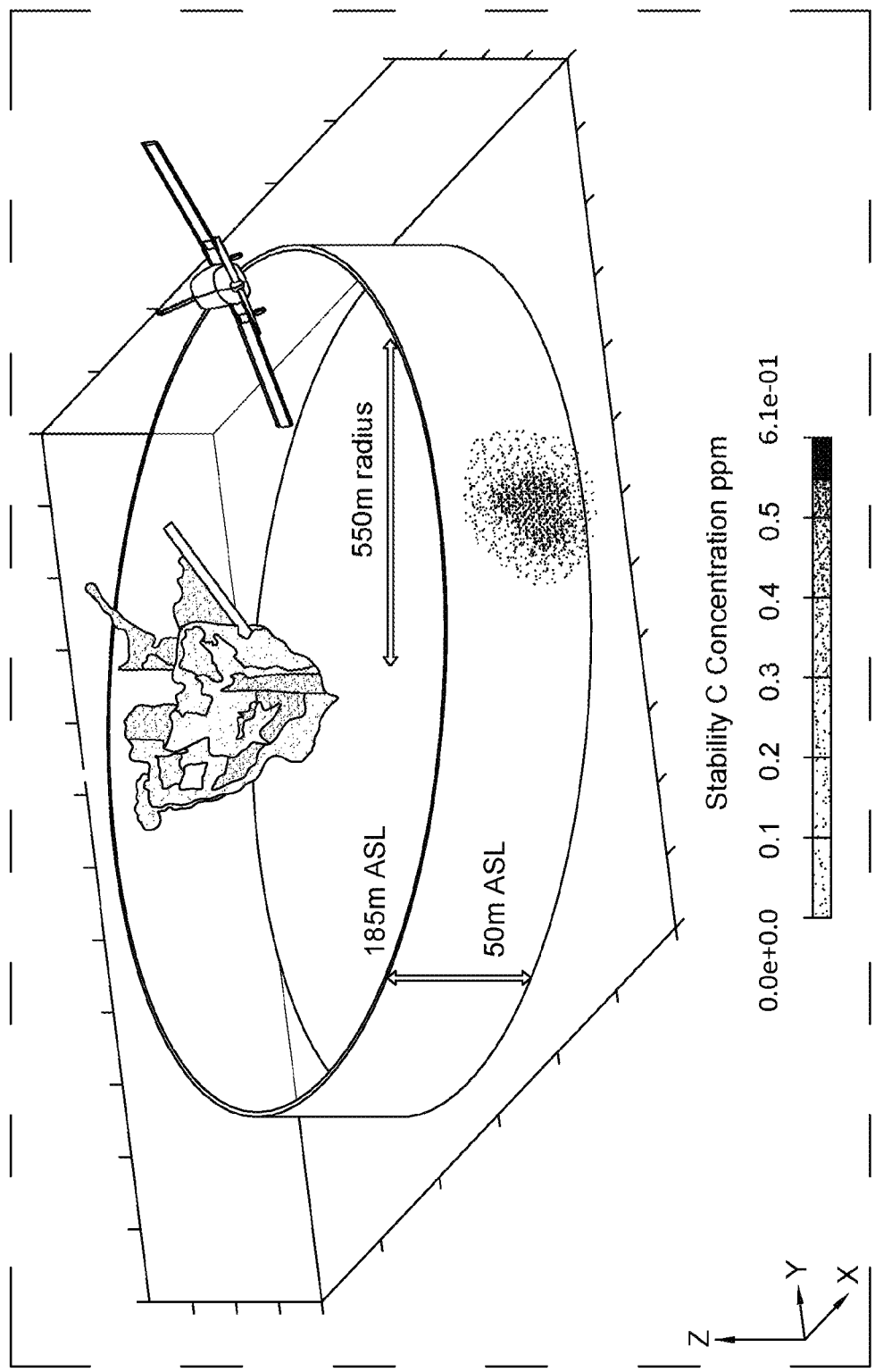
FIG. 23 shows a visualized example of methane detection using an unmanned aerial vehicle (UAV).

In an example, the methane level data is measured every few seconds. An example is visualised in FIG. 23.

We can use the difference in gases to help identify and pin-point what type of leak. For example excess methane with no CO2 implies cold vent. CO2 with methane implies incomplete combustion: say flare or turbine.

With a small modification of the sensor, a similar approach can be extended to measuring other gases, such as fluorinated gases (F-gases) (e.g. hydrofluorocarbons (HFCs), perfluorocarbons (PFCs), sulphur hexafluoride (SF6) or nitrogen trifluoride (NF3)), or NOx or SOx, for monitoring of remote assets.

Approach and Search Patterns for Search & Rescue (SAR)

The following sections give a series of Uses Cases that we have considered for performing typical Search and Rescue operations. They are based on real incidents in the past to give extra support.

Use Case 1

Location: Caernarvon Airport, North West Wales Using past incident data, Flylogix have identified a historical incident in which a SAR helicopter was mobilised.

Figure 24:
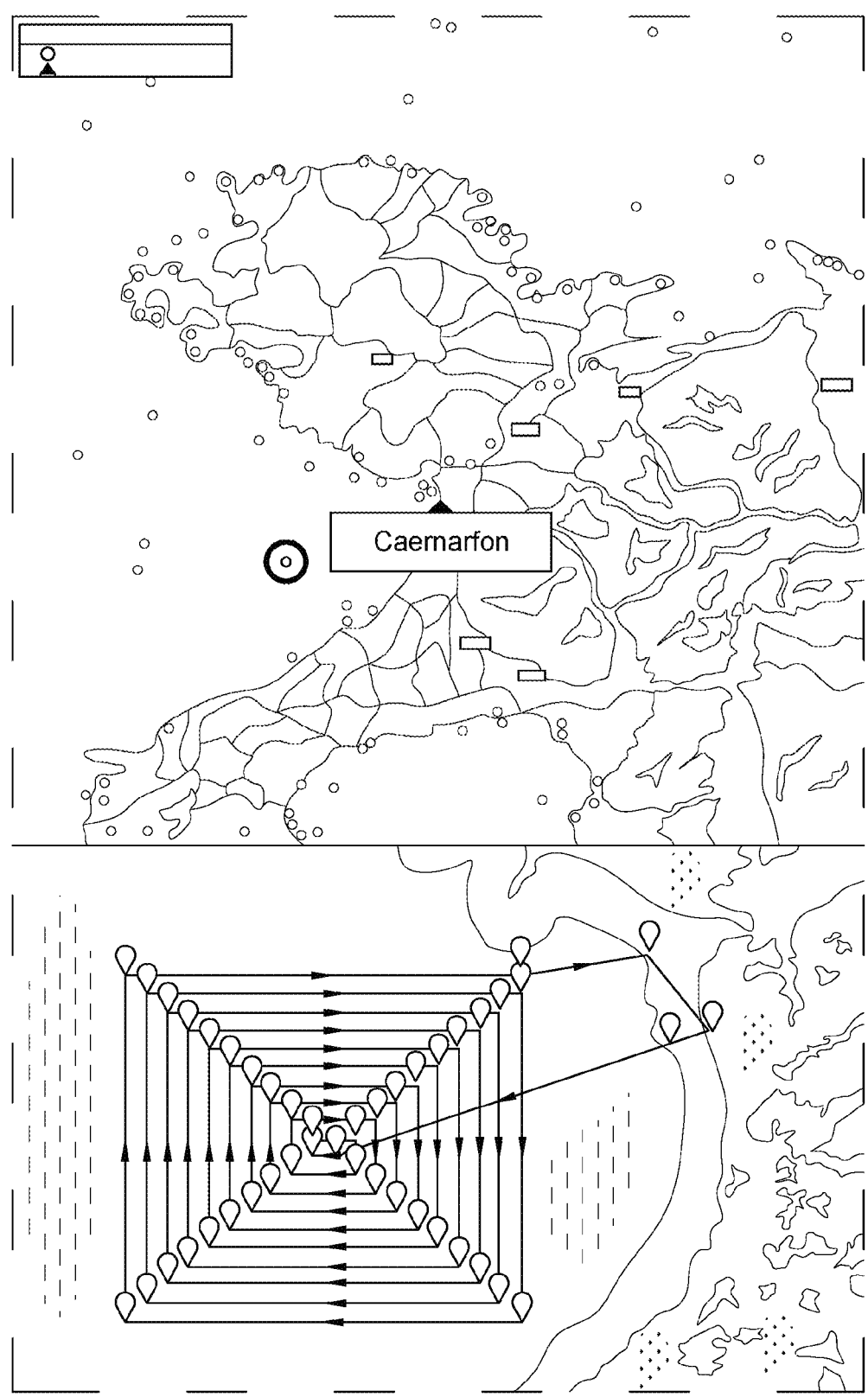
FIG. 24 shows an example of (top) a location of, and (bottom) a flight plan for, an incident near Caernarfon, UK.

The incident occurred 10 km from Caernarfon. See FIG. 24, upper part, for example. A complete flight plan has been built using this data. See FIG. 24, lower part, for example. A simulation run in the prescribed weather conditions demonstrates the true flight characteristics.

Flight Description

UAS takes off from Caernarvon airfield and fly the fastest route to the last known location as given by the tasking authority.

On arrival UAS performs a pre-determined search pattern. Flylogix routing software enables rapid development of location specific plans.

Guidance is taken from the tasking authority on adjustments to search parameters (track spacing, leg length, drift rate of datum point). For this example, visibility is less than 1000 m (mist). As such track spacing has been set to 500 m.

UAS conducts search pattern.

On completion the UAS will loiter at a hold point until instructed to return home or conduct a further search.

Simulation

Flylogix routinely use simulation tools to check aircraft responses to specific flight plans and conditions. Flylogix conducted a simulation of this mission with the prescribed conditions (Wind Force 4, mist, light rain).

Key data from simulation:

Flight time to last known location (10.4 Km)=6:48 mins

Figure 25:
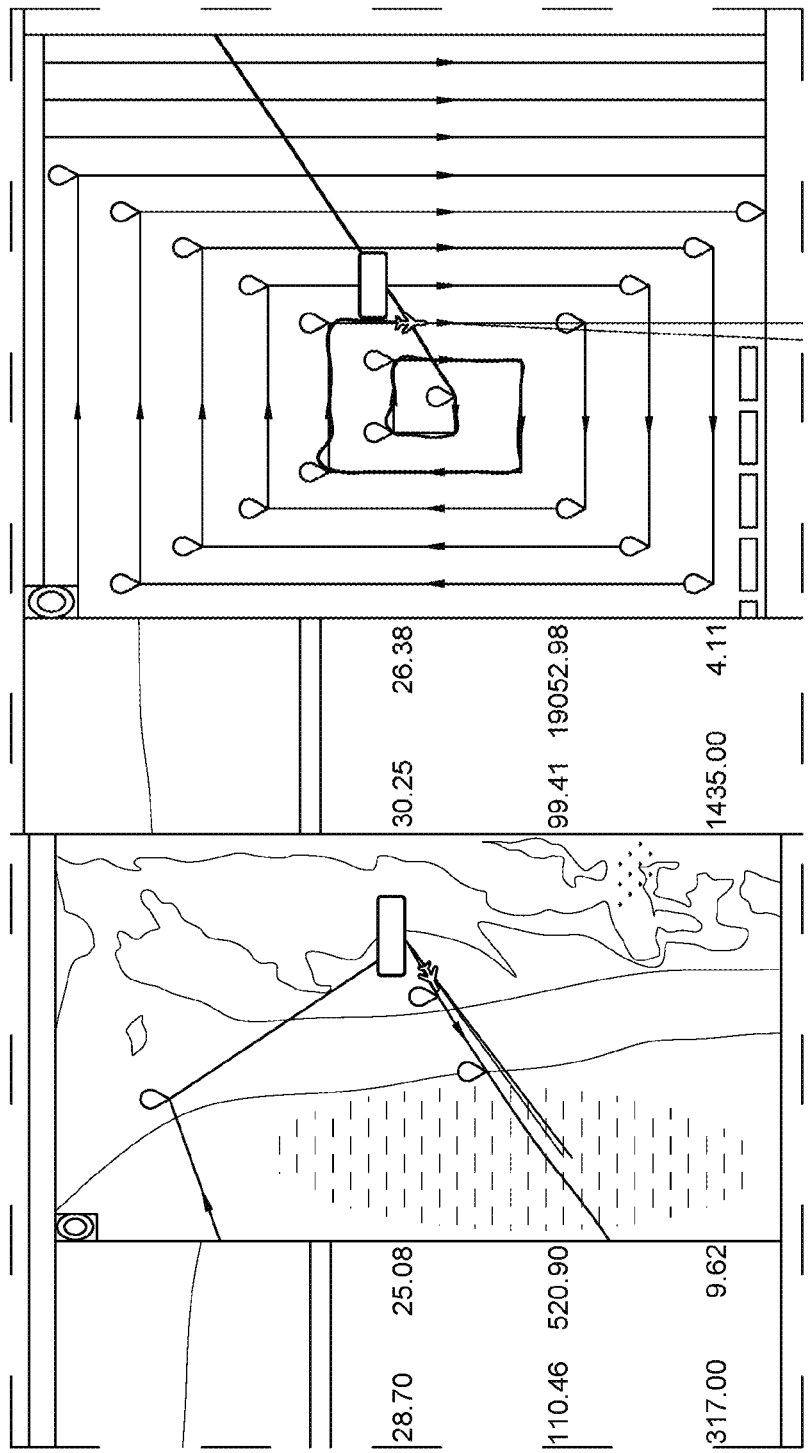
FIG. 25 shows (left) a Screenshot showing initial take off from Caernarfon airport; (right) a Screenshot of aircraft after completing initial few squares of search pattern.

Flight time to complete 5×5 NM box in 9 concentrically larger rectangles (210 Km)=116:40 mins Total distance=225.9 km Remaining operational flight time for further search/operation prior to refuel=1 hr FIG. 25 (left) is a Screenshot showing initial take off from Caernarfon airport.

FIG. 25 (right) is a Screenshot of aircraft after completing initial few squares of search pattern.

Figure 26:
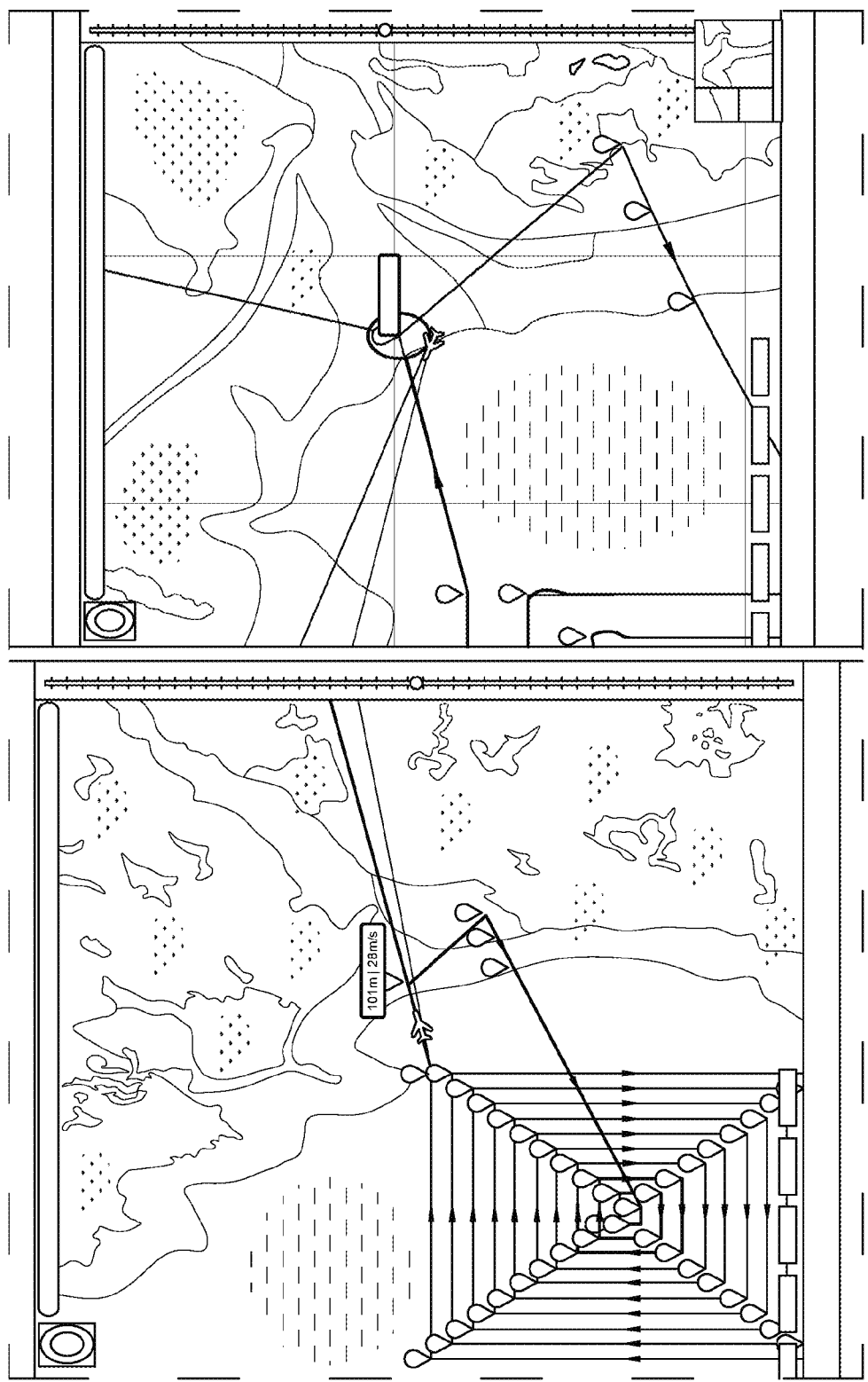
FIG. 26 shows (left) a Screenshot showing the aircraft after completing search pattern and heading to predetermined hold point; (right) a Screenshot showing aircraft circling holding point before heading back to base.

FIG. 26 (left) is a Screenshot showing the aircraft after completing search pattern and heading to predetermined hold point. FIG. 26 (right) is a Screenshot showing aircraft circling holding point before heading back to base.

Circular and potentially spiral search patterns can also be programmed, to reduce fuel usage.

Use Case 2

Location: Lydd, South East England

Figure 27:
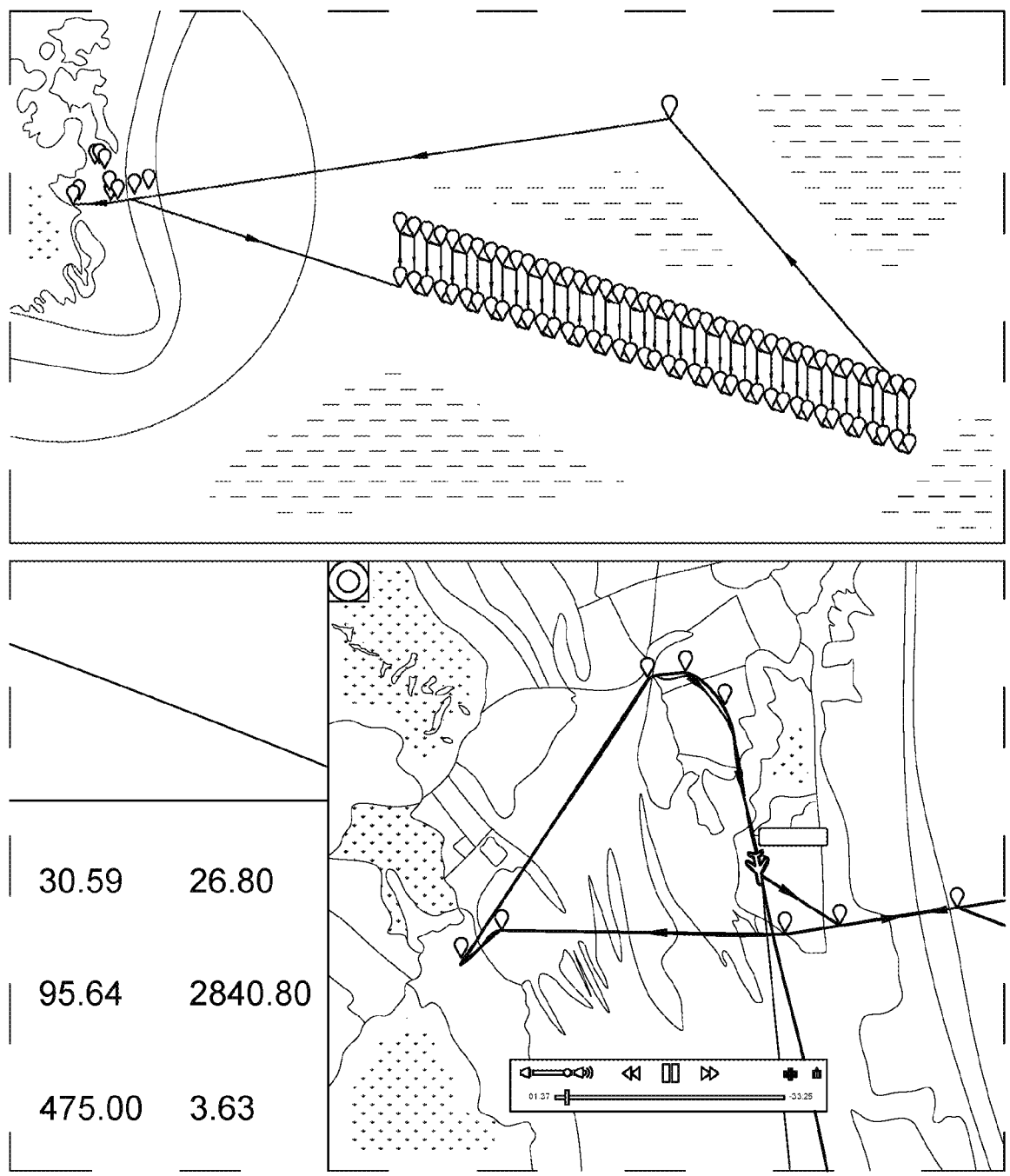
FIG. 27 shows an example of (top) a flight plan, and (bottom) initial take off, for an incident near Lydd, UK.

Lydd is situated in close proximity to Straits of Dover, the busiest shipping lane in the world. Analysis of historical SAR incident data and environmental ACOPS reports highlight a high frequency of incidents in which vessel monitoring from the air is required. A complete flight plan has been built for this case. See FIG. 27, upper part, for example.

Flight Description

The UAS takes off from Lydd airfield and perpendicular to and towards the coastline to minimise flight time over people and infrastructure.

Once at the designated location the UAS flies the predetermined flightpath.

The UAS covers the search area with a creeping line-ahead search pattern.

On completion, the UAS returns to a holding point.

The UAS then heads back to the airfield following the transit route.

Simulation

Flylogix conducted a simulation of the first flight with the conditions outlined in Use Case 1 of Wind Force 4. The simulation allows Flylogix to provide an accurate representation of how the aircraft will perform on this mission in the given conditions. The simulation was also run with higher wind conditions to demonstrate greater operational capability.

Key data from simulation:

Flight time to last known location (15.1 Km)=8:09 mins

Flight time to complete creeping line ahead search pattern=61:10 mins

Total distance=103.8 km

Figure 28:
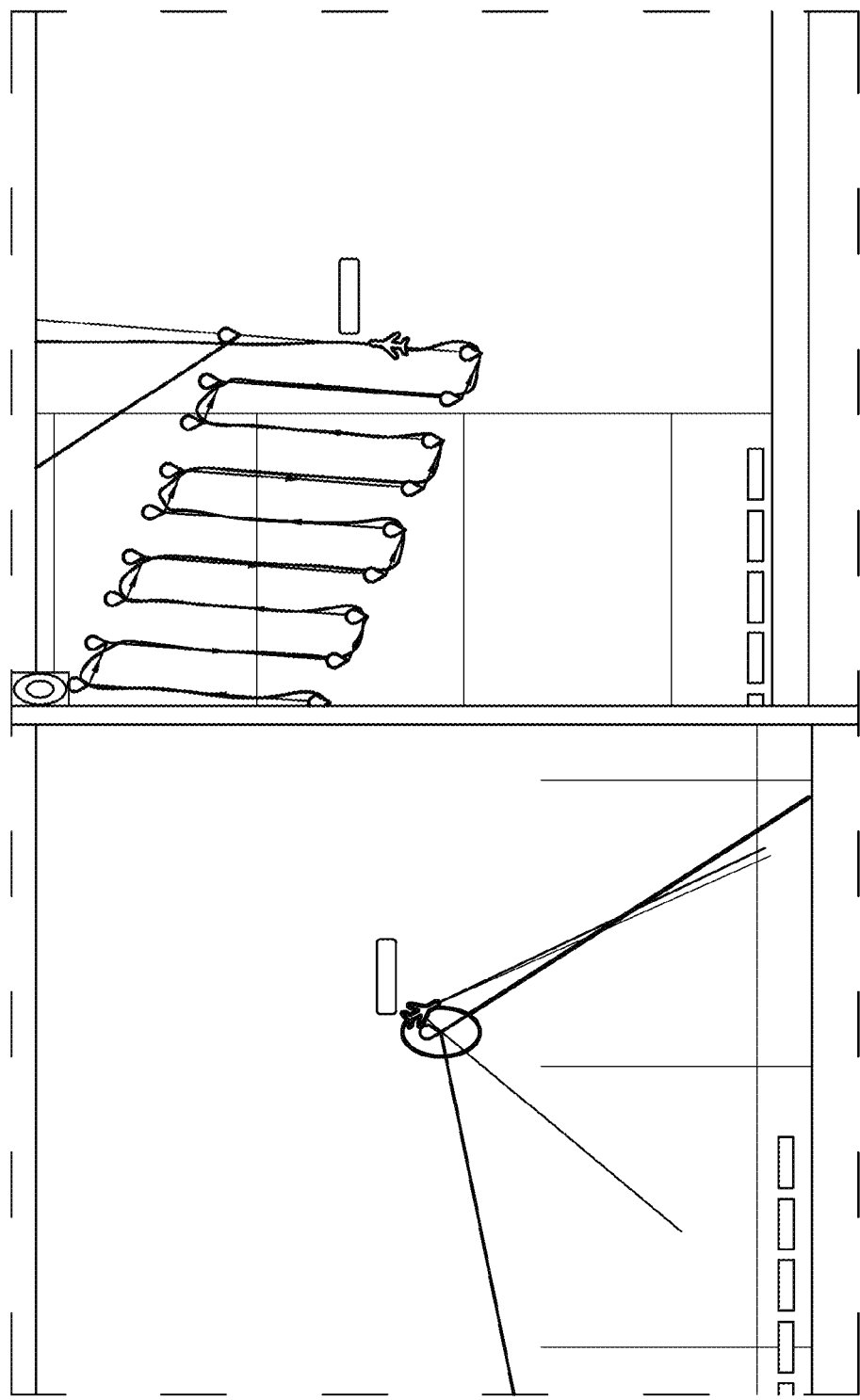
FIG. 28 shows (left) a Screenshot of UAS circling a holding point after completing search pattern; (right) a Screenshot of UAS completing predetermined search pattern.

FIG. 28 (left) is a Screenshot of UAS circling a holding point after completing search pattern. FIG. 28 (right) is a Screenshot of UAS completing predetermined search pattern.

Use Case 3

Location: Dale, West Wales, UK.

The area south of Milford Haven, UK, features a popular but remote coastal path. Incident data shows a high frequency of SAR activity which would require a lifeboat, helicopter or cliff rescue team to access a high-risk location. The example is built around a cluster of historical incidents which are located halfway between the flanking Lifeboat stations (Tenby and Angle) and in excess of 100 km from the nearest SAR helicopter at St Athan. Accurate location of a casualty is critical in this instance and early confirmation from a UAS would demonstrably reduce risk to other SAR personnel and assets in addition to reducing overall time from notification to rescue.

Figure 29:
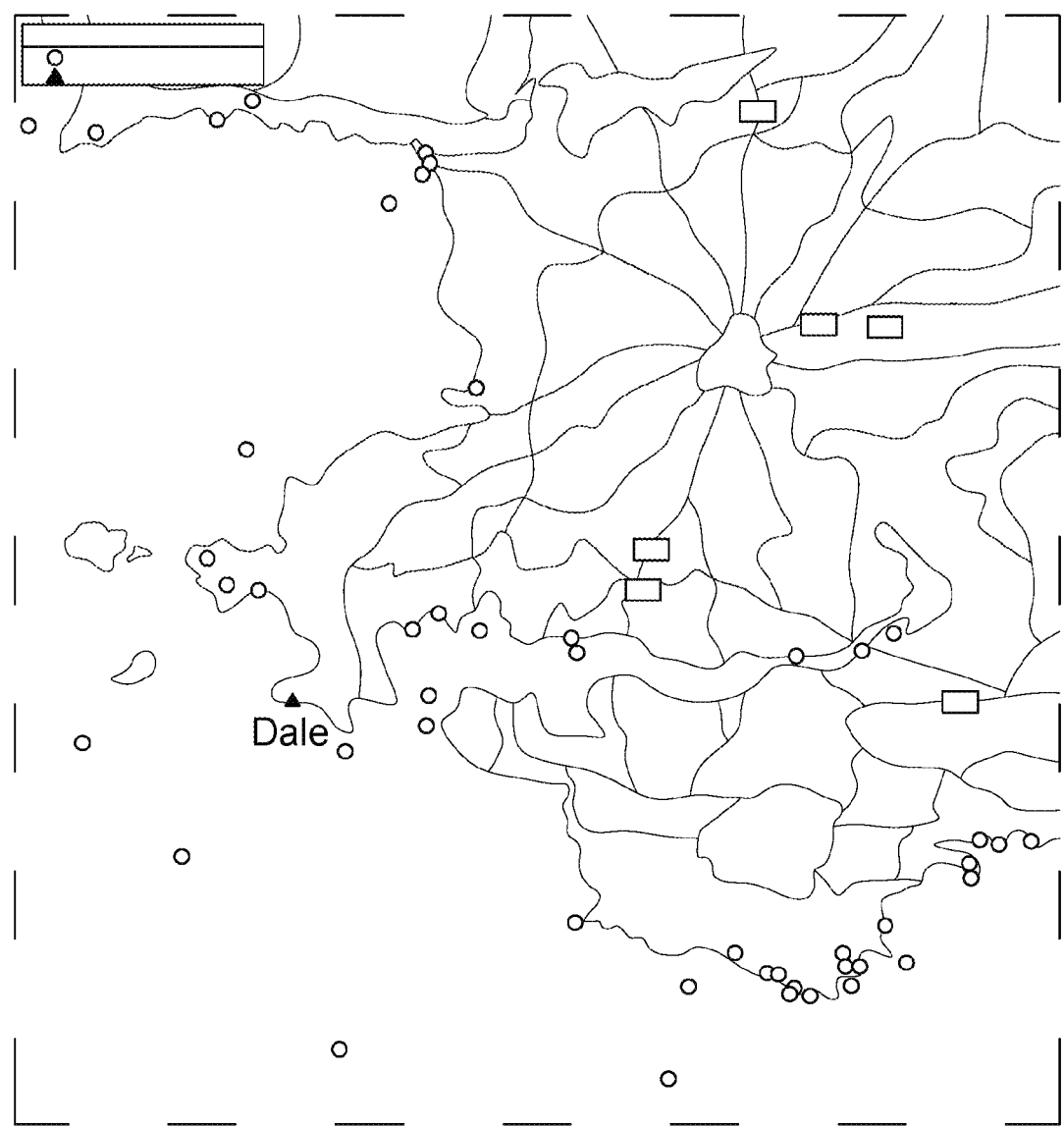
FIG. 29 shows a map relevant to an incident near Dale, West Wales, UK.

FIG. 29 shows a relevant map.

Flight Description

The UAS will take off from Dale airfield and fly around St Anne's Head to limit time flying over land. A close-in search will then be conducted flying around the peninsula up to Fresh Water East maintaining a distance of 200 m from the coastline.

The flight altitude is set at 200 m. This gives clearance above the maximum cliff height (50 m) and accounts for any trees or structures which could impede the flight path, while being low enough to allow good quality visual inspection.

Figure 30:
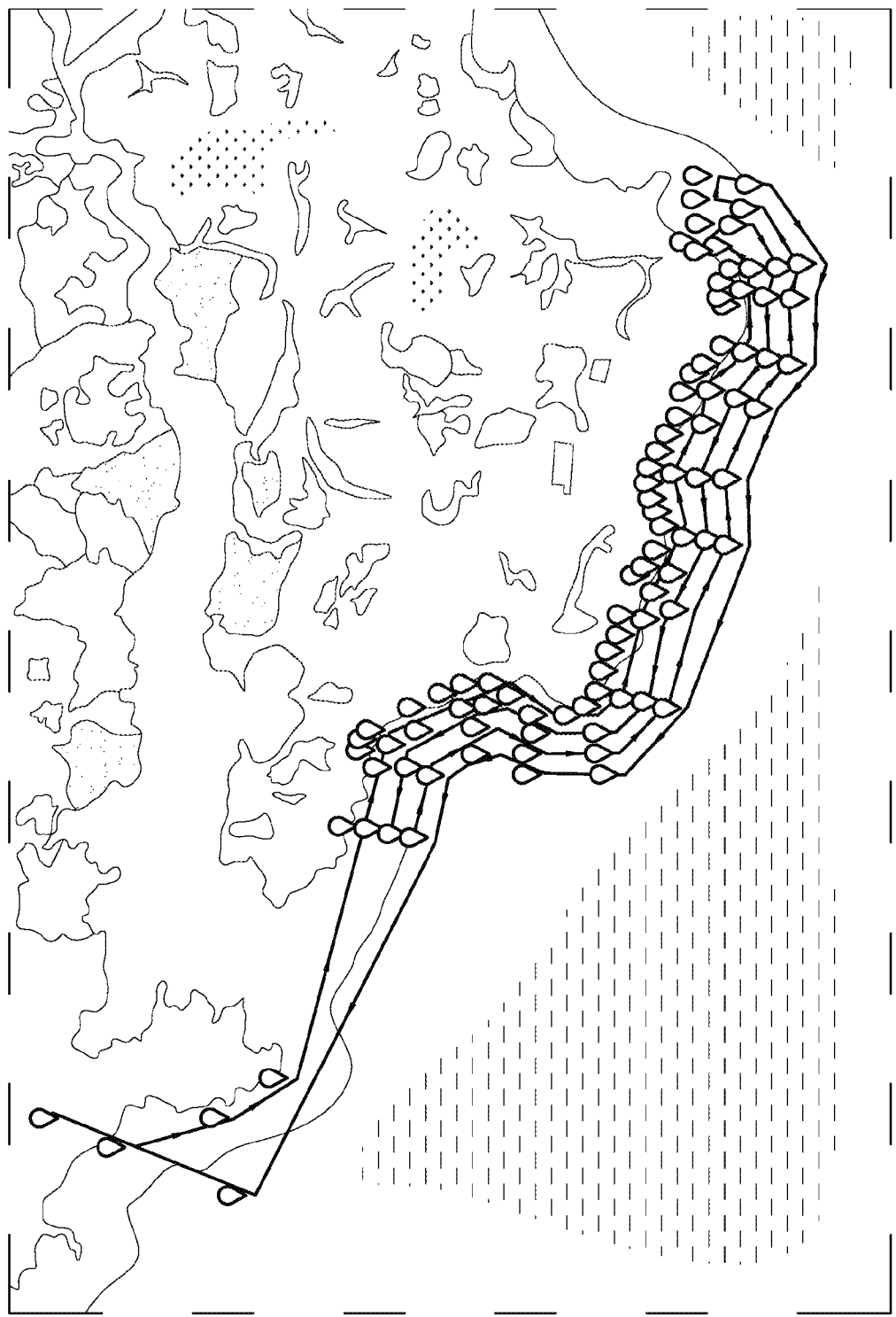
FIG. 30 shows an example of a flight plan for an incident near Dale, West Wales, UK.

Once at the furthest point out on the search area, the UAS will turn around and return along the coastline this time further out. This process is repeated to cover four runs at incrementally increasing distance from the coast. Throughout the search information on potential casualty locations, other vessels in the area, local weather etc will be fed back to ARCC, the pilot and other SAR assets. On completion, the UAS will fly to a holding point, to the SW of the search area and either be directed to continue searching or return home. A complete flight plan has been built for this case. See FIG. 30, for example.

High Speed Creation of Flight Plans

For this example, detailed sections of coast have been pre-programmed in advance and labelled in 1.5 mile segments. This allows a pilot to quickly choose any combination of segments along the coastline which require searching without having to manually plot a detailed route plan.

By testing this process, we have reduced the flight planning time for a complex bespoke mission from 30 minutes to below 2 minutes, in an example.

Simulation

Flylogix conducted a simulation of the flight with the conditions outlined in Use Case 1. (Wind Force 4, average of 5.5 m/s from a SW direction). The simulation allows Flylogix to provide an accurate representation of how the aircraft will perform on this mission in the given conditions.

Key data from simulation:

Flight time to last known location (10.8 Km)=6:16 mins

Flight time to coastal search using four passes (90.9 Km)=44:35 mins

Total distance=100.3 km

Shoreline Monitoring

Flylogix monitor tidal hights to maintain and adjust flight paths to maintain a fixed distance from the true waterline at any given point in time—this is changing constantly as the tide rises and falls. This provides a greater degree of accuracy when searching or monitoring shoreline for environmental or search and rescue purposes.

Figure 31:
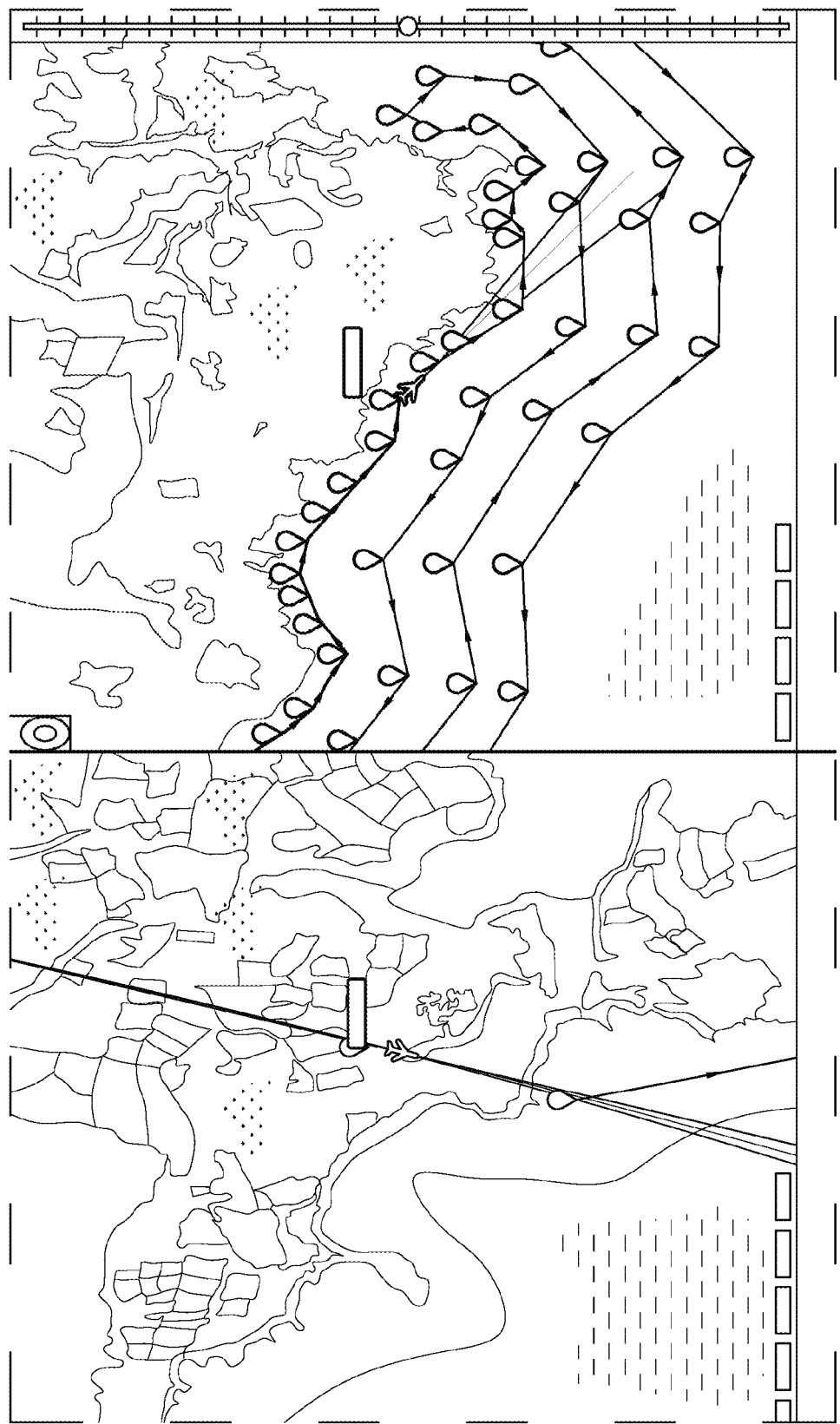
FIG. 31 shows (left) a Screenshot showing initial take off from Dale airfield; (right) a Screenshot showing starting search pattern along coast.

FIG. 31 (left) is a Screenshot showing initial take off from Dale airfield. FIG. 31 (right) is a Screenshot showing starting search pattern along coast.

Figure 32:
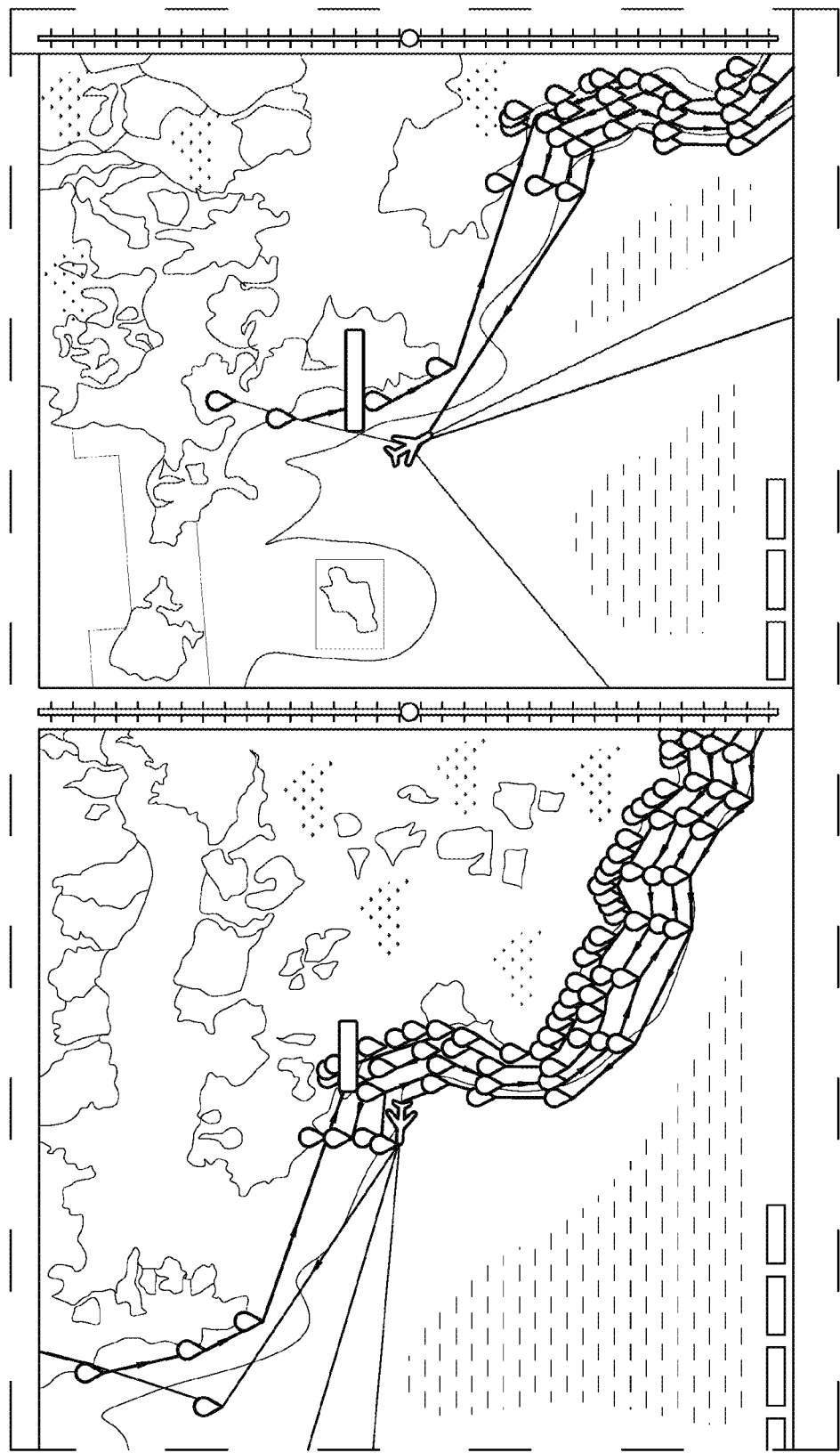
FIG. 32 shows (left) a Screenshot showing aircraft finishing search pattern along coast; (right) a Screenshot showing aircraft at holding positions after finishing search pattern.

FIG. 32 (left) is a Screenshot showing aircraft finishing search pattern along coast.

FIG. 32 (right) is a Screenshot showing aircraft at holding positions after finishing search pattern. Holding point is offshore away from the ferry routes.

Approach for Package Drop

Oil & Gas and offshore wind customers require urgent delivery of packages to fixed and floating offshore structures. These are traditionally delivered by helicopters. Helicopters are costly and often subject to weather restrictions. This means operators need to hold larger quantities of inventory on their assets which is costly and inefficient.

Flylogix has identified an opportunity to air drop cargo from a fixed wing aircraft onto the asset using a range of innovative methods. This enables low cost delivery without the cost complexity of remotely controlling a complex landing operation with limited bandwidth.

The packaging is sufficiently inexpensive that it is just disposed of after use. The aircraft flies low and slow over the drop zone to minimise the drift from the drop point to the target.

The drop zone could be the helideck, any large expanse of open deck like the 'pipe deck' or an adjacent area of water.

The package is contained in a padded, deformable, container like a cardboard tube and is simply dropped on the target. The package has very little aerodynamic lift to minimise the drift from wind.

The container is designed to crumple on impact to absorb energy and prevent contents being damaged or package bouncing clear of the landing site.

The container may have a small parachute or shuttlecock like retarder to slow the descent without introducing too much aerodynamic lift.

The container may have an airbag system to cushion landing.

The container may float to facilitate a water drop.

The container may have active steering (fins) to reduce the impact of wind and ensure it hits the target.

The container incorporates a cord that is deployed either before or after release to facilitate recovery, particularly if dropped in sea, with use of a crane.

The container is caught in an upright net.

The drop point is calculated and compensated for by using the cross-track data from the aircraft to estimate wind speed.

The container could be retrieved from the water by an ROV stationed at the asset.

The container could be retrieved by a crane from the water.

The asset has a small beacon on to trigger release without needing to calculate difference in GPS (or other satellite-based position receiver) positions and potentially guide onto the target.

Approach and Patterns for Asset Management

Offshore Oil Rig inspection

Maintaining assets in remote locations is a difficult and costly endeavour and having a Remotely Piloted Aircraft System (RPAS) routinely send back data including visual and hyper-spectral images of the asset can greatly help in tracking the wear-and-tear/aging of the asset, and to help prioritise any maintenance efforts and/or equipment needed.

It is the ease and frequency of visits that allow a good picture of the asset health to be inferred from even quite cheap COTS (Commercial Off-The Shelf) cameras/sensors. However, if needs be, the RPAS can be fitted with GPS (or other satellite-based position receiver)-stabilised gimbals to give very stable imagery of particular points of interest, as is typical of military operations.

Ideally, the customer would have control of the camera live throughout the flight. At a minimum, the ability to set the camera to look at point(s) of interest with GPS (or other satellite-based position receiver) coordinates. The image quality/stability is considerably better from the gimballed system. This would all be accessible in the customer's user interface by tapping to add/move points of interest GPS (or other satellite-based position receiver) locations to focus on.

The ability to take photos is also highly valuable to customers—the image quality is far higher than extracting images from video files. Again, to optimise this requires control of the camera with a live low resolution video feed.

In an example, the resolution is sufficient for detailed inspection tasks.

Drop Sweeps of a Drill Ship

The remote assets are usually in very harsh environments and are susceptible to corrosion and there have been many incidents where pieces of equipment have dropped off and caused injuries to personnel.

Thus searching for things that can drop e.g. light fittings, or things that have dropped e.g. bolts is a continuous process, and one that the RPAS can assist with.

Laser Scanning

Obtaining high quality laser-scanned point cloud data is very useful for planning engineering campaigns on remote assets.

The data can be used by asset information systems to allow central office to know what is installed on each platform and design equipment for retrofit.

Electrical Cable Hot-Spots

Damaged cables/termination blocks usually show up in thermal imaging cameras due to Joule heating arising from higher resistance, and if unresolved can lead to fire which is very dangerous on an oil and gas offshore asset. The RPAS may take thermal images of the electrical trays on a periodic basis and issues could potentially be identified earlier than through manual inspection.

There are strong applications of this to onshore for electric cable monitoring for predictive maintenance work of remote power lines.

Non-Destructive Examination (NDE)

Carrying out close inspection or even deploying a roving buggy on to the structure. This can complete detailed inspection below the waterline and could remove the cost of having to coming out of service for 5 yearly inspections. It could also reduce the requirement for a drilling rig to return to the shipyard for maintenance.

Coating Inspection

Protecting against corrosion is typically achieved using coatings that need re-painting at periodic intervals which usually involves a lot of rope access and thus is dangerous and very costly—both in time to do the job and lost production.

If there was a system that provided thickness measurements, a more preventative approach could be taken that allowed for re-painting as needed.

Tank Inspection

Structural integrity of tanks is difficult to determine due to the dangers of confined space access.

Sub-Sea Structure Inspection

Typically done manually by rope access or divers.

Approach for Data Collection and Data Relays

Data Collection

Temporary floating assets like drill rigs do not have a communications fibre link to shore. This means they are reliant on costly low bandwidth satellite links.

Figure 33:
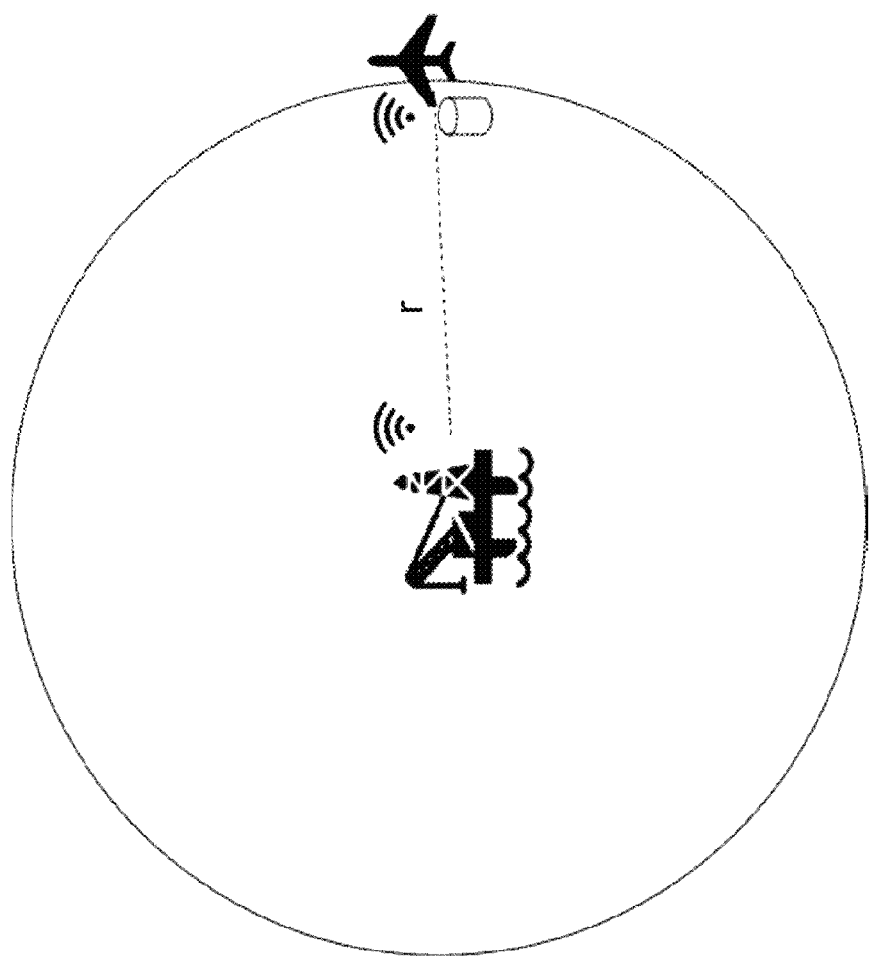
FIG. 33 shows an example which includes flying the aircraft around the remote asset to gather up the data stored on the remote asset.

Also typically operated as data diode with very little going out but a lot coming back. This value stream is concerned with flying the aircraft around the remote asset to gather up the data stored on the remote asset, as shown for example in FIG. 33, and then flying to back to shore where it can be downloaded and then transferred to the customer's IT systems. This can be done at a fraction of the cost of a satellite link.

The UAV would need to have a low energy, high bandwidth link to the asset e.g. WiFi and a lightweight data store such as a USB flash drive, together with a small computer to coordinate the connection and transfer of data to the flash drive.

Data Relay

Figure 34:
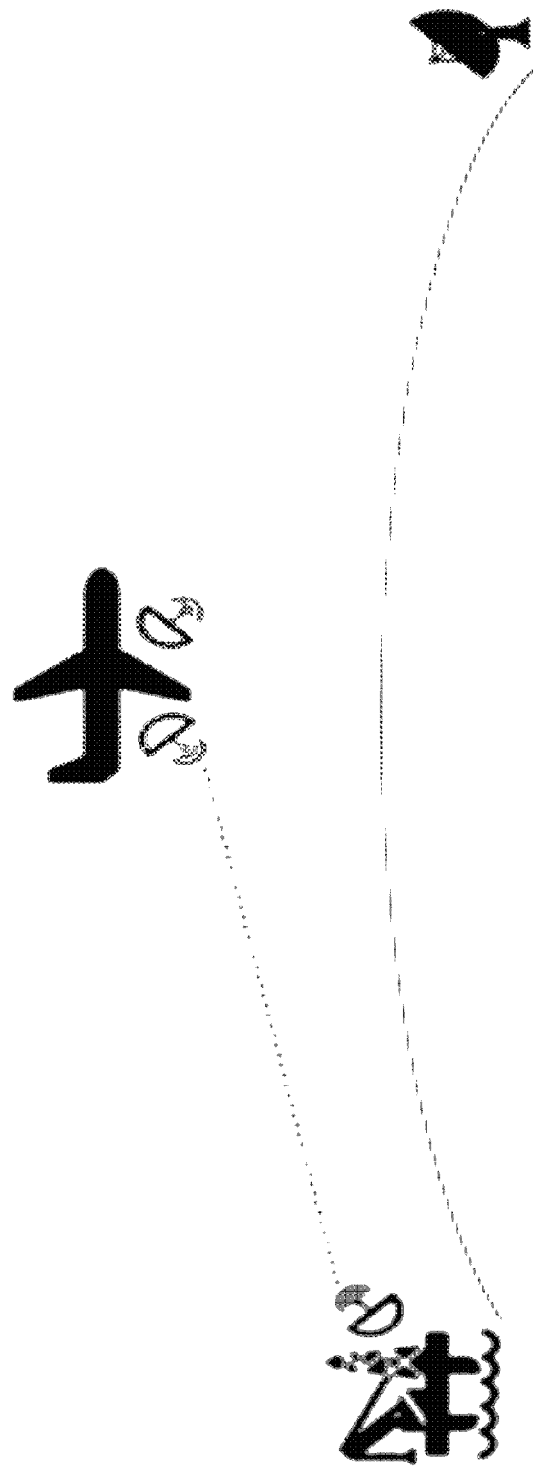
FIG. 34 shows an example of using a drone to act as a high bandwidth beyond line-of-sight data relay from a fibre link on shore to an offshore asset.

Use the drone to act as a high bandwidth beyond line-of-sight data relay from a fibre link on shore to an offshore asset, as shown for example in FIG. 34.

The height of the drone would need to be high enough so that it has line of sight of both the asset and the ground station on shore.

The pattern could be adjusted depending on weather conditions (e.g. increase altitude if a local storm).

Figure 35:
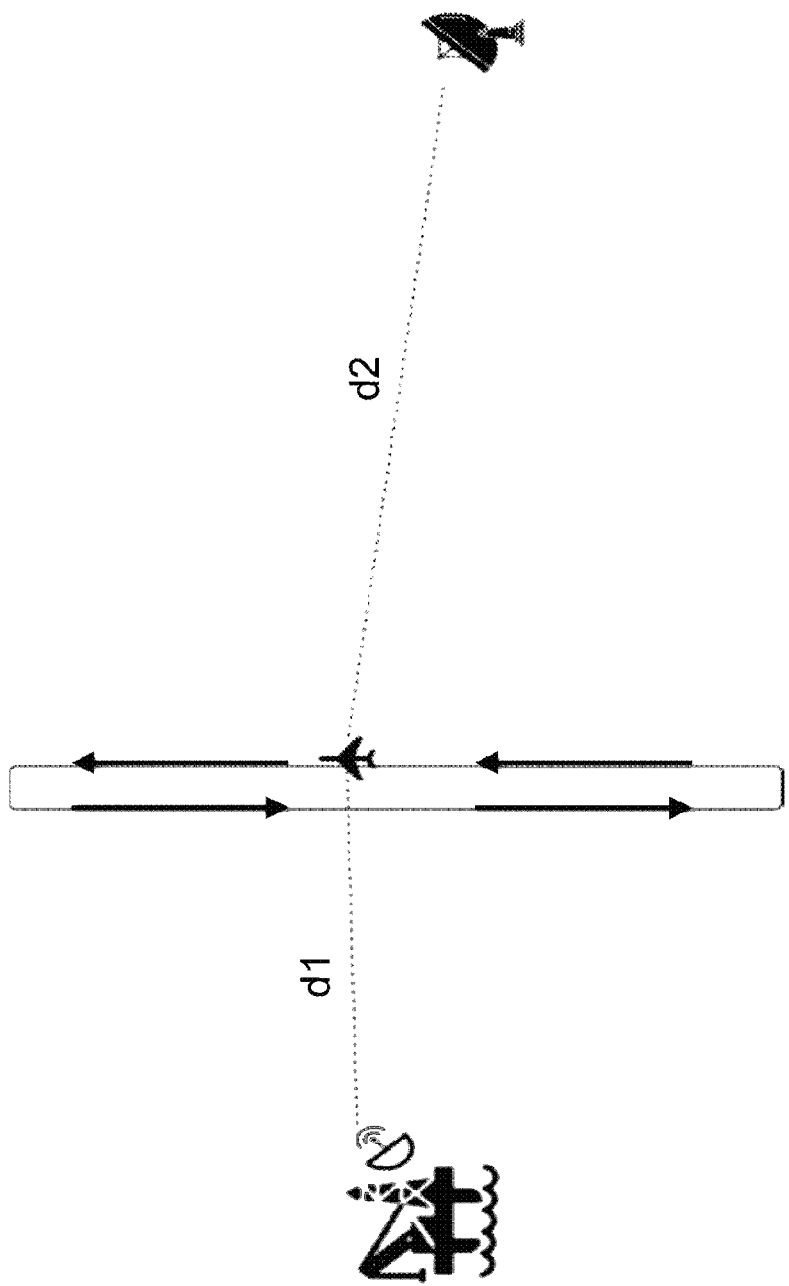
FIG. 35 shows an example in which a drone flies a very simple closed path where the turns are gentle so that the antenna could keep tracking the receiver stations for maximum signal strength.

The drone would fly a very simple closed pattern where the turns are gentle so that the antenna could keep tracking the receiver stations for maximum signal strength, as shown for example in FIG. 35.

Nominally the distances d 1 (the distance from the drone to the offshore installation) and d2 (the distance from the drone to the land-based receiver) are equal but these could be adjusted to reduce power consumption of operating the transceiver onboard the drone so as to maximise the flying time and/or overall data throughput. Suppose the data flowing from asset to drone and from drone to ground station are equal, then the optimum position is where the power needed to transmit is equal to the power needed to receive. So the optimum point is where d1=d2 i.e. the midpoint. However, if more data is flowing to the shore, then the drone is using more energy to send data to the shore than to the asset so the drone should locate itself closer to the shore (i.e. d2<d1) to reduce the battery drain; and vice-versa (i.e. if more data to asset then d1<d2).

This could be optimised in real-time taking into account the fact that the ratio of data flowing to and from the shore might change over time; in which case the drone needs to adjust d1 and d2 dynamically.

In another example, we could use onboard data storage to act as a buffer and effectively combine the pure Data collection idea with the pure Data Relay idea so that the drone moves towards the asset (d1 small), sends a lot of data to the asset and collects a lot of data to send to shore, flies towards the shore ground station and 'delivers' the large amount of data from the asset and collects the next 'batch' of data from the shore to deliver to the asset, and so on.

This effectively defines the shape of the closed path:
- if we want 'batch' delivery of data, then we have a wide and narrow closed path where the drone spends most the time transiting between the shore and asset.
- if we want 'continuous' delivery of real-time data, then we have a narrow and wide closed path with opposite aspect ratio and the drone spends most time flying perpendicular to the line joining the asset and the shore ground station.

Wind Turbine Inspection

It is known that wind turbine blades suffer damage from erosion caused by rain, hail and entrained dirt as well as lightning strikes. This damage tends to be concentrated at blade leading edge tips where blade speeds are highest. This part of the blade is also particularly important to system aerodynamic performance and therefore quick and accurate characterisation of issues is valuable.

The turbine incorporates a range of condition monitoring including fibre optic strain measurement of the blade and lightning detection. However, it is impossible to assess the level of damage without external inspection. This is typically undertaken by stopping the turbine and allowing a crawler or quadcopter to move up and down the blade. However stopping the turbine reduces electricity output and electricity generating income. Furthermore these inspections require an operator to travel to the individual turbine and conduct the operation over several hours. This is becoming increasingly costly as turbines are placed in more remote locations.

According to this aspect of the invention, an unmanned aircraft, e.g. a fixed wing unmanned aircraft, flies along the plane of the rotor just above the top and upwind of the rotor disk. This position avoids tip vortex shedding whilst being close to the tip. The unmanned aircraft would fly in line with the blade rotation to slow the relative speed of the tip to the aircraft, using the aircraft speed (e.g. 30 m/s) to reduce the relative motion and as well as its proximity (e.g. <50 m) to obtain high quality blade tip images. This would be augmented by tip camera tracking to follow the tip. Furthermore the aircraft will have a microphone to record the acoustic signature of associated damage and resultant poor airflow. This would enable the aircraft to characterise the three tips as they consecutively pass the aircraft within a period of approximately 4 s. (Assuming e.g. 10 revs per minute, 6 s for complete rotation, all 3 tips pass aircraft over top in 4 s, in this period aircraft has only 200 m). If aircraft slows to 25 m/s first blade is about 25 m below on way up, second is top dead-centre and third is 25 m below and descending). The sequence is biased to take the images of all three blades before top dead centre to ensure an unobstructed view of the leading edge. The aircraft's sensors would be able to relate visual and acoustic signals with turbine and blade unique numbers, supplied by the turbine operator, for operational interpretation of the signals. The aircraft will also measure the offset of the turbine blade from the tower as it passes bottom dead centre as a further measure of aerodynamic performance. Because the deflection of the tip is dominated by thrust at the tip, this, in combination with tip damage information, can be used to infer where on the blade is the most damaged. This same tower to tip measurement can also be used to detect potential tip strikes that can occur at maximum thrust (e.g. 8-12 m/s) and adjust pitch settings accordingly.

The aircraft flies a route that enables it to rapidly traverse a large portion of the wind farm in a single operation. The aircraft time-stamps the data and can match visual and acoustic results with recorded blade strain measurement to identify the specific blade inspected and correlate those results with blade structural behaviour.

This same inspection technique can be used to assess the general status of the turbine following shutdown due to max wind speed (e.g. —25 m/s) exceeded alarm. The aircraft can rapidly gather imagery of all of the turbines and enable them to be restarted or moved out of storm mode quickly, maximising energy production.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A flight control system, the flight control system including a Remotely Piloted Aircraft (RPA) and a ground-based control centre, wherein the RPA and the ground-based control centre are configured to communicate using a plurality of different communication systems, wherein the RPA includes a computer system configured to determine operation risk, wherein the computer system receives input from the ground-based control centre for use in the determination of operation risk, wherein the computer system is configured to select a communication system from the plurality of different communication systems, and to use the selected communication system for communication between the RPA and the ground-based control centre, based on the determined operation risk;
wherein the ground-based control centre is configured to dynamically manage the operation risk by using a probabilistic framework, wherein the dynamically managed operation risk is provided to the RPA to guide the selection of the communication system;
wherein the selected communication system is selected to be a low cost communication system, in response to the dynamically managed operation risk being a lower operation risk, wherein the selection is performed based on a pre-defined mission policy that assigns priorities to different mission phases, such that low-cost communication methods are prioritized only when the probabilistic risk assessment determines that the dynamically managed operation risk is below a threshold.

2. The flight control system of claim 1, wherein the low cost communication system is a WiFi communication system, or a cellular communication system, or a low-power RF communication system.

3. The flight control system of claim 1, wherein the low cost communication system is not a satellite communication system.

4. The flight control system of claim 1, wherein the selected communication system is selected independent of cost, when the determined operation risk is a higher operation risk; or wherein the selected communication system is a satellite communication system, when the determined operation risk is a higher operation risk.

5. The flight control system of claim 1, wherein the ground-based control centre includes one or more of, or all of: a satellite communications transceiver; a satellite communications transceiver which can receive WiFi/cellular communications from a satellite; a transceiver which can transmit WiFi (2.4 GHz) and 433 MHz frequencies; a cellular and WiFi transceiver; or a VHF transceiver.

6. The flight control system of claim 1, wherein the RPA includes one or more of, or all of: a Mode S transponder; a receiver for WiFi (2.4 GHz) and 433 MHz frequencies; a transceiver for satellite, cellular and WiFi communications; a transceiver for automatic dependent surveillance-broadcast (ADS-B), or a transceiver for VHF.

7. The flight control system of claim 6, wherein the RPA is operable to communicate with an at-sea offshore installation, in communication with a transceiver for cellular and WiFi communications of the offshore installation, and/or a transceiver for VHF of the offshore installation.

8. The flight control system of claim 1, wherein the RPA includes one or more of, or all of:
(i) airband VHF radio;
(ii) a low earth orbit (LEO) satellite and cellular communications unit, which can switch between LEO and cellular based on availability;
(iii) power, servos, pitot, GPS, which includes at least one of: Power management done on PCB; Minimal and rugged connectors; Redundancy in sensors.

9. The flight control system of claim 1, wherein the determination of operation risk involves determining the available connections including: SatComms, cellular, WiFi, or low-power RF, and using a multi-objective cost function to determine an appropriate link to send data over.

10. The flight control system of claim 9, wherein the cost function is or includes a selection process that selects for each data packet to be sent the link at any given time t that minimizes the cost per data throughput of each communication system, with the selection process being constrained by the requirement that a transmission latency over the selected link must be less than a predefined critical time.

11. The flight control system of claim 1, wherein the ground-based control centre is configured to communicate with the Remotely Piloted Aircraft (RPA), the RPA operable to execute a mission, the ground-based control centre including a ground-based computer system, wherein the ground-based computer system is:
(i) configured to receive data about the RPA;
(ii) configured to receive flight plan data and environmental data;
(iii) configured to process the received data about the RPA, and the received flight plan data and the environmental data, using a risk assessment algorithm, to determine a probability of mid-air collision, and to determine a probability of damage to third parties on the ground;
(iv) configured to process the determined probability of mid-air collision, and the determined probability of damage to third parties on the ground, to decide whether to abort the mission, or to proceed with the mission, and
(v) configured to send an instruction to the RPA to abort the mission, in response to a decision to abort the mission in (iv), and/or configured to send an instruction to the RPA to proceed with the mission, in response to a decision to proceed with the mission in (iv).

12. The flight control system of claim 11, wherein when deciding whether to abort the mission, or to proceed with the mission, the decision is made by running multiple scenarios testing edge cases as well as a nominal case before giving the final decision.

13. The flight control system of claim 1, wherein the RPA is operable beyond visual line of sight from the ground-based control centre to the RPA, or beyond visual line of sight from the ground-based control centre to an offshore target.

14. The flight control system of claim 1, wherein the ground-based control centre includes one or more of, or all of:
(i) a local transmitter;
(ii) an internet link to low earth orbit (LEO) satellite and cellular communications unit;
(iii) Radio over Internet Protocol (ROIP)/Voice over Internet Protocol (VOIP) link to fixed VHF antennas;
(iv) automatic landing and/or automatic take-off;
(v) VOIP link to VHF antenna on RPA;
(vi) command inputs and telemetry data.

15. The flight control system of claim 1, wherein the ground-based control centre is in a vehicle, a van, or an intermodal container, or is at a fixed site.

16. The flight control system of claim 1, wherein the ground-based control centre includes a processor and mission control software which is executable on the processor.

17. The flight control system of claim 1, wherein the ground-based control centre is configured to manage operations risk by managing the operation in phases and by using the probabilistic framework.

18. The flight control system of claim 1, wherein the Pilots are moved to the central control centre, and the entire operation is run centrally.

19. The flight control system of claim 1, wherein a Video Link from the RPA to the ground-based control centre is provided.

20. The flight control system of claim 1, wherein the RPA includes a methane sensor, or a gas sensor.

21. The flight control system of claim 1, wherein the RPA includes an autopilot.

22. The flight control system of claim 1, wherein the RPA flies around a remote asset and gathers the data from it using a local cellular/WiFi network and then flies back to deliver the data to the ground-based control centre.

23. A Remotely Piloted Aircraft (RPA), wherein the RPA is configured to communicate with a ground-based control centre using a plurality of different communication systems, wherein the RPA includes a computer system configured to determine operation risk, wherein the computer system is configured to select a communication system from the plurality of different communication systems, and to use the selected communication system for communication between the RPA and the ground-based control centre, based on the determined operation risk;
wherein the ground-based control centre is configured to dynamically manage the operation risk by using a probabilistic framework, wherein the dynamically managed operation risk is provided to the RPA to guide the selection of the communication system,
wherein the selected communication system is selected to be a low cost communication system, in response to the dynamically managed operation risk being a lower operation risk, wherein the selection is performed based on a pre-defined mission policy that assigns priorities to different mission phases, such that low-cost communication methods are prioritized only when the probabilistic risk assessment determines that the dynamically managed operation risk is below a threshold.

24. The RPA of claim 23, wherein the RPA includes a methane sensor, or a gas sensor.

25. The flight control system of claim 1, wherein the probabilistic framework is configured to dynamically assess operation risk factors including at least one of weather conditions, flight path safety and environmental data, and provides this assessment to the RPA for use in the selection of the communication system.

26. The flight control system of claim 9, wherein the multi-objective cost function follows a set policy for the mission that sets the level of risk vs the cost (reward); wherein the policy is set by the computer system configured to determine the operation risk, or by assigning risk to each phase of the mission.

27. The flight control system of claim 1, wherein the selection of the communication system is performed using a multi-objective cost function that takes into account both the dynamically managed operation risk and the communication cost.

28. The flight control system of claim 1, wherein the mission policy is configured to be modified during flight, based on one or more of: availability of the communication systems, dynamically updated operation risk, or updated input received from the ground-based control centre.

* * * * *